(12) United States Patent
Tan et al.

(10) Patent No.: US 9,887,047 B2
(45) Date of Patent: Feb. 6, 2018

(54) NEGATIVE ELECTRODE ACTIVE MATERIAL FOR ENERGY STORAGE DEVICES AND METHOD FOR MAKING THE SAME

(71) Applicant: IMRA AMERICA, INC., Ann Arbor, MI (US)

(72) Inventors: Bing Tan, Ann Arbor, MI (US); Zhendong Hu, Ann Arbor, MI (US); Guanghui He, Ann Arbor, MI (US); Yong Che, Ann Arbor, MI (US)

(73) Assignee: IMRA AMERICA, INC., Ann Arbor, MI (US)

( * ) Notice: Subject to any disclaimer, the term of this patent is extended or adjusted under 35 U.S.C. 154(b) by 142 days.

(21) Appl. No.: 14/102,700

(22) Filed: Dec. 11, 2013

(65) Prior Publication Data

US 2014/0170476 A1    Jun. 19, 2014

Related U.S. Application Data

(60) Provisional application No. 61/739,460, filed on Dec. 19, 2012.

(51) Int. Cl.
*H01M 4/131* (2010.01)
*H01G 11/46* (2013.01)
(Continued)

(52) U.S. Cl.
CPC ............. *H01G 11/46* (2013.01); *H01G 11/06* (2013.01); *H01G 11/50* (2013.01); *H01G 11/86* (2013.01);
(Continued)

(58) Field of Classification Search
CPC .. H01M 4/364; H01M 10/0525; H01G 11/06; H01G 11/50
See application file for complete search history.

(56) References Cited

U.S. PATENT DOCUMENTS 5,162,176 A    11/1992   Herr
5,543,021 A     8/1996   Yazami
(Continued)

FOREIGN PATENT DOCUMENTS

JP    2000090924 A    3/2000
JP    2000208523 A    7/2000
(Continued)

OTHER PUBLICATIONS

A. Anani et al., Kinetic and Thermodynamic Parameters of Several Binary Lithium Alloy Negative Electrode Materials at Ambient Temperature, J. Electrochemical Sci. & Tech. Technical Notes. vol. 134, No. 12 pp. 3098-3012 (1987).
(Continued)

*Primary Examiner* — Jonathan Jelsma
(74) *Attorney, Agent, or Firm* — Sughrue Mion, PLLC; Richard C. Turner

(57) ABSTRACT

The described embodiments provide an energy storage device that includes a positive electrode including an active material that can store and release ions, a negative electrode including an active material that is a lithiated nano-architectured active material including tin and at least one stress-buffer component, and a non-aqueous electrolyte including lithium. The negative electrode active material is nano-architectured before lithiation.

18 Claims, 38 Drawing Sheets

(51) Int. Cl.

| | |
|---|---|
| *H01G 11/86* | (2013.01) |
| *H01M 10/0525* | (2010.01) |
| *H01M 4/1391* | (2010.01) |
| *H01M 4/485* | (2010.01) |
| *H01M 4/36* | (2006.01) |
| *H01G 11/06* | (2013.01) |
| *H01G 11/50* | (2013.01) |
| *H01M 4/62* | (2006.01) |
| *H01M 4/02* | (2006.01) |

(52) U.S. Cl.
CPC ......... *H01M 4/131* (2013.01); *H01M 4/1391* (2013.01); *H01M 4/364* (2013.01); *H01M 4/485* (2013.01); *H01M 10/0525* (2013.01); *H01M 4/62* (2013.01); *H01M 4/625* (2013.01); *H01M 2004/021* (2013.01); *Y02E 60/13* (2013.01)

(56) References Cited

U.S. PATENT DOCUMENTS

| | | | | |
|---|---|---|---|---|
| 5,595,837 | A | | 1/1997 | Olsen |
| 5,605,772 | A | | 2/1997 | Yazami |
| 5,744,264 | A | * | 4/1998 | Barker .................. H01M 4/505 429/223 |
| 5,753,388 | A | | 5/1998 | Koksbang |
| 5,759,715 | A | | 6/1998 | Barker |
| 6,203,944 | B1 | * | 3/2001 | Turner .................. H01M 4/134 252/182.1 |
| 6,410,188 | B1 | | 6/2002 | Shirane et al. |
| 6,908,709 | B2 | | 6/2005 | Myikai |
| 8,057,900 | B2 | | 11/2011 | Luhrs |
| 8,062,561 | B2 | | 11/2011 | Jumas et al. |
| 8,158,282 | B2 | | 4/2012 | Zhamu |
| 8,241,793 | B2 | | 8/2012 | Zhamu |
| 2009/0029256 | A1 | * | 1/2009 | Mah .................. H01B 1/24 429/231.8 |
| 2009/0162750 | A1 | | 6/2009 | Kawakami et al. |
| 2010/0120179 | A1 | * | 5/2010 | Zhamu .................. H01M 4/134 438/19 |
| 2012/0042490 | A1 | | 2/2012 | Lee |
| 2012/0140378 | A1 | | 6/2012 | Tan et al. |
| 2012/0237828 | A1 | * | 9/2012 | Tan .................. B82Y 30/00 429/221 |
| 2012/0276452 | A1 | * | 11/2012 | Yamauchi .................. H01M 4/364 429/218.1 |
| 2012/0321965 | A1 | | 12/2012 | Fujikawa et al. |
| 2012/0328923 | A1 | * | 12/2012 | Sawai .................. H01M 4/13 429/94 |
| 2013/0316238 | A1 | | 11/2013 | Nishimura et al. |
| 2014/0017570 | A1 | * | 1/2014 | Naoi .................. B82Y 30/00 429/231.8 |
| 2014/0065485 | A1 | | 3/2014 | Shinya et al. |

FOREIGN PATENT DOCUMENTS

| | | | |
|---|---|---|---|
| JP | 2004079463 A | 3/2004 | |
| JP | 2010098020 | 4/2010 | |
| JP | 2012182115 A | 9/2012 | |
| WO | 2011105002 A1 | 9/2011 | |
| WO | WO 2012133844 A1 * | 10/2012 | ............ B82Y 30/00 |

OTHER PUBLICATIONS

L. Y. Beaulieu et al., Reaction of Li with Grain-Boundary Atoms in Nanostructured Compounds, J. of the Electrochemical Society, 147, No. 9, 3206-3212 (2000).

L. Y. Beaulieu et al., The Electrochemical Reaction of Lithium with Tin Studied by In Situ AFM, J of the Electrochemical Society, 150, No. 4, A419-A424 (2003).

B. Das et al., Nano-composites SnO(Vox) as anodes for lithium ion batteries, J. Solid State Electrochem (2011) 15:259-268.

D. Foster et al., Performance of Sony's Alloy Based Li-ion Battery; ARL-TN-0319; U.S. Army Research Laboratory: Adelphi, MD, Jun. 2008.

Mike Hanlon, New battery recharges in one minute, ECOGIZMO http://www.gizmag.com/go/3893/picture/9674/.

E. Hosono et al., High-Rate Lithium Ion Batteries with Flat Plateau Based on Self-Nanoporous Structure of Tin Electrode, J. Electrochem. Soc. 2007, vol. 154, Is. 2, pp. A146-A149.

C. Kim et al., Critical Size of a Nano $SnO_2$ Electroe for Li-Secondary Battery, Chem. Mater. 2005, 17, 3297-3301.

M. Mohamedi et al., Amorphous tin oxide films: preparation and characterization as an anode active material for lithium ion batteries, Electrochimica Acta 46 (2001) 1161-1168.

K. Persson et al., Lithium Diffusion in Graphitic Carbon, J. Physical Chem. Letters vol. 1, p. 1176-1180, 2010.

Reddy et al. (M. V. Reddy, G. V. Subba Rao, B. V. R. Chowdari; Nano-$(V1/2Sb1/2Sn)O_4$: High Capacity, High Rate Anode Material for Li-ion Batteries, Journal of Materials Chemistry, vol. 21, (Feb. 24, 2011), pp. 10003-10011).

H. Usui et al., Novel Composite Thick-Film electrodes Consisted of Zinc Oxide and Silicon for Lithium-Ion Battery Anode, Int. J. Electrochem Sci., 7 (2012) 4322-4334.

J. Wang et al., Behavior of Some binary Lithium Alloys as Negative Electrodes in Organic Solvent-Based Electrolytes, JES 1986 vol. 133, No. 3, pp. 457-460.

Wolfenstien et al., Chemistry and Structure of Sony's Nexelion Li-ion Electrode Materials_Army-ARL-TN-0257 Jun. 2006.

Electric double-layer capacitor—Wikipedia, the free encyclopedia. mht.

Lithium-ion battery—Wikipedia, the free encyclopedia.mht.

Lithium-ion capacitor—Wikipedia, the free encyclopedia.mht.

Communication dated Oct. 31, 2017, issued by the Chinese Patent and Trademark Office in counterpart Application No. 2015-549473.

Communication dated Sep. 26, 2017, issued by the Chinese Patent and Trademark Office in counterpart Application No. 201380071549.3.

* cited by examiner

NEGATIVE ELECTRODE ACTIVE MATERIAL FOR ENERGY STORAGE DEVICES AND METHOD FOR MAKING THE SAME

CROSS-REFERENCE TO RELATED APPLICATION

This application is based upon and claims the benefit of priority from U.S. Provisional Application No. 61/739,460, filed on Dec. 19, 2012, in the United States Patent and Trademark Office, the disclosure of which is incorporated herein in its entirety by reference.

BACKGROUND

Field of the Invention

The present invention relates to lithium-based energy storage devices generally, and, in particular, to negative electrode active materials for lithium-based energy storage devices.

Description of the Related Art

Energy storage devices utilizing lithium ions for energy storage applications have one of the highest energy storage capacities of all rechargeable batteries and are widely used today. Lithium ion capacitors and lithium ion batteries are two basic types of energy storage devices, whose negative and positive electrode materials store/release lithium ions through different processes. Lithium ion batteries are typically employed where charge/discharge times are in a range of tens of minutes or longer. Lithium ion capacitors are characterized by a much faster charge/discharge rate compared to lithium ion batteries, e.g., several seconds. Moreover, lithium ion capacitors are expected to be cycled at least ten thousand charge/discharge cycles without a significant loss in capacity, such as 20%, whereas lithium ion batteries are generally required to be stable over one or two thousand cycles.

Cycling stability of a lithium ion capacitor generally relies on the negative electrode active material. During a cycling process, a faradaic process is associated with the negative electrode, which may result in a structural change of the negative electrode active material. Here, the faradaic process means that the charge transfer process is a result of an electrochemical reaction. The positive electrode of the lithium ion capacitor is, in theory, stable over unlimited cycles since the positive electrode material (e.g., activated carbon) does not experience any significant chemical or physical change during the cycling process.

In a conventional lithium ion capacitor, a graphite material is used as the negative electrode active material to host/release the lithium ions through faradaic lithium insertion/extraction processes, while a highly porous carbon is used as the positive electrode material to provide a high surface area for adsorption/desorption of ions. The graphite material has the advantage of a relatively high lithium diffusion rate that provides a high rate capability for the lithium ion battery, while a small volume change is necessary to achieve long cycling stability. However, a graphite material has a low energy storage capacity (e.g., 374 mAh/g) and a low volumetric energy storage capacity (e.g., 818 mAh/cm$^3$ assuming that the density of graphite is 2.2 g/cm$^3$), limiting the storage capacity of the lithium ion capacitor.

Tin has a good lithium diffusion rate and has higher theoretical lithium storage capacity (e.g., 994 mAh/g or 7254 mAh/cm$^3$) than that of the graphite material. Tin has been studied extensively as the negative electrode active material for lithium ion batteries. However, tin in a lithium ion battery tends to have poor cycling stability because of the large volume expansion/contraction of tin in the lithium insertion/extraction process. The volume change of a tin particle can be as large as 300% during the lithium insertion/extraction process, which can result in the formation of cracks in the electrode film and the loss of electrical contacts among tin particles during cycling. This will result in a decrease of energy storage capacity since electrons cannot be transferred to the isolated tin particles. The cycling stability may become even worse at a high charge/discharge rate since there may not be enough time for the tin particles to release the lithium ion-induced volume change stress resulting in a mechanical breaking of the tin particles. Efforts have been made to improve the cycling stability by limiting the cycled voltage of a tin electrode to 0.3V to 0.7V (relative to Li/Li$^+$ redox potential) by Hosono et al. (Eiji Hosono, Hirofumi Matsuda, Itaru Honma, Masaki Ichihara, and Haoshen Zhou; High-Rate Lithium Ion with Flat Plateau Based on Self-Nanoporous Structure of Tin Electrode; *Journal of The Electrochemical Society*, vol. 154, no. 2, (Dec. 27, 2006), pp. A146-A149). However, this research showed that the tin electrode is stable for only 20 cycles. It is questionable whether the tin electrode can survive thousands of cycles considering the continuous volume change of the tin particles and the absent a stress-buffer component in the tin electrode material.

To improve the cycling stability of the tin, a stress-buffer component can be incorporated to reduce the volume change stress so that the electrical contacts among the tin particles can be maintained during cycling. The stress-buffer component generally is a material that is stable during the charge/discharge cycling. It may be electrochemically-inert or may experience a different volume change profile than tin during cycling. For example, tin oxides with various compositions and structures have been reported as negative electrode active materials for lithium ion batteries. In these oxides, tin oxide will be converted irreversibly into tin and lithium oxide during the first cycle, and the lithium oxide will act as a stress-buffer component since it can be electrochemically-inert during cycling. These tin oxides, however, are tested against lithium in half cells with a limited number of cycles, for example, less than 100 cycles. Here, a half cell contains metallic lithium as a negative electrode active material and a tin oxide as a positive electrode active material with a lithium salt dissolved in a non-aqueous solvent as an electrolyte. Moreover, these mixed oxides generally show a large irreversible capacity loss during the first cycle mainly as a consequence of the oxide conversion (for example tin oxide is converted to tin and lithium oxide) and the solid-electrolyte interface (SEI) layer formation, which makes it impractical for them to be used directly in a lithium ion battery. Furthermore, it is questionable whether tin oxide-based materials can be used for high rate applications. To be used as a negative electrode active material for high rate applications, a material generally needs to have both good electrical conductivity and good lithium ion diffusion rate. Unlike tin, tin oxide is not electrically conductive and a lithiated tin oxide contains lithium oxide, which is not electrically conductive. The presence of the lithium oxide may slow down the rate performance of the tin particles since it is not electrically conductive. In one specific example, $V_{1/2}Sb_{1/2}SnO_4$ used as a negative electrode active material for lithium ion batteries was reported by Reddy et al. (M. V. Reddy, G. V. Subba Rao, B. V. R. Chowdari; *Nano-$(V_{1/2}Sb_{1/2}Sn)O_4$: High Capacity, High Rate Anode*

*Material for Li-ion Batteries*, Journal of Materials Chemistry, vol. 21, (Feb. 24, 2011), pp. 10003-100011). The $V_{1/2}Sb_{1/2}SnO_4$ had a relatively poor cycling stability when cycled in a half-cell with lithium as the negative electrode. The cycling stability was better after the oxide particles was milled using high energy ball milling into nano-scaled particles. However, the cycling stability was only demonstrated within 100 cycles. It is questionable if these nanoparticles can be stable over thousands of cycles. Moreover, the $V_{1/2}Sb_{1/2}SnO_4$ has been evaluated at a charge/discharge rate of 3.5 C (about 17 minutes), which is still slow for high rate applications. Here, C is capacity of a battery measured in amp-hour. The rate performance of the $V_{1/2}Sb_{1/2}SnO_4$ at a much higher rate such as 40 C (90 seconds) is questionable. Furthermore, the first irreversible capacity loss is about 1200 mAh/g, which is much higher than the obtained reversible capacity (about 580 mAh/g), which makes it impractical to use $V_{1/2}Sb_{1/2}SnO_4$ directly as the negative electrode active material in a full cell because of the limited source of lithium in a full cell and the difficulty in balancing the amount of positive electrode active material. Furthermore, the high energy ball milling process is not practical for industrial scale production. It is necessary to develop a different process to make $V_{1/2}Sb_{1/2}SnO_4$ nanoparticles that can be easily scaled up.

An energy storage device using a tin oxide-based negative electrode with a cycling stability greater than 5,000 cycles has not been reported. Therefore, a tin oxide-based negative electrode active material providing a good capacity and an excellent cycling stability at a high charge/discharge rate is needed for energy storage devices.

SUMMARY

Described embodiments provide a negative electrode active material for energy storage devices, for example lithium ion capacitors or lithium ion batteries. The active material includes a lithiated nano-architectured tin oxide-based material.

Described embodiments provide an energy storage device that includes a positive electrode including an active material that can store and release ions, a negative electrode including a pre-lithiated nano-architectured negative electrode active material including tin and at least one stress-buffer component, and a non-aqueous electrolyte including lithium. The negative electrode active material is nano-architectured before lithiation.

Described embodiments provide a method of making the lithiated nano-architectured tin oxide-based material.

An energy storage device, fabricated with a negative electrode active material can provide numerous performance improvements. For example, one or more of cycling stability greater than 5,000 cycles with a capacity retention greater than 80%, or high rate charge/discharge capability (e.g., 90 seconds) can be provided.

BRIEF DESCRIPTION OF THE DRAWING FIGURES

Other aspects, features, and advantages of described embodiments will become more fully apparent from the following detailed description, the appended claims, and the accompanying drawings in which like reference numerals identify similar or identical elements.

DETAILED DESCRIPTION

Figure 1:
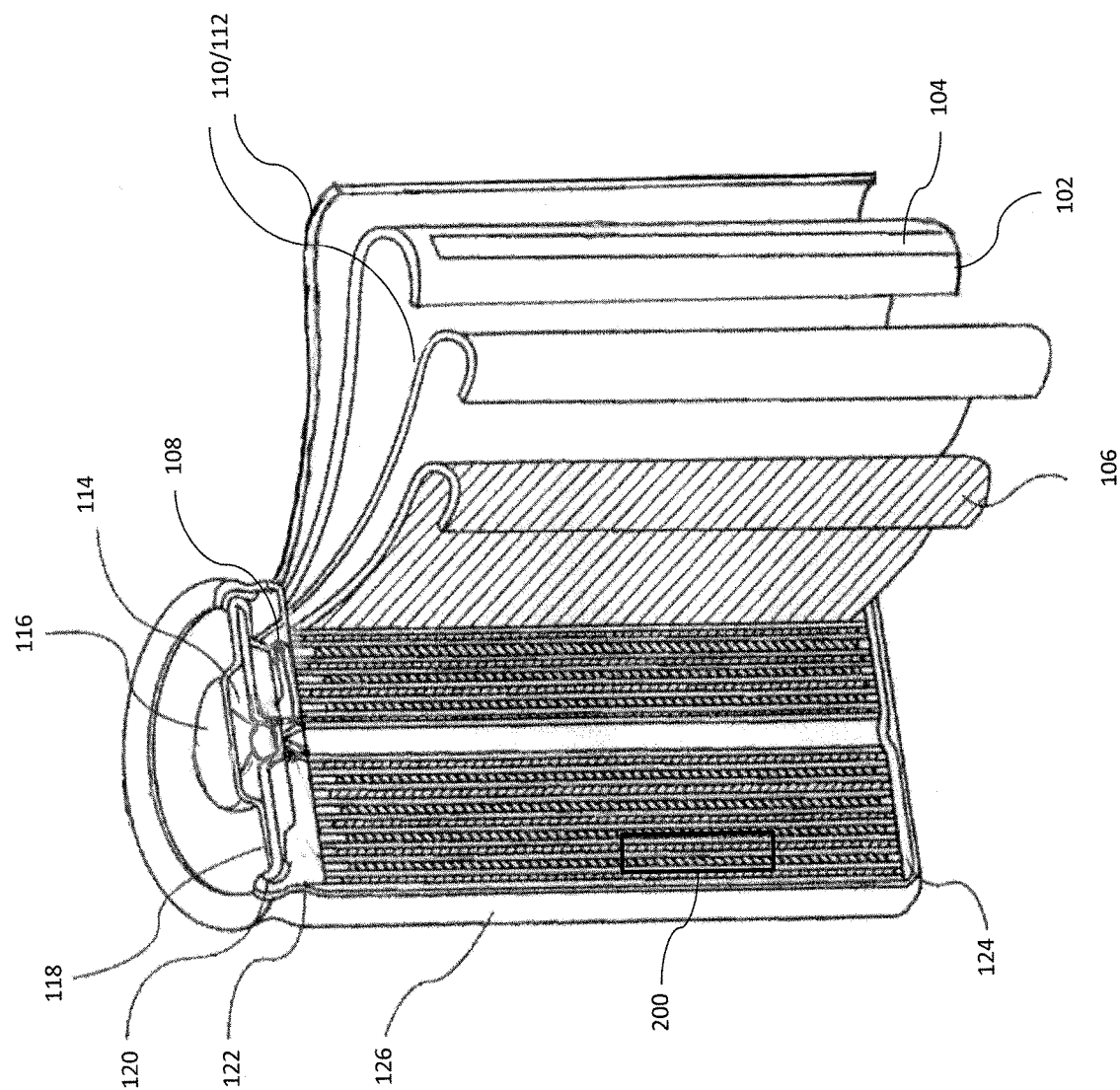
FIG. 1 is a sectional view schematically showing an energy storage device in accordance with exemplary embodiments of the present invention.

Described embodiments relate to pre-lithiated nano-architectured tin oxide-based materials used as negative electrode active materials in energy storage devices to generate high cycling stability and limited capacity loss for the energy storage devices, especially for energy storage devices operated at a high charge/discharge rate. In order to use nano-architectured tin oxide-based materials in the energy storage devices, in the described embodiments, the nano-architectured tin oxide-based materials are subjected to a lithiation treatment prior to performing a function as negative electrode active materials. The lithiation treatment is also sometimes called pre-lithiation since it needs to be carried out before normal operations of the energy storage devices. The normal operations may, for example, be a charging/discharging cycle between 2.5 V to 4.0 V for a lithium ion battery or between 1.5 V and 3.8 V for a lithium ion capacitor. The pre-lithiation may be obtained with any suitable method, for example by an electrochemical process, or by a chemical process as known in the art. As a consequence of the pre-lithiation, the potential of the negative electrode active material is lowered with the reduction of tin oxide into tin or lithiated tin, and lithium oxide. In order to improve the cycling stability and reduce the capacity loss, at least one stress-buffer component is included in the pre-lithiated nano-architectured tin oxide-based materials. The stress-buffer components are electrochemically-inert during cycling and act as a stress-buffer layer for tin particles to absorb or buffer the volume expansion/contraction of the tin particles to avoid the formation of cracks in the electrode film. Furthermore, the tin oxide in the tin oxide-based materials is made into nano-sized particles to avoid formation of cracks in an electrode film during cycling.

Note that herein, the term "lithiated" refers to a state in which an electrode active material is inserted with lithium. The term "pre-lithiated material" refers to a material that is treated with a lithiation process before it is operated as an electrode active material in an energy storage device, as will be further discussed below. The term "nanoparticle" refers to a "particle" with a diameter in a range from about 1-1000 nm. The term "nano-architectured" material means that substantially all particles or at least one component used to form a material having particle diameters in a nanometer (nm) range, for example, from about 1 nm to 1000 nm. Furthermore, the term "carbon onion" refers to carbon quasi-spherical nanoparticles having fullerene-like carbon layers enclosed by concentric graphitic shells. The term "good cycling stability" means that the energy storage devices are stable over 1000 to 5000 cycles; and the term "excellent cycling stability" means that the energy storage devices are stable over 5000 cycles or more. Here, if the energy storage devices are stable over 100,000 cycles or more, a cycle lifetime is defined as unlimited.

The following detailed description utilizes a number of acronyms, which are generally well known in the art. While definitions are typically provided with the first instance of each acronym, for convenience, Table 1 provides a list of the acronyms and abbreviations used along with their respective definitions.

TABLE 1

| | |
|---|---|
| EC/DEC | Ethylene Carbonate/Diethyl Carbonate |
| HPB-45 | a carbonaceous material |
| P2-15 | an activated carbon |
| CEP21k | an activated carbon |
| Super P | a carbon black |
| VXC-72 | a carbon black |
| SBR | Styrene Butadiene Rubber |
| cmc | sodium carboxymethyl cellulose |
| XRD | X-ray diffraction |

Hereinafter, exemplary embodiments are described with reference to the drawing figures.

Energy Storage Devices

Energy storage devices include high rate energy storage devices, i.e., energy storage devices intended for a high charge/discharge rates, and slow rate energy storage devices, i.e., the energy storage devices intended for a slow charge/discharge rate. The high rate energy storage devices are for high rate applications, where the devices need to be either charged, or discharged, or charged/discharged within several minutes; while the slow rate energy storage devices are for slow rate applications, where the devices can be charged and discharged at a slow rate such as tens of hours or days. Further, the energy storage devices include lithium ion capacitors and lithium ion batteries.

Referring to FIG. 1, exemplary energy storage device 100 includes negative electrode 102, negative lead tab 104, positive electrode 106, positive lead tab 108, electrolyte 110, separator 112, safety vent 114, positive electrode cap 116, positive temperature coefficient (PTC) device 118, gasket 120, insulators 122 and 124, and battery housing 126. Although the energy storage device is illustrated as a cylindrical structure, any other shape, such as prismatic, aluminum pouch, or coin type may be used. Numeral 200 represents a minimum functional unit including a layer of negative electrode, a layer of positive electrode and a layer of separator between the negative and positive electrodes. Energy storage device 100 is formed by stacking or winding together several minimum functional units 200 to obtain the desired voltage/current characteristic of completed energy storage device 100. A sectional view of a minimum functional unit is illustrated in FIG. 2 in accordance with exemplary embodiments of the present invention.

Figure 2:
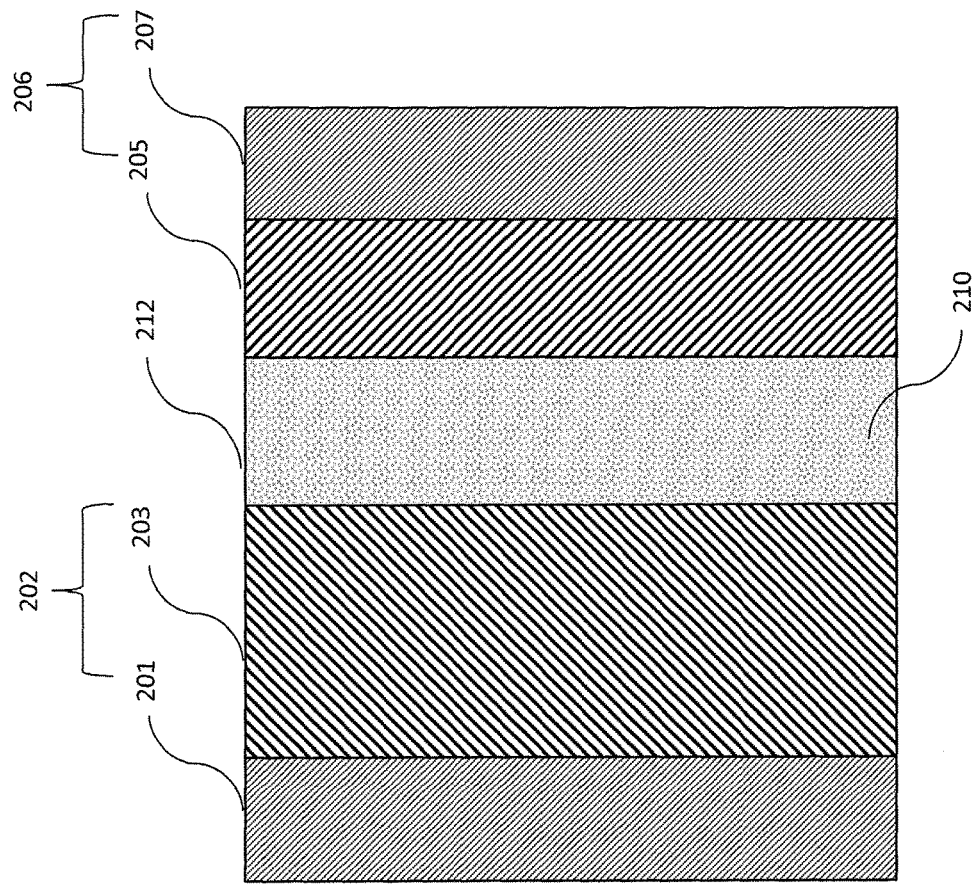
FIG. 2 is a sectional view schematically showing a structure of a portion of the energy storage device of FIG. 1 having a pre-lithiated nano-architectured tin oxide-based material negative electrode in accordance with exemplary embodiments of the present invention.

Referring to FIG. 2, minimum functional unit 200 of the energy storage device in FIG. 1 is shown in more detail. Unit 200 includes negative electrode 202, positive electrode 206, electrolyte 210, and separator 212. Electrolyte 210 is included in separator 212 and contains a non-aqueous lithium salt, such as $LiPF_6$, $LiBF_4$, $LiClO_4$, and LiBOB (lithium bis(oxalato)borate).

Negative electrode 202 may be formed by applying negative electrode material 203 onto one or both surfaces of current collector 201 or made only of negative electrode active material 203.

Current collector 201 is an electrically conductive substrate made of stainless steel, copper, nickel, aluminum, iron, titanium, graphite, carbon black, carbon nanotubes, graphene, conductive polymer, or the like. Copper is preferred because of its good electrical conductivity and good chemical stability. Current collector 201 may be a sheet, plate, foil, mesh, expanded mesh, felt, or foam shape. For example, current collector 201 may be a mesh-type conductive sheet having a mesh formed on a sheet or a foil-type conductive sheet having a foil shape.

Negative electrode material 203 may include negative electrode active material, electrically conductive additive, and polymer binder. Negative electrode active material may be a material capable of reversibly containing lithium ions. Electrically conductive additive such as carbon black is used to improve the electric conductivity of the layer of electrode material to facilitate the electron transport to and from the current collector to the particles of the negative electrode active material. Polymer binder may bind the particles of electrode active material and carbon black together to ensure the good electrical contact among all particles and between the current collector and the electrode material layer. Both the electrically conductive additive and the polymer binder generally are not electrochemically-active during the cycling, so they are not electrode active materials in the electrode material 203. According to the described embodiments, negative electrode material 203 includes a lithiated nano-architectured tin oxide-based material capable of providing sufficient cycling stability and a limited capacity loss for the energy storage devices, especially for the energy storage devices performed at the high charge/discharge rates. The lithiated nano-architectured tin oxide-based material is described in detail below in the section titled Negative Electrode Active Materials.

The lithiated nano-architectured tin oxide-based material in electrode material 203 generally is formed by a lithiation treatment (also referred to as "pre-lithiation") of a nano-architectured tin oxide-based material during manufacture and before energy storage device 100 is completed. Here, the completion of the energy storage device means that the device is ready to perform normal functions. To distinguish the negative electrode materials treated with the lithiation process from conventional negative electrode materials that are lithiated when a conventional energy storage device is charged, the negative electrode materials treated with the lithiation process are called pre-lithiated materials in the described embodiments of the present invention. For the conventional negative electrode materials, no lithiation treatment is performed before they function as the negative electrode materials in the conventional energy storage device. The lithiation treatment may be performed before or after forming negative electrode 202. Lithiation inserts lithium into the negative electrode active material in negative electrode material 203 to reduce an otherwise unacceptably large irreversible capacity loss before negative electrode 202 is cycled against positive electrode 206 in energy storage device 100. The lithiation treatment is described below in detail in the section titled Pre-Lithiation and Pre-Lithiation Process Examples.

Negative electrode 202 may be fabricated for the high rate applications including the high rate lithium ion capacitor and lithium ion battery and slow rate applications including the lithium air battery. Negative electrode 202 may also be fabricated for a lithium sulfur battery that can be used for high rate or slow rate applications.

Positive electrode 206 includes current collector 205 and positive electrode material 207 and may be fabricated for the high rate applications. Current collector 205 is preferably made from aluminum even if other electric conductive substances are used. Positive electrode 206 is formed by applying positive electrode material 207 onto one surface or both surfaces (not shown) of current collector 205 or is made only of positive electrode material 207. Here, positive electrode material 207 may include a positive electrode active material, an electrically conductive additive such as carbon black, and a polymer binder. The positive electrode active material may be a carbonaceous material with high specific surface area. The positive electrode active material may be any existing or prospective positive electrode materials known in the art.

To perform well at the high charge/discharge rates, a mass ratio of electrode active materials at negative electrode 202 to positive electrode 206 should be based on the high rate performance of the two electrodes. It is preferred that both electrodes perform similarly at high rates. Here, the mass ratio means the weight ratio. The mass ratio may be varied by applying different amounts of mass loadings of the electrode active materials on the current collectors at the negative and the positive electrodes. For the lithium ion capacitor with an activated carbon as the positive electrode active material, the mass ratio of the electrode active materials between negative electrode material 203 and positive electrode material 207 may be about 1/5 or less for the lithium ion capacitor, when operated at a slow charge/discharge rate. A carbonaceous material such as activated carbon may have a specific capacity about 100 F/g (or 36 mAh/g for 1.3 voltage range) at a slow rate. A negative electrode material can have a specific capacity>200 mAh/g at a slow rate. The optimal mass ratio may be about 1/5 or less for a slow rate application. The mass ratio of the electrode active materials between negative electrode material 203 and positive electrode material 207 may be greater than 1/5 for the energy storage device performing at a high charge/discharge rate, more preferably about 1/3 to 3/1, even more preferably 1/2 to 2/1, and even more preferably about 1/1. For a lithium ion battery with an intercalation positive electrode material, the mass ratio of the electrode active materials between negative electrode material 203 and positive electrode material 207 may be greater than about 1/3 for the energy storage device performing at the high charge/discharge rate and about 1/3 or less for slow rate applications considering the expected higher capacity from the intercalation material as compared to an activated carbon. The intercalation is one exemplary process of lithium insertion into an electrode active material.

Furthermore, the mass ratio of the electrode materials may be adjusted to meet the requirement for the cycling stability. For a negative electrode using tin oxide-based negative electrode materials, lithium forms a lithiated tin alloy with tin during a lithium insertion process, and the lithium separates from the lithiated tin alloy during the lithium extraction process. The insertion and extraction of the lithium result in a large volume change of tin particles. Since the extent of lithium insertion or extraction is determined by the cycling voltage of the negative electrode, a narrower range of cycling voltage change may result in a smaller volume change of the tin particles, as described by Beaulieu et al. (L. Y. Beaulieu, S. D. Beattie, T. D. Hatchard, and J. R. Dahn, The Electrochemical Reaction of Lithium with Tin Studied by *In Situ AFM*, *Journal of The Electrochemical Society*, vol. 150, no. 4, (Feb. 25, 2003), pp. A419-A424). Thus, the small volume change of the tin particles may result in an enhanced cycling stability. Therefore, a long cycling stability may be expected for a large mass ratio since the negative electrode may be cycled in a narrow voltage range. A too large mass ratio may, however, affect the high rate performance since the negative electrode film containing the electrode active material will become too thick, which may result in a rapid decrease in high rate capacity because of the increased resistance of ions transporting inside the electrode film. For the high rate applications, it is preferable to have the mass ratio about 1/3 to 3/1, even more preferably 1/2 to 2/1, and even more preferably about 1/1 in consideration of both high rate performance and cycling stability.

Positive Electrode Active Materials

Referring to FIG. 2, as described above, positive electrode material 207 includes positive electrode active material, electrically conductive additive, and polymer binder. Positive electrode active material may be a material capable of reversibly containing ions. Electrically conductive additive and polymer binder may improve the electrical conductivity of the electrode material layer and are generally not electrochemically-active during cycling.

The positive electrode active material may be a carbonaceous material with a high specific surface area that stores ions through an adsorption/de-sorption process. The specific surface area is preferred to be greater than 100 $m^2/g$, preferably between 1000 $m^2/g$ and 3500 $m^2/g$. The positive electrode active material includes activated carbon, carbon nanotubes, graphene, carbon black, carbon nanoparticles, and carbon nanocrystals.

The positive electrode active material may be a material that can store/release lithium ions through an intercalation/de-intercalation process, which may be selected from, but not limited to the existing cathode materials for the lithium ion battery. The positive electrode active material may be selected from $LiFePO_4$, $LiMn_2O_4$, $LiMnO_2$, $LiNiO_2$, $LiCoO_2$, $LiMn_{0.5}Ni_{0.5}O_2$, $LiCo_{1/3}Ni_{1/3}Mn_{1/3}O_2$, $xLi_2MnO_3 \cdot (1-x)LiMO_2$ ($0 \leq x \leq 1$; M: Mn, Co, Ni), $LiV_3O_8$, and $LiVPO_4F$. It may also include a non-lithiated material having $FePO_4$, $V_2O_5$, or $MnO_2$.

In at least one embodiment, the positive electrode active material includes sulfur, which stores lithium by forming lithium sulfur species. A carbon-sulfur composite is generally used to ensure good electrical conductivity of the electrode film.

In at least one embodiment, the positive electrode active material includes at least one air catalyst that can catalyze either the reduction process of oxygen, or the oxidation process of oxide, or both.

In at least one embodiment, the positive electrode active material includes a metal fluoride that interacts with lithium ions through a conversion reaction.

For high rate applications, the positive electrode material layer is preferred to be thin so that ions can transport in the porous layer quickly. Too thin electrode material layer, however, may limit the energy density of a device because of the limited amount of electrode active material. Preferably, the porous carbon layer may have a thickness in a range of about 10 μm to 100 μm for a high rate lithium ion capacitor.

Separator

Referring to FIG. 2, as described above, separator 212 includes a porous membrane that electrically separates the negative electrode from the positive electrode, while permitting ions to flow across the separator. The separator may be selected from nonwoven fibers (e.g., nylon, cotton, polyesters, glass), polymer films (e.g., polyethylene (PE), polypropylene (PP), poly(tetrafluoroethylene) (PTFE), Polyvinylidene fluoride (PVDF), and poly(vinyl chloride) (PVC)), cellulose fibers, and naturally occurring substances (e.g., rubber, asbestos, wood, and sand).

Electrolyte

Referring to FIG. 2, electrolyte 210 may be a lithium-ion salt solution which is combined with other organic components. The lithium-ion salt may include lithium hexafluoro phosphate ($LiPF_6$), lithium tetrafluoroborate ($LiBF_4$), lithium perchlorate ($LiClO_4$), and lithium bis(oxalato)borate (LiBOB), but are not limited thereto. In one exemplary embodiment, electrolyte 106 includes an organic solvent and a lithium ionic salt. The organic solvent dissolves the lithium ionic salt forming the lithium-ion salt solution that is stable against the reduction of lithium. This organic solvent may also be used in the electrolyte for lithiating the negative electrode material 203 or tin oxides included in negative electrode material 203. Compared to graphite, the tin-based materials have a broader choice of solvents. When a graphite is used, solvents such as propylene carbonate (PC) cannot be used since the solvent molecules can enter into the graphite layered structure to cause the capacity fading. For tin-based materials, the solvent molecules are not expected to enter into the metals (e.g. tin) or metal oxides's particles. Examples of suitable organic solvents may be hexane, tetrahydrofuran (THF), propylene carbonate (PC), ethylene carbonate (EC), diethyl carbonate (DEC), and dimethyl carbonate (DMC), but are not limited thereto.

Negative Electrode Active Materials

Referring to FIG. 2, as described above, negative electrode material 203 includes an electrode active material, which is a lithiated (also referred to as "pre-lithiated") nano-architectured tin oxide-based material having at least one stress-buffer component. The pre-lithiated nano-architectured tin oxide-based material is a pre-lithiated nano-architectured tin oxide-based mixed oxide. Depending on the selected stress-buffer components, various tin oxide-based mixed oxides may be formed.

In the described embodiments, the nano-architectured tin oxide-based material includes tin oxide, $SnO_z$, where $0<z\leq2$, with an average primary particle size in a range from several nanometers to hundreds of nanometers before lithiation. Specifically, the particle size of the $SnO_z$ is in the range of 1-1000 nm inclusive, preferably 5-500 nm inclusive, more preferably 5-100 nm inclusive. Smaller particle sizes of $SnO_z$ are preferred for obtaining better cycling stability.

In one exemplary embodiment, the nano-architectured tin oxide-based material includes a nano-architectured vanadium/antimony/tin mixed oxide (hereinafter "V/Sb/Sn mixed oxide"). The V/Sb/Sn mixed oxide has a formula $V_xSb_ySnO_z$, where x and y are in a range of 0.01 to 2.0 inclusive (i.e., $0.01\leq x\leq2.0$; $0.01\leq y\leq2.0$) and z is defined in terms of x and y and follows a relation of $0<z\leq(5x+3y+4)/2$. Molar ratios of vanadium/tin (V/Sn) and antimony/tin (Sb/Sn) in the V/Sb/Sn mixed oxide are in a range of 0.01 to 2.0 inclusive, preferably 0.1 to 1.0 inclusive for sufficient capacity and cycling stability of the tin oxide. Here, the vanadium and antimony in the V/Sb/Sn mixed oxide act as stress-buffer components for the tin oxide to improve the cycling stability of the tin oxide. The V/Sb/Sn mixed oxide is subjected to a lithiation treatment to limit the first irreversible capacity loss so that it may be used in a full cell of an energy storage device including a lithium ion capacitor and a lithium ion battery. After lithiation, the lithiated nano-architectured tin oxide-based material may include lithium oxide, lithiated antimony (i.e. lithium antimony alloy), vanadium oxide, and tin or lithiated tin (i.e., lithium tin alloy).

The V/Sb/Sn mixed oxides may be produced by a solid state process and a wet chemistry process. The V/Sb/Sn mixed oxides may also be made by other processes or methods known in the art. The solid state process and wet chemistry process are exemplary processes used in the described embodiments to make the V/Sb/Sn mixed oxides, which are described in detail below in the section titled Solid-State Process and Organic Base-Assisted Sol-Gel Process.

The solid state process mixes tin oxide ($SnO_2$) nanoparticles with an antimony source $Sb_2O_3$ and a vanadium source $NH_4VO_3$ and heats the mixture to a processing temperature. Here, vanadium and antimony oxides act as the stress-buffer components.

The V/Sb/Sn mixed oxides obtained through the solid state process may be coated with carbon to form carbon-coated V/Sb/Sn mixed oxides. The carbon coating may be formed by thermally decomposing an organic compound, such as sucrose, in an inert environment. Examples of suitable organic compounds include citric acid, sucrose, or any polymer, but are not limited thereto. The carbon coating may be amorphous, semi-crystalline, or crystalline with an irregular morphology. The amount of the carbon coating may be in a range of 1 wt % to 50 wt %. Insufficient carbon coating may not improve the cycling stability significantly, while excessive carbon coating may reduce the specific capacity of the mixed oxides. The carbon coating may act as a stress-buffer layer and as an electrically conductive layer to facilitate electron transport to and from the tin particles.

By studying the effects of Sb and V on the cycling stability and rate capability of the V/Sb/Sn mixed oxides, it is found that the V may not improve the rate capability or cycling stability of the $SnO_2$ when it is used without Sb. The incorporation of the Sb without V does improve the cycling stability of the $SnO_2$ even though it still decays quickly within 50 cycles. However, the incorporation of a small amount of the V (e.g., a molar ratio of V/Sb=0.125) may greatly improve the cycling stability of $Sb_{1/2}SnO_{11/4}$. The use of small amount of vanadium oxide is attractive since vanadium oxide can be costly and large amounts of vanadium oxide might reduce the capacity of the negative electrode material because it is electrochemically-inert.

The V/Sb/Sn mixed oxide made from the wet chemistry process such as an organic base-assisted sol-gel process starts with water or ethanol soluble metal salts including at least one tin salt, for example, tin chloride, to form a tin oxide-carbon based composite. The organic base may act as a gelation agent to induce the gel formation of tin oxide and a carbon source for carbon coating. Materials made from the organic base-assisted sol-gel process are expected to be more homogeneous than those made from a conventional process such as a co-precipitation process. A carbon-coated tin oxide based composite including metal mixed oxides may be produced by the organic base-assisted sol-gel process. Nano-architectured V/Sb/Sn mixed oxide may be obtained by further heating the carbon-coated oxide based composite in air at a temperature of about 450° C. or above so that the carbon coating may be removed. An exemplary V/Sb/Sn mixed oxide is a nano-architectured $V_{1/2}Sb_{1/}$ $_2SnO_4$. A full cell made from a pre-lithiated nano-architectured $V_{1/2}Sb_{1/2}SnO_4$ as the negative electrode material performs excellent cycling stability and low capacity loss over 90,000 cycles at a high charge/discharge rate.

In one exemplary embodiment, a carbon-coated tin oxide-HPB-45 composite is formed by the propylene oxide-assisted sol-gel process, in which a carbonaceous material such as HPB-45 is used as carbon source. Suitable vendors of HPB-45 include Nippon Carbon Co. of Tokyo, Japan.

The carbon coated tin oxide-HPB-45 composite provides a desired level of cycling stability in a half cell. Capacity retention may be as high as 91% after 100 cycles when the carbon coated tin oxide-HPB-45 composite is cycled between 0.1V and 1.0V. The cycling stability is even better if the carbon coated tin oxide-HPB-45 composite is cycled in a narrower range such as 0.2V to 0.6V since the volume change of the tin particles will be smaller with a narrower voltage range. The good cycling stability of the carbon coated tin oxide-HPB-45 composite is obtained since the presence of both the carbon coating and HPB-45 may act as the stress-buffer component and help release volume change stress of the tin particles during cycling. The cycling stability of the carbon coated tin oxide-HPB-45 composite is further improved by adding at least one more stress-buffer component. For example, the addition of vanadium oxide alone greatly improves the cycling stability of the carbon-coated tin oxide-HPB-45 composite. The capacity retention is about 95% after 100 cycles. This is interesting since the vanadium oxide alone may not improve the cycling stability of a pure tin oxide as described in the solid state process. The cycling stability is even better with the addition of antimony in the tin oxide-carbon composite in the propylene oxide-assisted sol-gel process. The capacity retention is about 98% after 100 cycles with the addition of both vanadium oxide and antimony. The antimony in the carbon coated tin oxide-HPB-45 composite may exist in its elemental state because of the reducing environment during the heating process as described above.

In alternative exemplary embodiments, the HPB-45 in the carbon coated tin oxide-HPB-45 composite may be replaced by other carbonaceous materials. The carbonaceous materials have negligible volume change during the cycling and have good electrical conductivities. Examples of suitable carbonaceous materials includes graphite, hard carbon, soft carbon, amorphous carbon coated graphite, amorphous carbon coated hard carbon, carbon black, carbon nanofibers, carbon nanotubes, graphene, carbon nanoparticles, carbon onion, crystalline carbon, semi-crystalline carbon, amorphous carbon and the like, but are not limited thereto. These carbonaceous materials are generally formed in a separate process before forming the tin oxide-carbon composite.

The carbon coating in the carbon coated tin oxide-HPB-45 composite may be in-situ formed during a thermal carbonization process of the tin oxide-carbon composite. The carbon coating may be amorphous or have crystallinity to various extents.

Carbon in both the carbonaceous material and the carbon coating may act as a stress-buffer component in the carbon coated tin oxide-carbon composites like the vanadium and antimony. The carbonaceous materials also facilitate electron transport to and from the tin particles since the carbon generally has a good electrical conductivity. To improve the cycling stability, the amount of the carbon may be in the range of about 1 wt % to 90 wt %, or more preferably in the range of about 1 wt % to 50 wt %. The improvement in cycling stability may not be clear with too little carbon, while the capacity of the composite may be limited with too much carbon because of the limited capacity of the carbon.

Besides the vanadium, antimony, and carbonaceous materials, other stress-reducing components may also be added to the tin oxide-based composites. These components are electrochemically-inert during the cycling and act as the stress-buffer layers for the tin nanoparticles after a lithiation process. Suitable stress-buffer components are discussed in the section titled Stress-Buffer Components.

Depending on the stress-buffer components, various carbon coated tin oxide-carbon based materials may be produced by the organic base-assisted sol-gel process. For example, the tin oxide-carbon based composites may be a vanadium oxide and antimony oxide or antimony-included tin oxide-carbon based composite (i.e., V/Sb/Sn mixed oxide) when both vanadium and antimony are added in the tin oxide-carbon based composite. The molar ratio of vanadium/tin or antimony/tin in the V/Sb/Sn mixed oxide may be in a range of 0.01 to 2.0 inclusive, preferably 0.1 to 1.0 inclusive. The antimony may exist as elemental antimony or as an antimony oxide in the tin oxide-carbon based composite. In another example, the tin oxide-carbon based composite may be an iron oxide-included tin oxide-carbon based composite (i.e., Fe/Sn mixed oxide) when iron is added in the tin oxide-carbon based composite. The iron in the Fe/Sn mixed oxide may exist as an iron oxide. The molar ratio of iron/tin in the Fe/Sn mixed oxide may be in a range of 0.01 to 2.0 inclusive, preferably 0.1 to 1.0 inclusive.

The carbon-coated tin oxide-carbon composite may also incorporate at least one more electrochemically-active component to enhance its performance or lower its cost. For example, zinc oxide may be used because of its low cost and good capacity. Similar to the tin oxide, zinc oxide is reduced into zinc and lithium oxide during the first lithium insertion process Zinc may form an alloy with lithium (e.g., LiZn) during a lithium insertion process and the alloy may be separated back into lithium ions and zinc (e.g., "de-alloy") during a lithium extraction process. Examples of suitable metals or metal oxides incorporated with the tin oxide-carbon composite to enhance the capacity of the tin oxide-carbon composite include, but are not limited to, silicon, $SiO_x$ (e.g., $0 \leq x < 2$), germanium, germanium oxide, or the like.

Stress-Buffer Components

A stress-buffer component generally is a component that is stable during charge/discharge cycling. It may be electrochemically-inert or experience a different volume change profile to tin during cycling. It can absorb or buffer the volume change stress of tin particles during the cycling and help maintain the structural integrity of an electrode. The lithiated V/Sb/Sn mixed oxide may include three stress-buffer components, which are lithium oxide (e.g., $Li_2O$), vanadium oxide, and lithiated antimony. The lithium oxide may be formed during the first lithiation (or lithium insertion) process of tin oxide. The generated lithium oxide may then act as a stress-buffer component since the lithium oxide is not electrochemically-active under cycling conditions (e.g., <1V vs. $Li/Li^+$, (hereinafter, $Li/Li^+$ refers to $Li/Li^+$ redox potential)). The vanadium (V) oxide (e.g., $V_2O_5$) may be reduced into vanadium (II) oxide or vanadium (III) oxide during the first lithiation process. The reduced vanadium oxide may be electrochemically-inert and act as an electrically conductive buffer component for the tin particles. The antimony oxide may be reduced into lithiated antimony (e.g., Li—Sb alloys) and lithium oxide during the first lithitation process. The lithiated antimony may be electrochemically-inert and act as another stress-buffer component for the tin particles. Regarding the V/Sb/Sn mixed oxide/carbon composite, there may be one more stress-buffer component that is a carbonaceous material.

With similar concepts, it is possible to develop other tin oxide-based materials with good rate and cycling stability by adding one or more stress-buffer components into the tin oxide. The additional one or more stress-buffer components may be metals, metal oxides, metal phosphates, metal nitrides, and carbonaceous materials. The additional one or more stress-buffer components may be electrochemical-inert during the cycling.

Examples of suitable stress-buffer components are vanadium, antimony, manganese, iron, copper, titanium, zirconium, cobalt, aluminum, nickel, bismuth, their oxides, metal phosphates, their nitrides, and mixtures thereof.

Examples of suitable carbonaceous materials are graphite, hard carbon, soft carbon, amorphous carbon coated graphite, amorphous carbon coated hard carbon, carbon black, carbon nanofibers, carbon nanotubes, graphene, carbon nanoparticles, carbon with onion-like structure, crystalline carbon, semi-crystalline carbon, amorphous carbon, and mixtures thereof.

Pre-Lithiation and Pre-Lithiation Process Examples

The tin oxide-based materials have a large irreversible capacity loss during the first discharge/charge process. Part of the irreversible capacity loss comes from lithium oxide formation during the first lithiation process. The irreversible loss for the V/Sb/Sn mixed oxide might be even larger considering the reduction of vanadium oxide and antimony oxide and the formation of a solid-electrolyte interface (SEI) layer. Thus, the tin oxide-based materials as prepared might not be feasible for use in energy storage devices directly. A lithiation treatment must be pre-applied to the tin oxide-based materials to limit the irreversible capacity loss during the first charge/discharge process.

The lithiation treatment may be performed electro-chemically or chemically.

Figure 3:
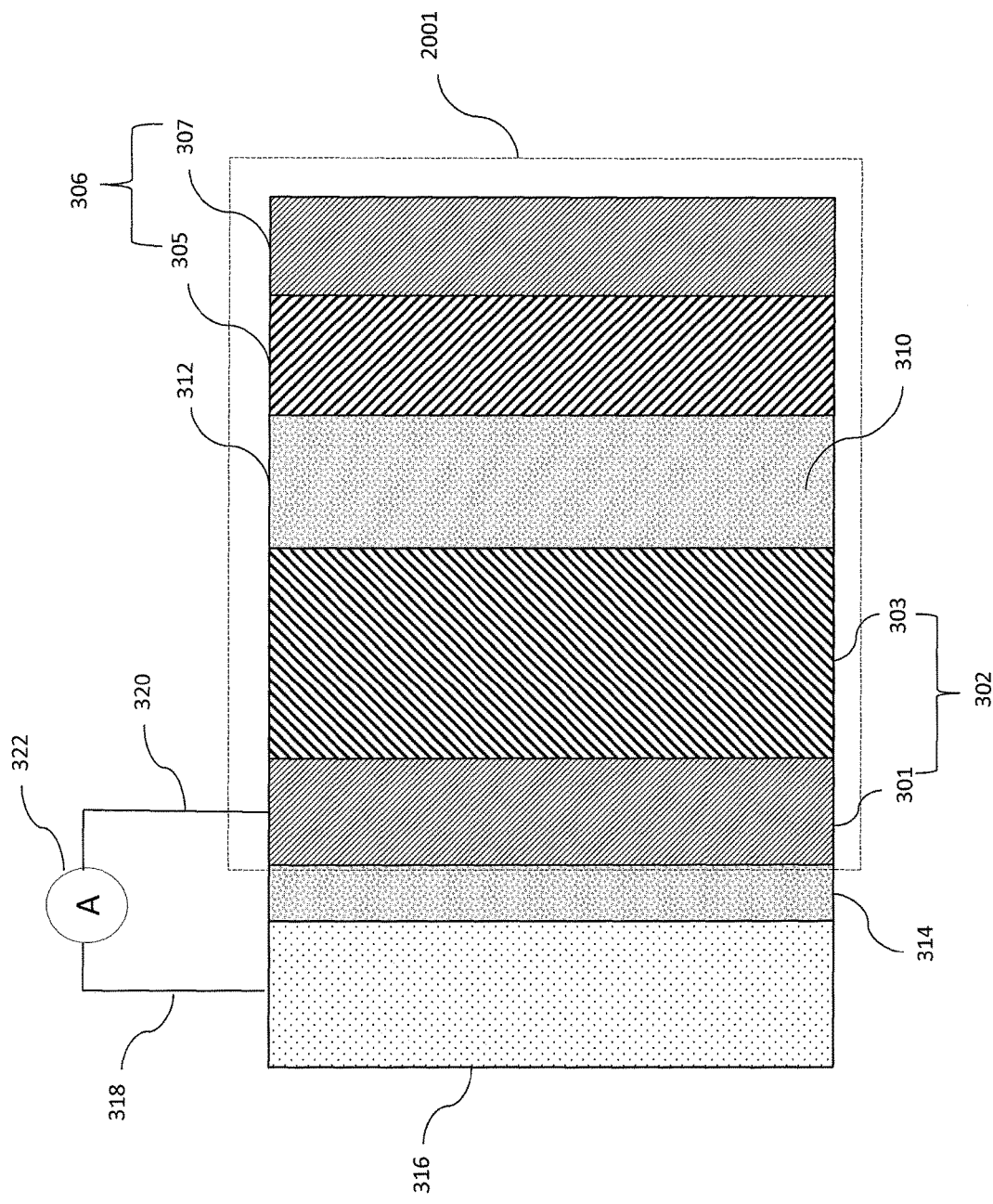
FIG. 3 is a sectional view schematically showing a precursor cell structure formed for electro-chemically lithiating the negative electrode shown in FIG. 2 in accordance with exemplary embodiments of the present invention.

FIG. 3 is a sectional view schematically showing a precursor cell structure formed for electro-chemically lithiating the negative electrode shown in FIG. 2 in accordance with exemplary embodiments of the present invention.

Referring to FIG. 3, precursor cell 300 includes minimum functional unit 2001 having negative electrode 302, positive electrode 306, electrolyte 310, separator 312, second separator 314, lithium metal strip 316, two tabs 318, 320, and optional component 322. Negative electrode 302 includes current collector 301 with openings and negative electrode material 303. The openings in collector 301 may be through holes through which ions can pass. Positive electrode 306 includes current collector 305 and positive electrode material 307. Two tabs 318, 320 are connected to negative electrode 302 and lithium metal strip 316, respectively, forming a cell having two electrodes for electro-chemically lithiating negative electrode 302. The thickness of lithium metal strip 316 may vary. Negative electrode 302 is lithiated by shorting together negative electrode 302 with lithium metal strip 316. Second separator 314 located between negative electrode 302 and lithium metal strip 316 contains an electrolyte used for transport of lithium ions from lithium metal strip 316 to negative electrode 302. Electrolyte 310 may be the same as electrolyte 210 used in minimum functional unit 200, as shown in FIG. 2. The electrolyte may be other electrolytes including a lithium salt known in the art. Precursor cell 300 may be shorted together by clipping two tabs 318, 320 together for a period of time, for example 20 days for the process to be finished. The lithiation process may be made safer by connecting negative electrode 302 to lithium metal strip 316 through a third component that can provide either voltage or current or resistance to control the lithiation process, herein optional component 322. Optional component 322 may be a battery testing instrument such as a BT2000 from Arbin Instrument of College Station, Tex. In FIG. 3, optional component 322 is an ammeter represented by "A" that is placed in a path between negative electrode 302 and lithium metal strip 316. As shown in FIG. 3, the current may be monitored by the ammeter 322. Because of the differential of potentials of the metallic lithium and negative electrode 302, negative electrode 302 has a tendency to be discharged to reach the same potential as the metallic lithium. In the meantime, lithium ions from negative electrolyte 302 are diffused through the openings in current collector 301 and inserted into negative electrode material 303.

In alternative electro-chemical lithiation processes, lithium particles or lithium nanoparticles are embedded in electrode material 303 or particles of negative electrode material 303 are coated with a thin layer of lithium. Once soaked in an electrolyte including a lithium salt, the particles of the nano-architectured negative active material in negative electrode material 303 may be self-discharged and lithiated.

Current collector 301 of negative electrode 302 may be included when executing the electro-chemical lithiation of negative electrode 302. However, current collector 301 should not be lithiated.

Figure 4:
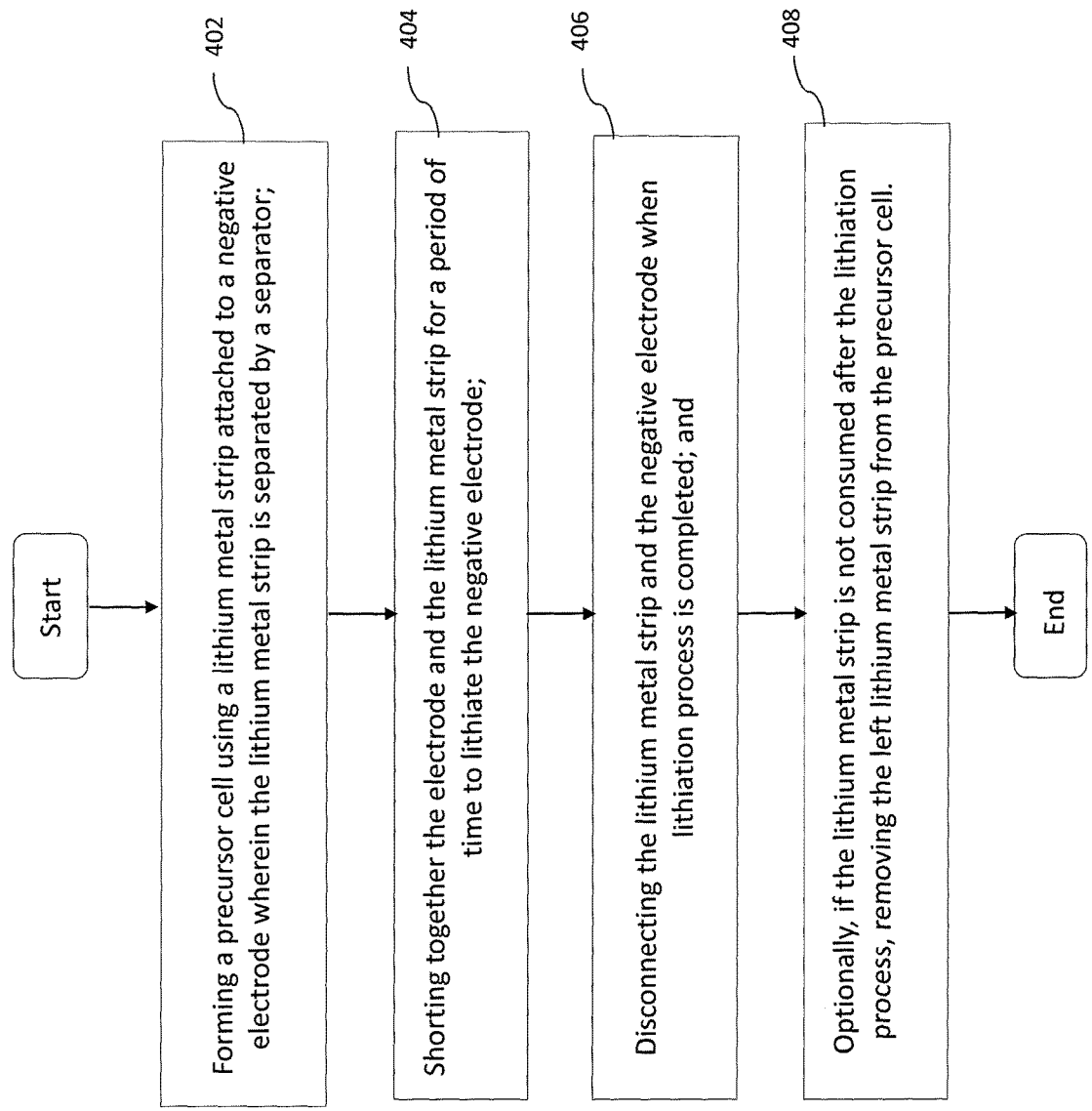
FIG. 4 is a flowchart showing an electro-chemical lithiation process to lithiate a nano-architectured tin-oxide-based mixed oxide electrode material shown in FIG. 3 in accordance with exemplary embodiments of the present invention.

FIG. 4 is a flowchart showing an electro-chemical lithiation process to lithiate a nano-architectured tin oxide-based material shown in FIG. 3 in accordance with exemplary embodiments of the present invention.

As shown, lithiation process 400 starts from forming a precursor cell for lithiating the negative electrode. At step 402, precursor cell 300 is formed using lithium metal strip 316 attached to negative electrode 302, wherein lithium metal strip 316 is separated by second separator 314. At step 404, negative electrode 302 is lithiated by shorting together negative electrode 302 with lithium metal strip 316 for a period of time, for example 20 days. At step 406, negative electrode 302 and lithium metal strip 316 are disconnected when the lithiation process is completed. In some cases, lithium metal strip 316 may be consumed after the lithiation process. However, if lithium metal strip 316 is not consumed, at step 408, optionally, lithium metal strip 316 may be removed from precursor cell 300 and negative electrode 302 is ready for an energy storage device assembly.

Alternatively, a chemical lithiation may be applied to the tin oxide-based materials. In the chemical lithiation, nano-architectured tin oxide-based mixed oxide electrode materials are soaked in an organic solution including a lithiation agent to reduce tin oxide into tin and lithium oxide chemically. Examples of suitable lithiation agents include lithium paphthalene, normal (N-), secondary (sec-), or tertiary (ter-) butyl lithium, but are not limited thereto. The lithiation agents also include any other solvents that are stable against a strong reducing agent as the lithiation agent. Organic solvents used to form the organic solution for the chemical lithiation include hexane, tetrahydrofuran (THF), propylene carbonate (PC), ethylene carbonate (EC), diethyl carbonate (DEC), dimethyl carbonate (DMC), and the like, but are not limited thereto.

Figure 5:
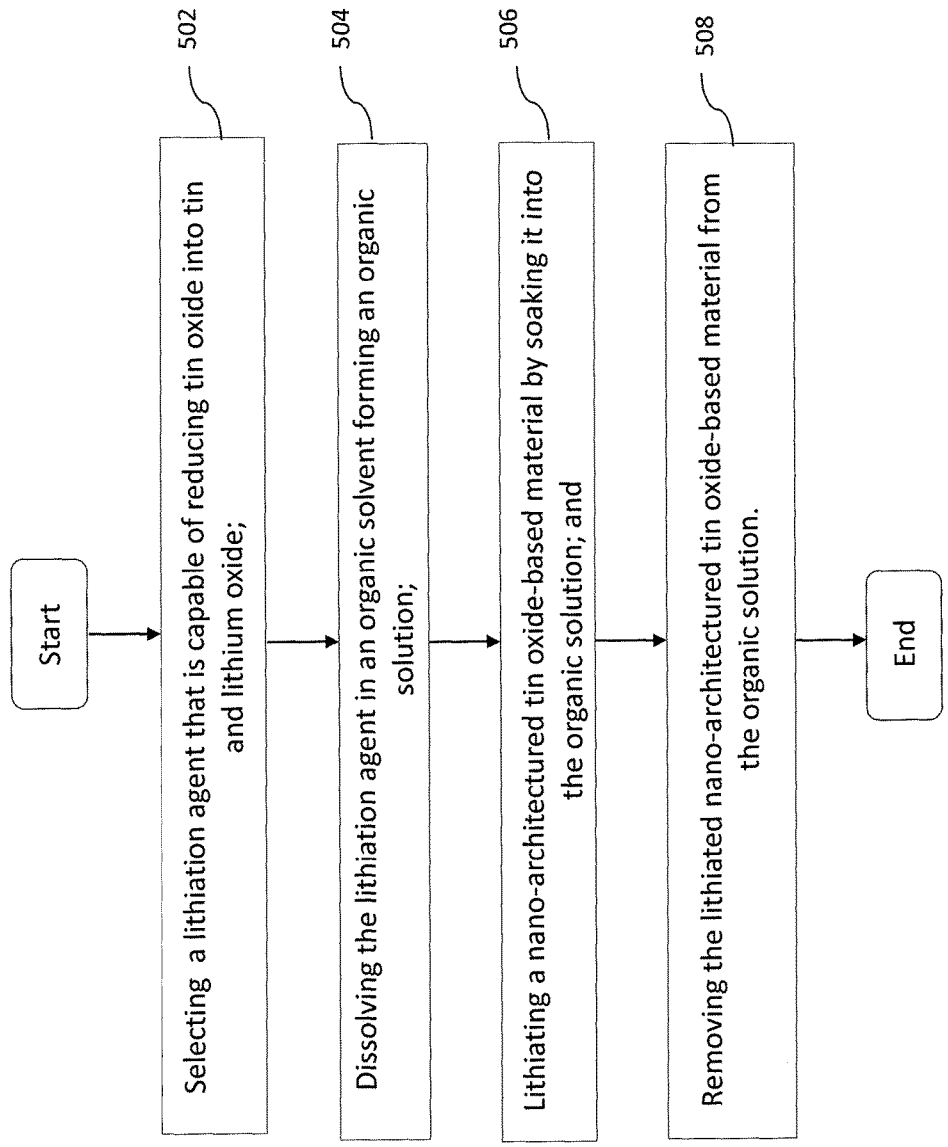
FIG. 5 is a flowchart showing a chemical lithiation process to lithiate a nano-architectured tin-oxide-based mixed oxide electrode material in accordance with exemplary embodiments of the present invention.

FIG. 5 is a flowchart showing a chemical lithiation process to lithiate a nano-architectured tin-oxide-based mixed oxide electrode material in accordance with exemplary embodiments of the present invention.

As shown, at step 502, a lithiation agent that may reduce a tin oxide into tin and a lithium oxide chemically is selected. Examples of suitable lithiation agents may be lithium paphthalene, normal (N-), secondary (sec-), or tertiary (ter-)butyl lithium, but are not limited thereto. The lithiation agents may also include any other solvents that are stable against a strong reducing agent such as the lithiation agent. At step 504, an organic solution is formed by dissolving the lithiation agent into an organic solvent. The organic solvent used to form the organic solution for the chemical lithiation process may be hexane, tetrahydrofuran (THF), propylene carbonate (PC), ethylene carbonate (EC), diethyl carbonate (DEC), dimethyl carbonate (DMC), and the like. At step 506, the nano-architectured tin oxide-based material is lithiated by soaking the nano-architectured tin oxide-based material in the organic solution containing the lithiation agent to reduce the tin oxide into tin and the lithium oxide. At step 508, the lithiated nano-architectured tin oxide-based material is removed from the organic solution.

After the lithiation treatment, the lithiated nano-architectured tin-oxide-based material includes $Li_xSn$, where $0 \leq x \leq 4.4$, and lithium oxide that are generated by the lithiation treatment. The average particle size of lithiated tin particles in the lithiated nano-architectured tin oxide-based material is in a range from 1 nm to 1000 nm, preferably from 2 nm to 500 nm inclusive, even more preferably 5 nm to 300 nm inclusive, even more preferably 5 nm to 200 nm inclusive, even more preferably 5 nm to 100 nm inclusive. The tin-oxide-based material is nano-architectured before the lithiation treatment.

Cycling Stability of a Full Cell

In one exemplary embodiment, a lithium ion capacitor is fabricated with a lithiated nano-architectured tin oxide-based material, e.g., a $V_{1/2}Sb_{1/2}Sn$ mixed oxide/HPB-45 composite (about 20 wt % HPB-45) as a negative electrode material, activated carbon P2-15 as a positive electrode material, and one mole of $LiPF_6$ in ethylene carbonate/diethyl carbonate (EC/DEC) (e.g., 1/1 volume ratio) as an electrolyte. Suitable vendors of the activated carbon P2-15 include EnerG2 of Seattle, Wash. The fabricated lithium ion capacitor is cycled for at least 140,000 cycles under fast charge/discharge rates, for example, a charge/discharge rate is within tens of seconds per cycle. A negligible capacity loss is observed with cycling over 140,000 cycles under this charge/discharge rate.

In another exemplary embodiment, a lithium ion battery is made from a commercial $LiMn_2O_4$ as a positive electrode material, lithiated nano-architectured $V_{1/2}Sb_{1/2}SnO_4$ nanoparticles as a negative electrode material, and one mole of $LiPF_6$ in the EC/DEC as the electrolyte. The lithium ion battery is cycled for over 20,000 cycles under a high charge/discharge rate without any significant capacity loss.

Solid State Process

Figure 6:
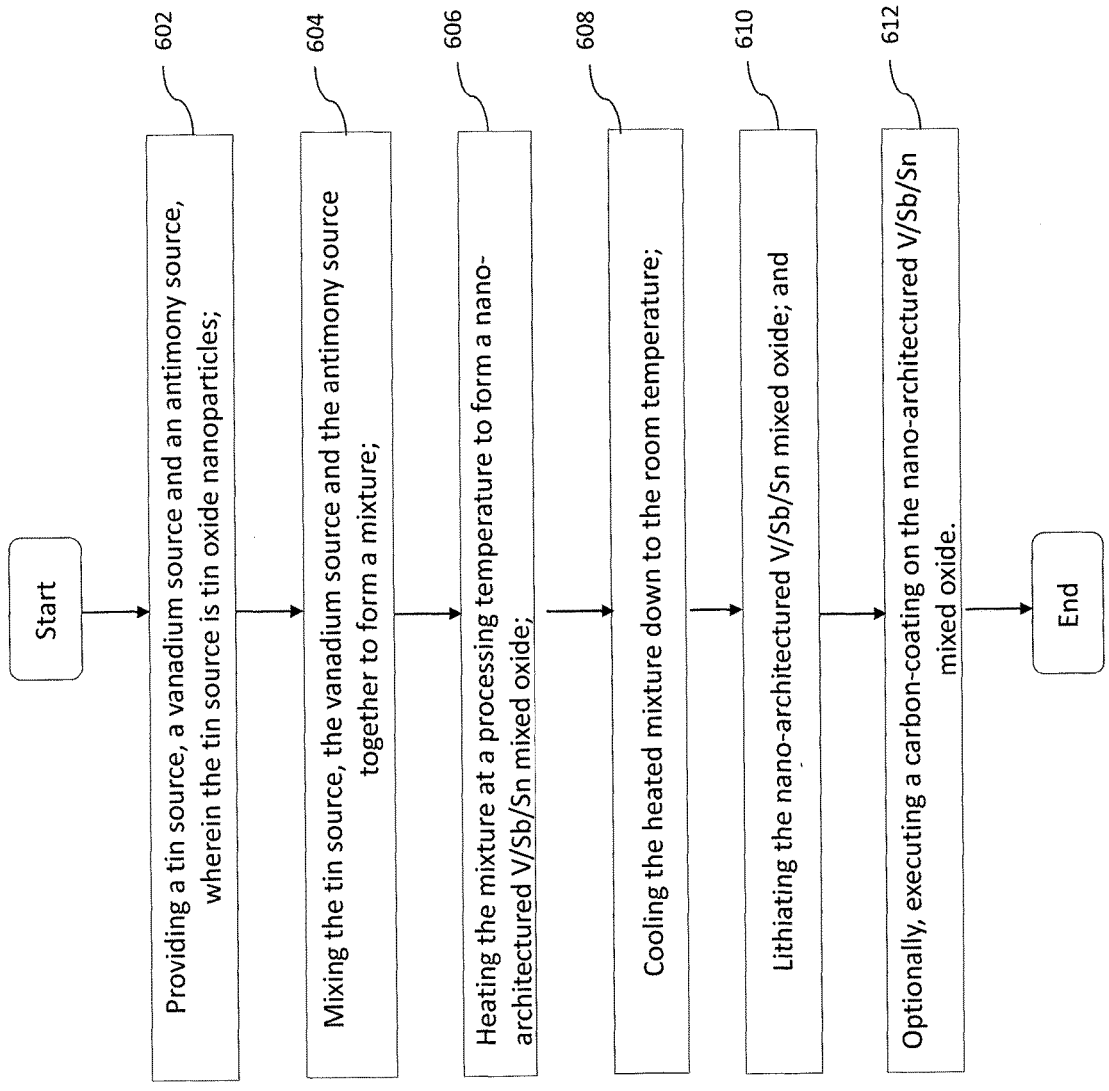
FIG. 6 is a flowchart showing a solid state process for preparing nano-architectured tin oxide-based mixed oxide materials in accordance with exemplary embodiments of the present invention.

The solid state process is a low-cost process since there is little chemical waste generated. FIG. 6 is a flowchart showing a solid state process for making nano-architectured tin oxide-based materials in accordance with exemplary embodiments of the present invention.

As shown in FIG. 6, solid state process 600 may start with $SnO_2$ nanoparticles as a precursor. In one exemplary embodiment, a nano-architectured V/Sb/Sn mixed oxide may be produced. At step 602, a tin source, a vanadium source, and an antimony source are provided. A commercial tin oxide (e.g., $SnO_2$) with particle sizes in a range of 22 nm to 43 nm is used as the tin source. The $SnO_2$ nanoparticles with other particle sizes may also be used since the particle sizes of a final product (e.g., V/Sb/Sn mixed oxide) depends on the particle size of the starting $SnO_2$ nanoparticles. The vanadium source may be an ammonium vanadium oxide (e.g., $NH_4VO_3$). The antimony source may be an antimony oxide (e.g., $Sb_2O_3$). At step 604, the oxides $SnO_2$, $NH_4VO_3$, and $Sb_2O_3$ are mixed together to form a mixture. At step 606, the mixture is heated to a processing temperature of 900° C. and kept at this temperature for several hours (e.g., 9 hours). Here, the melting point of the $NH_4VO_3$ is 200° C. while the melting point of the $Sb_2O_3$ is 656° C. Thus, both the $Sb_2O_3$ and $NH_4VO_3$ are melted at the processing temperature of approximately 900° C., which help form a homogeneous mixing with the tin oxide. Here, the processing temperature is in a range of from approximately 800° C. to approximately 1000° C. The preferred processing temperature is about 900° C. At step 608, the heated mixture is cooled down to room temperature and the final product, the nano-architectured V/Sb/Sn mixed oxide, is obtained. At step 610, the nano-architectured V/Sb/Sn mixed oxide may be lithiated to limit the first irreversible capacity loss so that the nano-architectured V/Sb/Sn mixed oxides may be used in a full cell of a lithium ion capacitor or battery. At step 612, optionally, the nano-architectured V/Sb/Sn mixed oxide may be carbon-coated.

Based on test results, the vanadium oxide may be mixed better with the tin oxide than the antimony oxide. This may be due to the much lower melting temperature of $NH_4VO_3$ than that of the $Sb_2O_3$.

Organic Base-Assisted Sol-Gel Process

Figure 7:
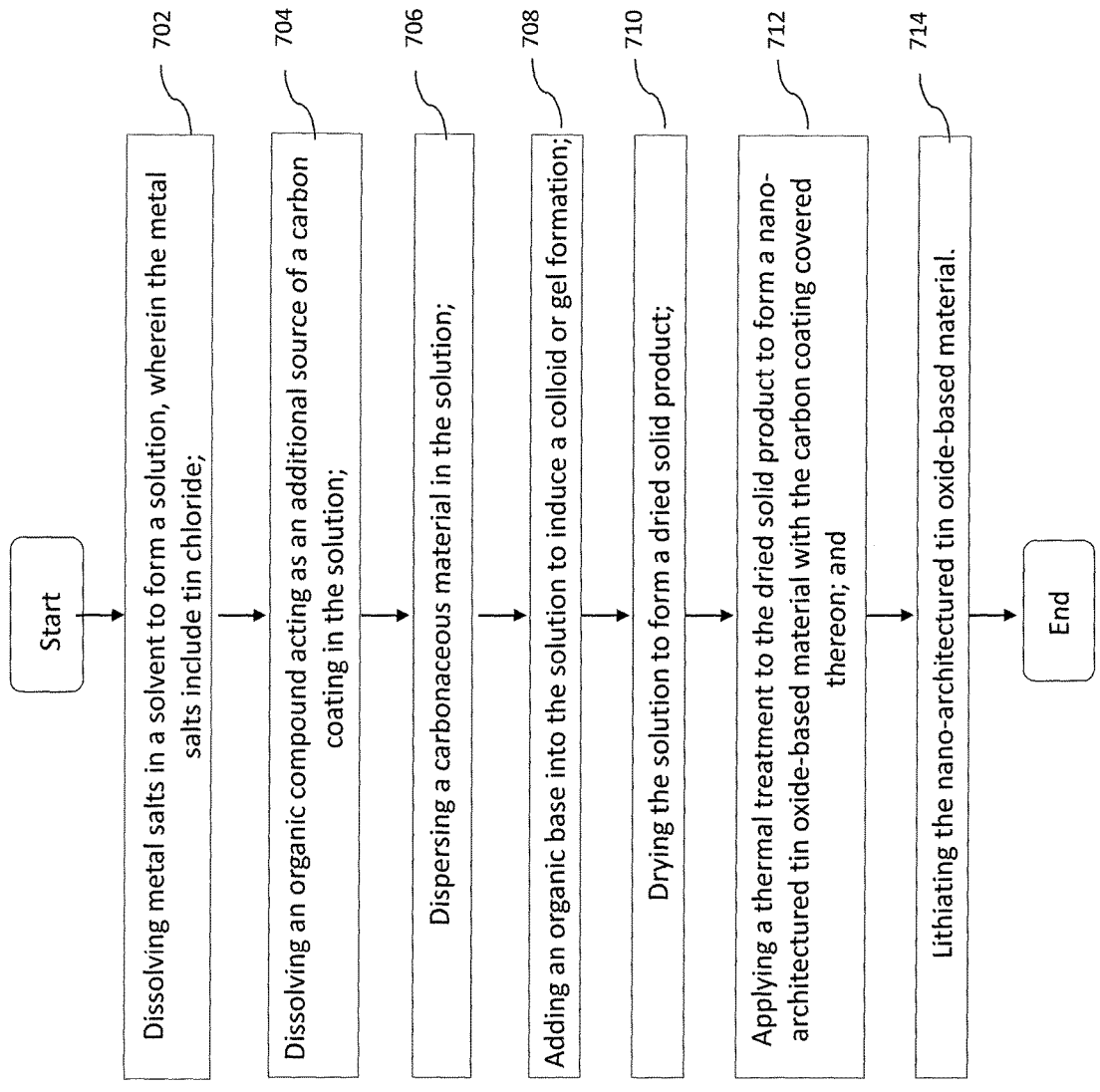
FIG. 7 is a flowchart showing an organic base-assisted sol-gel process for preparing nano-architectured tin oxide-based mixed oxide materials in accordance with exemplary embodiments of the present invention.

The wet chemistry process, such as, a sol-gel process, is used to make the nano-architectured tin oxide-based material with good homogeneity. For example, $V_{1/2}Sb_{1/2}SnO_4$ nanoparticles can be made from a propylene oxide-assisted sol-gel process. Full cells made from these nanoparticles showed excellent high rate capability and excellent cycling stability. As described above, the carbon coated tin oxide-carbon composites that include V/Sb/Sn mixed oxides are formed by the sol-gel process. FIG. 7 is a flowchart showing an organic-assisted sol-gel process for preparing nano-architectured tin oxide-based materials in accordance with exemplary embodiments of the present invention.

As shown in FIG. 7, sol-gel process 700 may start with metal salts that include a tin salt, and include a vanadium salt, an antimony salt, an iron salt, an aluminum salt, and a silicon salt. The metal salts are water or ethanol soluble metal salts. Examples of suitable tin salts are tin (II) chloride, tin (II) acetylacetonate, tin (II) oxalate, tin (II) stearate, tin (IV) chloride, and tin (IV) tert-butoxide, but are not limited to these examples. Examples of suitable vanadium salts are vanadium (II) chloride, vanadium (III) chloride, vanadium (IV) chloride, vanadium (V) oxychloride, vanadium (V) oxytriethoxide, vanadium (V) oxytriisopropoxide, vanadium (III) acetylacetonate, and vanadyl acetylacetonate, but are not limited thereto. Examples of suitable antimony salts for generating antimony or antimony oxide are antimony oxide, antimony (III) chloride, antimony(III) acetate, antimony(III) ethoxide, antimony(V) chloride, antimony(III) methoxide, antimony(III) butoxide, and antimony (III) isopropoxide, but are not limited thereto. The iron salts are selected from iron (II) chloride, iron (III) chloride, iron (III) nitrate, iron carbonate, and iron acetate, but are not limited thereto. The aluminum salts are selected from aluminum nitrate, aluminum sulfate, aluminum acetate, and aluminum chloride, but are not limited thereto. The metal salts containing silicon are selected from silicon chloride, silicon alkoxides, or the like.

At step 702, the metal salts are dissolved in a solvent forming a solution. The solvent is a mixture of water and an organic solvent including ethanol, methanol, propanol, acetone, and a combination thereof, or the like. An acid such as HCl might be added into the solution to help dissolve the metal salts.

After dissolving the metal salts, an organic compound that acts as an additional source of a carbon coating is dissolved in the solution (step 704). The organic compound is dissolved in the solution and decomposed into carbon during a thermal carbonization process. Organic compounds that can dissolve in ethanol or water can be used. Examples of suitable organic compounds are sucrose, glucose, and a polymer such as polyethylene amine, but are not limited thereto.

At step 706, a carbonaceous material is then dispersed in the solution forming a tin oxide-carbon based composite including fully oxidized and partially reduced tin oxide $SnO_z$, where z is in a range of $0<z\leq2$, is then formed. The carbon material is graphite, hard carbon, soft carbon, amorphous carbon coated graphite, amorphous carbon coated hard carbon, carbon black, carbon nanofibers, carbon nanotubes, graphene, carbon nanoparticles, carbon onion, crystalline carbon, semi-crystalline carbon, amorphous carbon, or the like.

At step 708, an organic base, such as propylene oxide, is then added into the solution to induce colloids or gel formation (e.g., a gel). The organic base may form complexes with metal ions and the complexes may experience hydrolysis and condensation reactions with the addition of water. The organic base is selected from, but is not limited to, propylene oxide and pyridine. Here, the organic base not only acts as a gelation agent to induce the gel formation of the tin oxide, but also provides a carbon source for the carbon coating. The organic base may form complexes with tin and other metal ions in the solution for the colloids or gel formation. The formation of the colloids or gel is controlled by varying reactant concentrations. For continuous production, a colloidal solution is preferred, which is prepared by using diluted reactants. The diluted solution is then dried by a variety of processes to obtain a dried solid product. For example, a spray-drying process is used to dry the diluted solution and the solvent may be recycled.

At step 710, the solution is dried at a relatively mild temperature (e.g., 80° C. to 150° C.) for a period of time, such as 12 hours, to remove the solvent. The drying temperature and drying time may vary. At step 712, a thermal treatment is applied to the dried solid product. The dried solid product is heated in air or in an inert gas to remove physically or chemically bonded water and to decompose coated organic molecules. The temperature for heating the dried solid product is typically above 500° C. in order to decompose the organic molecules. The temperature for heating the dried solid product might have a broad range if the dried solid product is heated in an inert gas. For example, the dried solid product is heated to between about 600° C. to over 850° C. in Argon. Heating at above 900° C. may result in the formation of metallic tin particles. The inert gas may be nitrogen, argon, helium, and combinations thereof. During the thermal treatment process, the dried solid product is decomposed to form metal/metal oxide particles, while the organic component becomes a layer of the carbon coating covering the metal/metal oxide particles. The carbon coating may limit a further growth of the metal/metal oxide particles. The metal/metal oxide particles generated from the sol-gel process is nano-scaled, ranging in diameter from several nanometers to several hundreds of nanometers. The metal/metal oxide particles are a nano-architectured tin oxide-based material.

At step 714, the nano-architectured tin oxide-based material is lithiated to form a lithiated nano-architectured tin oxide-based material, which is used in a negative electrode as a negative electrode material for the energy storage devices.

In the described embodiments of the present invention, the lithiated nano-architectured tin oxide-based materials are tested in full cells of energy storage devices. The lithiated nano-architectured tin oxide-based material includes at least one stress-buffer component that helps prevent tin particles from breaking, which makes this material able to be fabricated into the full cells of the energy storage devices that have limited capacity loss during cycling. Energy storage devices are formed with the lithiated nano-architectured tin oxide-based material as a negative electrode material. A lithium ion capacitor is charged/discharged within a short time, for example, 4 seconds, and is stable over hundreds or thousands of cycles, for example, 140,000 cycles, without any significant capacity loss. Furthermore, the processes to make the lithiated nano-architectured tin oxide-based material disclosed in the described embodiments of the present invention are feasible for large scale manufacture, unlike the high energy ball milling process that is limited for large scale manufacturing.

The described embodiments of the present invention are further illustrated by the following Examples.

Example 1

$V_xSnO_z$, where x is 0, 1/8, 1/4, 1/2, 3/4, or 1; and $0<z\leq2+5x/2$

A series of samples were prepared from the solid-state process without high energy ball milling. The first set of the samples were mixtures of V/Sn oxide with various V/Sn molar ratios, such as 1/8, 1/4, 1/2, 3/4, and 1/1. The samples have a formula of $V_xSnO_z$, where x is 0, 1/8, 1/4, 1/2, 3/4, or 1, and $0<z\leq2+5x/2$. $O_z$ in all samples represents all the samples are oxides. The z value is a varied number for each sample and relies on the oxidation states of the metals (e.g., V, or Sn). The z value equals to 2+5x/2 when both the vanadium and tin are fully oxidized, whereas the z value is less than 2+5x/2 when either the vanadium or tin is partially oxidized.

The first set of the samples were all prepared under similar conditions. In one example of synthesizing V/Sn mixed oxides, $SnO_2$ nanoparticles with particle size of 22 nm to 43 nm and ammonium vanadate ($NH_4VO_3$) were dispersed in water. Suitable vendors of the $SnO_2$ include Alfa Aesar of Ward Hill, Mass. Suitable vendors of the $NH_4VO_3$ include Sigma of St. Louis, Mo. The dispersion solution was then dried at low temperature, for example, about 100° C. to 200° C. The dried powers were ground with a pestle and then heated at 800° C. in air for about 9 hours. The heated dried powders were then cooled down, ground with a pestle, and then heated again at 900° C. in air for about 9 hours.

Figure 8A:
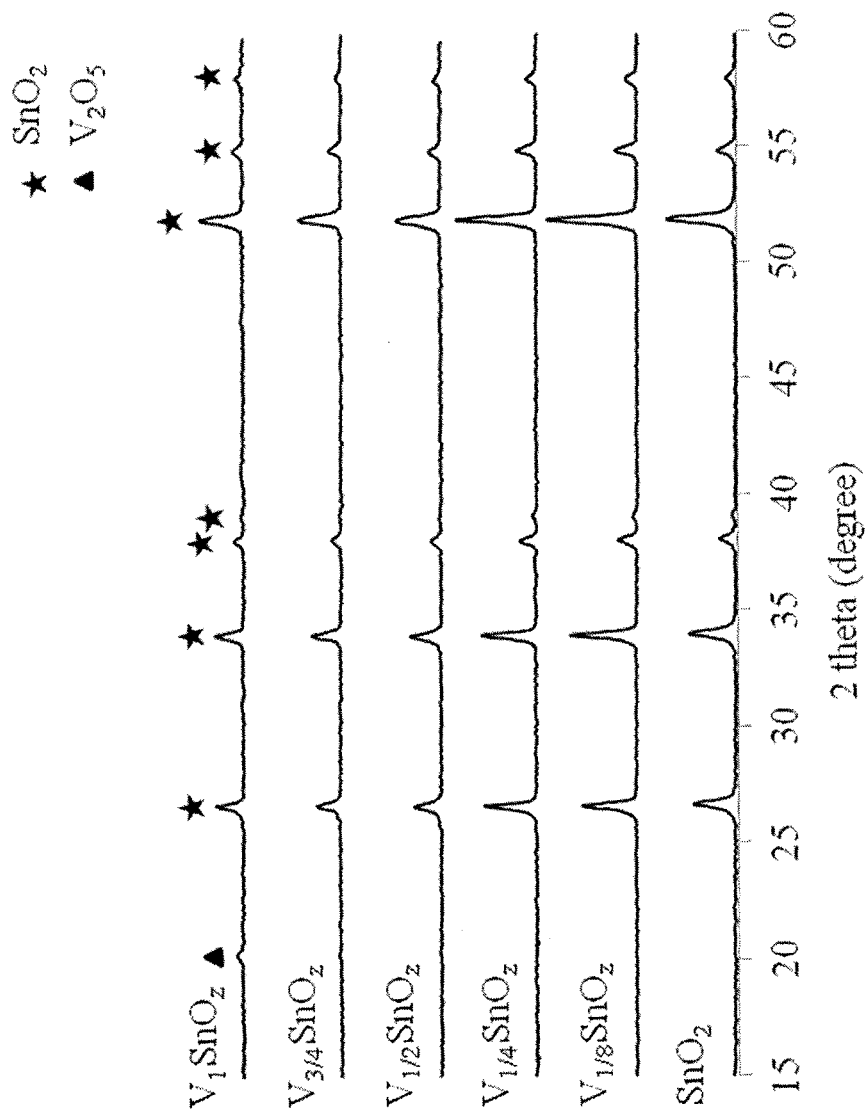
FIG. 8A is an X-ray diffraction (XRD) pattern for vanadium-tin mixed oxides in accordance with exemplary embodiments of the present invention.

X-ray diffraction (XRD) patterns were collected with these samples. The patterns show that vanadium oxide may exist as an amorphous structure or form a good solid solution with the tin oxide under current preparation conditions when the V/Sn molar ratio was ≤3/4, as shown in FIG. 8A.

Two samples $SnO_2$ and $V_{3/4}SnO_z$ were compared as negative electrode materials in half cells. A positive electrode in a half cell was made by coating a slurry of the electrode active material (e.g., $SnO_2$ or $V_{3/4}SnO_z$), carbon black, and a polymer binder onto a copper foil. A negative electrode was a piece of lithium foil. A glassfiber disk was used as a separator. 1 mole $LiPF_6$ in EC/DEC (e.g., 1/1 volume ratio) was used as an electrolyte. In one test, the half-cell was charged/discharged at 1 A/g for 5 cycles, 5 A/g for 5 cycles, 10 A/g for 5 cycles, and finally 1 A/g for 50 cycles. Current density was calculated based on the total weight of electrode material, while specific capacity was calculated based on the electrode material weight of the electrode active material (e.g., tin oxide or vanadium tin oxide) unless specified.

Figure 8B:
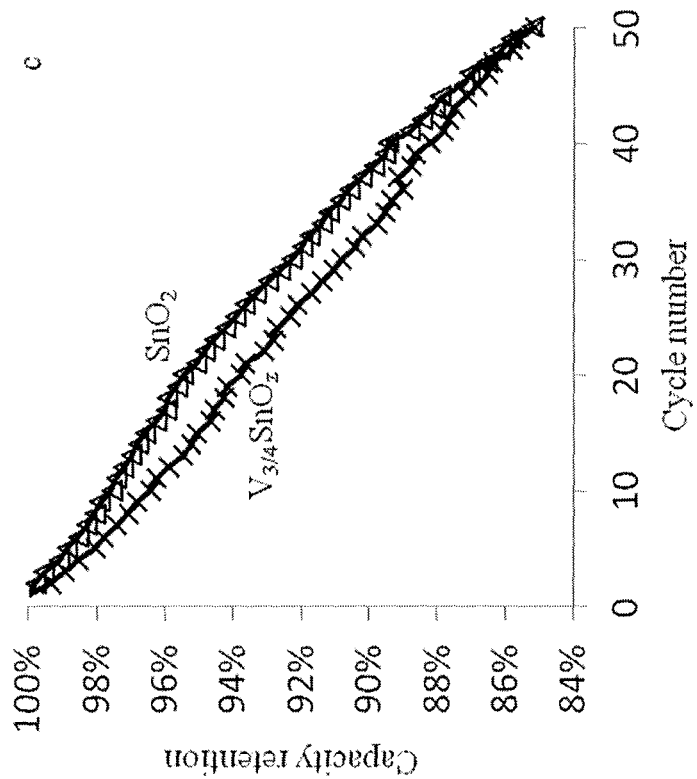
FIG. 8B is a comparison of cycling stability between oxides $SnO_2$ and $V_{3/4}SnO_z$ in accordance with exemplary embodiments of the present invention, where z is a positive number.

Cycling stabilities of the samples $SnO_2$ and $V_{3/4}SnO_z$ show that the presence of the vanadium oxide may not affect the rate capability or cycling stability of the tin oxide significantly within 50 cycles, as shown in FIG. 8B.

Example 2

$Sb_xSnO_z$, where x is 0, 1/8, 1/4, 1/2, 3/4, and 1; and $0<z\leq2+3x/2$

The second set of samples were mixtures of antimony oxide and tin oxide, which were prepared under the same conditions as the mixtures of vanadium oxide and tin oxide as described in the Example 1 except antimony trioxide was used instead of ammonium vanadate. Here, similar to Example 1, $O_z$ in all samples represents that all the samples were oxides. The z value is a varied number for each sample and relies on the oxidation states of the metals (e.g., Sb, or Sn). The z value equals to 2+3x/2 when both antimony and tin are fully oxidized, whereas the z value is less than 2+3x/2 when either antimony or tin is partially oxidized.

Figure 9A:
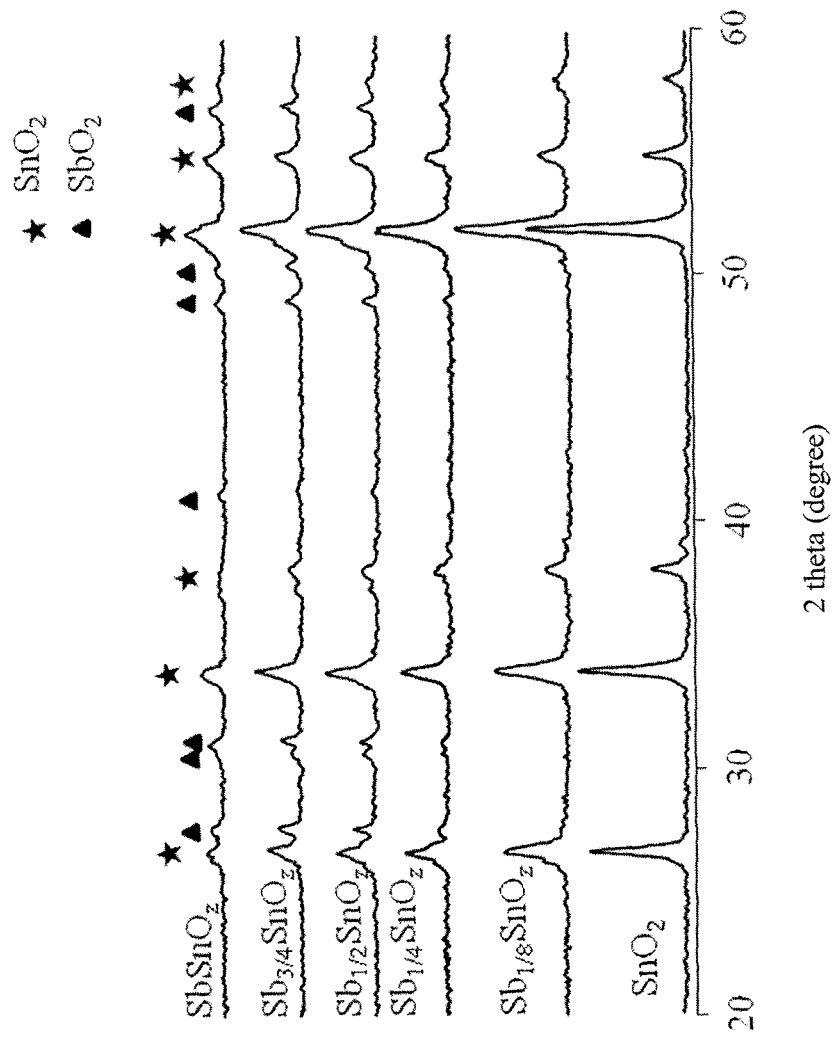
FIG. 9A is an XRD pattern for antimony-tin mixed oxides in accordance with exemplary embodiments of the present invention.

XRD patterns of $Sb_xSnO_z$, as shown in FIG. 9A, shows that a single crystal phase was obtained with the incorporation of small amount of antimony (e.g., Sb/Sn=1/8 in molar ratio). A second crystal phase corresponding to $SbO_2$ was observed with an increase of Sb (e.g., Sb/Sn=1/4 in molar ratio) and the peaks from $SbO_2$ became more evident with a further increase in Sb.

Figure 9B:
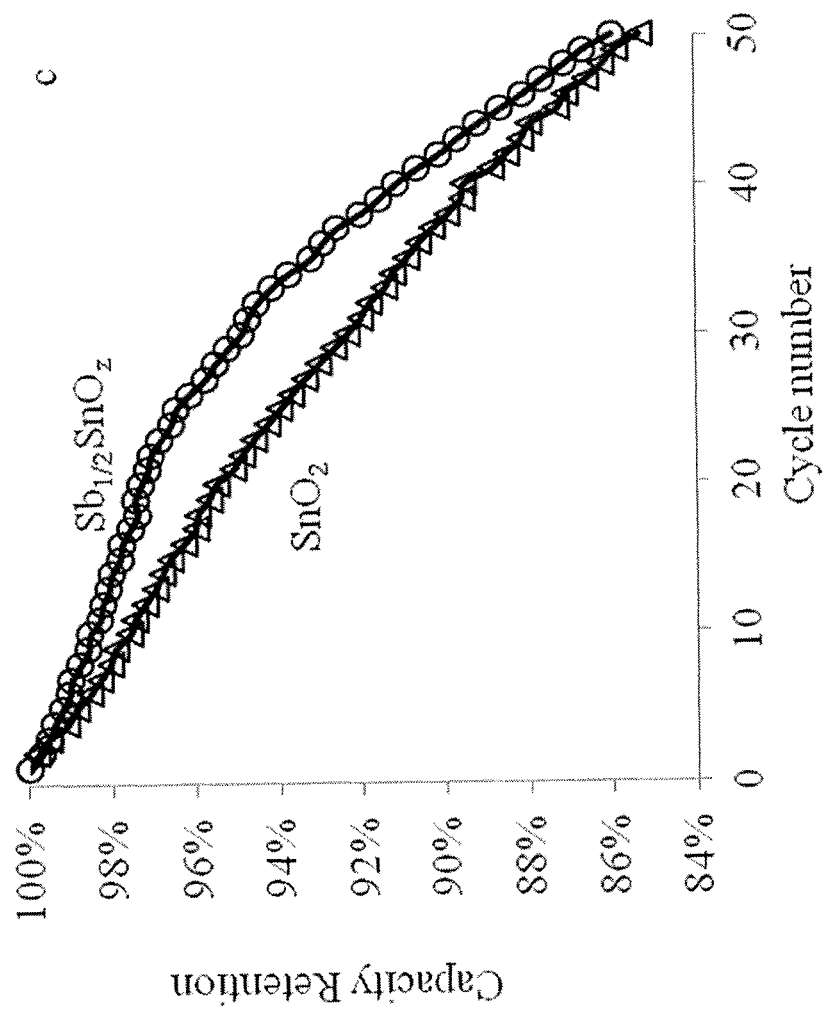
FIG. 9B is a comparison of cycling stability between oxides $SnO_2$ and $Sb_{1/2}SnO_z$ in accordance with exemplary embodiments of the present invention, where the z is a positive number.

Effect of antimony oxide on tin oxide was illustrated by comparing the electrochemical performance of $Sb_{1/2}SnO_z$ with $SnO_2$, as shown in FIG. 9B. With the incorporation of antimony oxide, the cycling stability was slightly better particularly at the beginning, but it became worse between about 22 cycles and 50 cycles. In summary, the incorporation of antimony oxide alone may not improve the rate capability of tin oxide significantly within 50 cycles. It may improve the cycling stability of tin oxide at the beginning, but the capacity may drop afterward.

However, the incorporation of antimony oxide might not improve the cycling stability of tin oxide significantly, which may be partially because of the inhomogeneous mixture obtained from the solid state process as revealed by the XRD patterns.

Example 3

$V_xSb_{1/2}SnO_z$, where x is 1/8, 1/4, 1/2, 3/4, and 1; and $0<z\leq2.75+x/2$

A set of vanadium oxide/antimony oxide/tin oxide mixtures were prepared from the solid state process by using tin oxide nanoparticles, antimony trioxide, and ammonium vanadate as precursors. These mixtures are identified as $V_{1/8}Sb_{1/2}SnO_z$, $V_{1/4}Sb_{1/2}SnO_z$, $V_{1/2}Sb_{1/2}SnO_z$, $V_{3/4}Sb_{1/2}SnO_z$, and $VSb_{1/2}SnO_z$. Here, similar to Example 1, $O_z$ in all samples represents that all the samples are oxides. The z value is a varied number for each sample and relies on the oxidation states of the metals (e.g., V, Sb, or Sn). The z value equals to 2.75+x/2 when both the vanadium and tin are fully oxidized, whereas, the z value is less than 2.75+x/2 when either the vanadium or tin is partially oxidized.

Figure 10A:
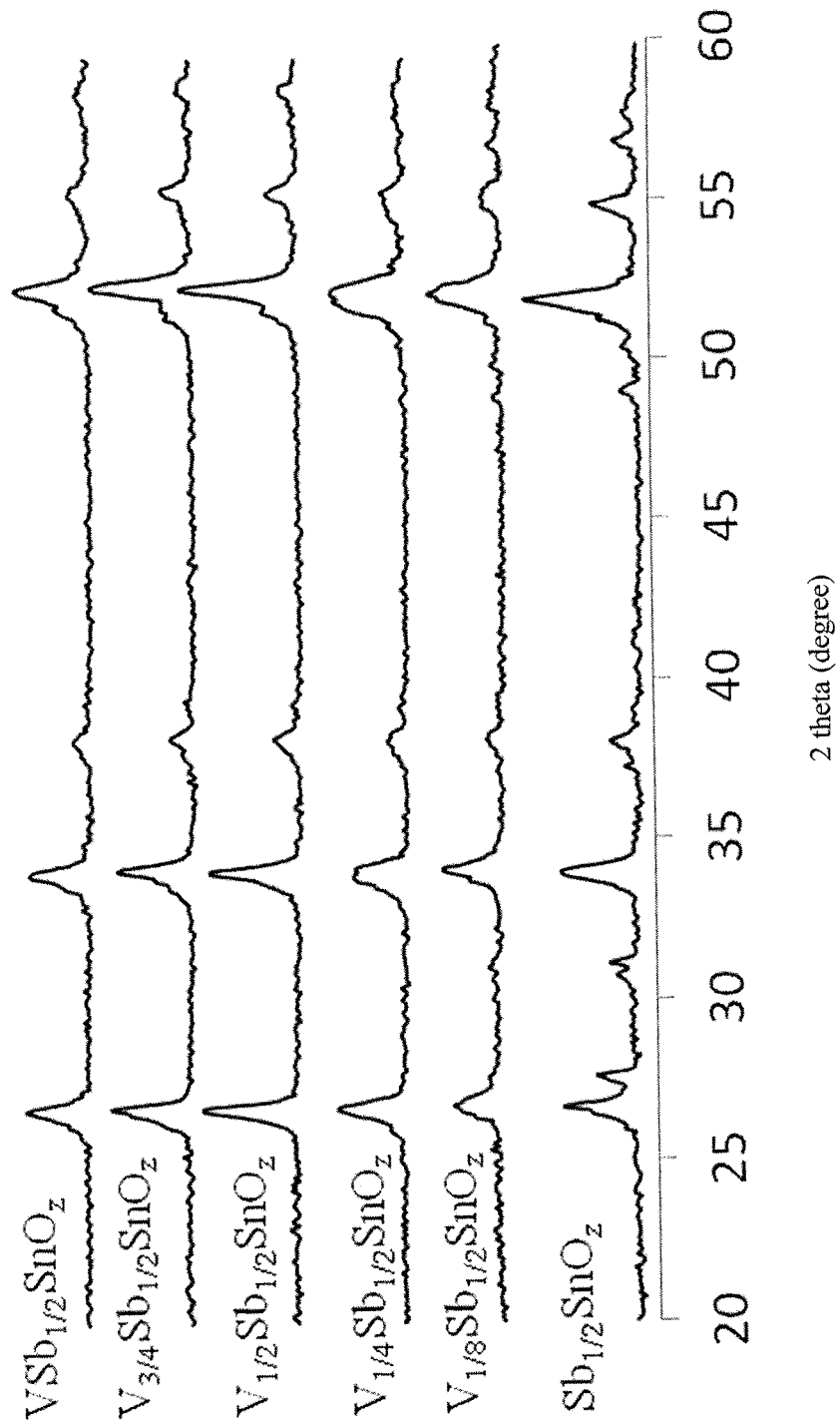
FIG. 10A is an XRD pattern for vanadium-antimony-tin mixed oxides in accordance with exemplary embodiments of the present invention.

XRD patterns for these mixtures are shown in FIG. 10A. Without vanadium oxide, the mixture included two crystal structures, which were attributed to $SnO_2$ and $SbO_2$. With the incorporation of small amount of vanadium oxide (e.g., V/Sn=1/8), the peaks from $SbO_2$ were almost disappeared and all peaks may be identified from a single crystal structure that is similar to $SnO_2$, suggesting a much better solid solution was formed. No substantial phase separation was observed with an increase of vanadium oxide. The peak at about 52° is split into two peaks in samples $V_{1/2}Sb_{1/2}SnO_z$, $V_{3/4}Sb_{1/2}SnO_z$, and $VSb_{1/2}SnO_z$ suggesting that the solid solution was not perfectly formed. Regardless, the incorporation of vanadium oxide improved the solid solution form between the antimony oxide and tin oxide.

No peaks from vanadium oxide were observed at a high loading of the vanadium oxide (e.g., V/Sn=1/1). In comparison, vanadium oxide peaks were observed for a mixture of the vanadium oxide/tin oxide with the same molar ratio of vanadium/tin, as shown in FIG. 8A. This suggests that the presence of antimony oxide may also improve the solid solution formation between the vanadium oxide and tin oxide. In other words, the presence of both vanadium oxide and antimony oxide may be beneficial for the solid solution formation with the tin oxide.

Figure 10C:
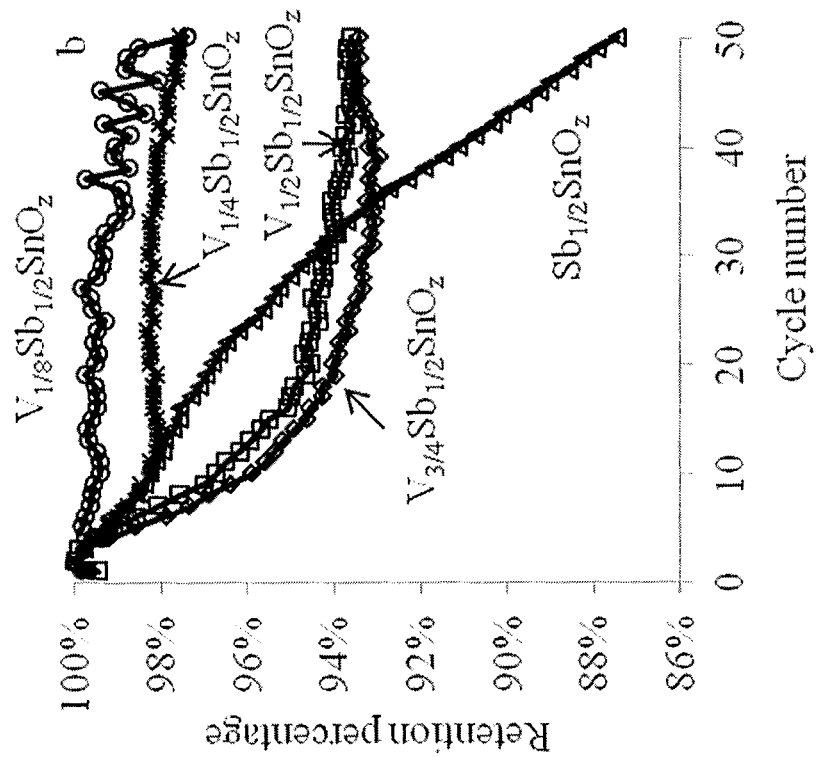
FIG. 10C is a comparison of capacity retention among vanadium-antimony-tin mixed oxides in accordance with exemplary embodiments of the present invention.
Figure 10B:
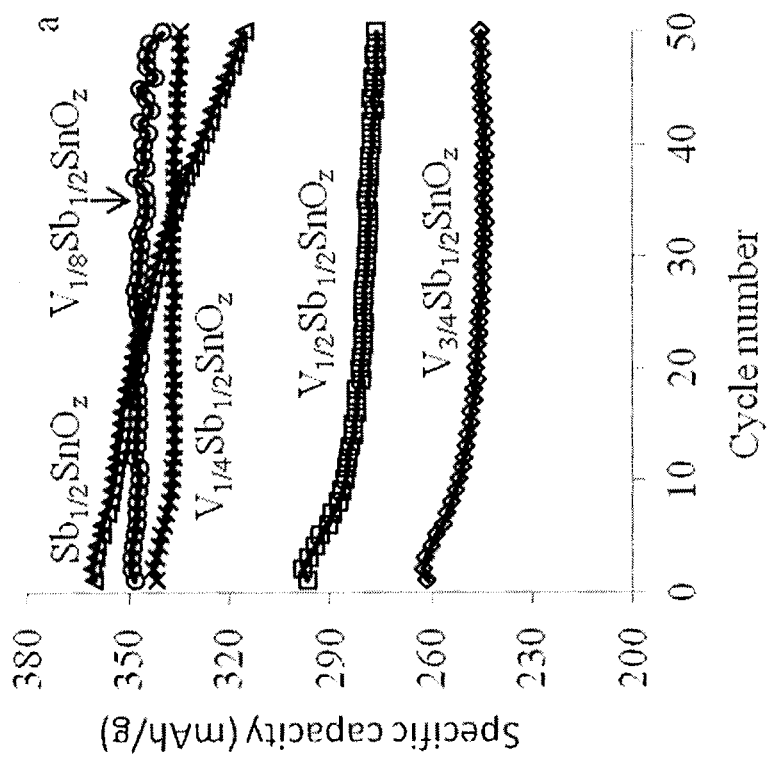
FIG. 10B is a comparison of capacity among vanadium-antimony-tin mixed oxides in accordance with exemplary embodiments of the present invention.

Cycling stabilities of $V_xSb_{1/2}SnO_z$ are shown in FIGS. 10B and 10C. All data were collected at 1 A/g and capacities were calculated from the charging process. With an increase of the vanadium oxide, the capacity of the mixed oxide decreased, which is expected since the vanadium oxide is not electrochemically-active under testing conditions. The incorporation of the vanadium oxide clearly improves the cycling stability of $Sb_{1/2}SnO_{11/4}$. With the incorporation of even a small amount of the vanadium oxide (e.g., V/Sn=1/8), the capacity loss decreased from about 13% to about 3% after 50 cycles, as shown in FIG. 10C. With an increase of vanadium oxide, the initial capacity loss of the mixed oxide somehow became slightly larger, but all become stabilized within 50 cycles. In comparison, the capacity for $Sb_{1/2}SnO_{11/4}$ was continuously decreased within 50 cycles. The incorporation of the vanadium oxide, therefore, clearly improved the cycling stability of $Sb_{1/2}SnO_{11/4}$, which was much better than the cases where either vanadium oxide or antimony oxide was added alone into the tin oxide.

By way of example, and as illustrated in FIG. 8A to FIG. 8C, a benefit occurred with a combination of the vanadium oxide and antimony oxide with the tin oxide to make the V/Sb/Sn mixed oxide.

Example 4

Carbon Coated Tin Oxide-HPB-45 Based Composites

Four samples were prepared to illustrate an effect of antimony and vanadium in a tin oxide-carbon composite material. HPB-45 from Nippon Oil was used as a carbonaceous material in the composite.

Carbon coated $SnO_z$—HPB-45, $V_{1/2}SnO_z$—HPB-45, $Sb_{1/2}SnO_z$—HPB-45, and $V_{1/2}Sb_{1/2}SnO_z$—HPB-45 were prepared from a propylene oxide-assisted sol-gel process. Here, similar to Example 1, $O_z$ in all samples represents that all the samples are oxides. The z value is a varied number for each sample and relies on the oxidation states of the metals (e.g., V, Sb, or Sn). Each of the samples may have about 20 wt % of HPB-45.

In one typical synthesis for $V_{1/2}Sb_{1/2}SnO_z$—HPB-45, 1.57 g $VCl_3$, 2.28 g $SbCl_3$, 5.21 g $SnCl_4$, and 2 ml HCl (about 35.5%) were dissolved in a mixture of ethanol (24 g) and water (8 g). 1.35 g HPB-45 was dispersed in the above solution under stirring. A gel was formed after 11.2 g propylene oxide was introduced into the dispersion drop by drop. The gel was dried on a hot plate (e.g., 100° C. to 150° C.). The dried gel was finally heated at 600° C. in Argon for 10 hours to obtain carbon coated $V_{1/2}Sb_{1/2}SnO_z$—HPB-45 composite. In this process, propylene oxide acted as both the gelation agent and the carbon source. It may form complexes with the metal ions (e.g., $Sn^{4+}$, $Sb^{3+}$, and $V^{3+}$), which were carbonized by heating the as-made product in Argon at 600° C. Other samples were synthesized under similar conditions.

Figure 11A:
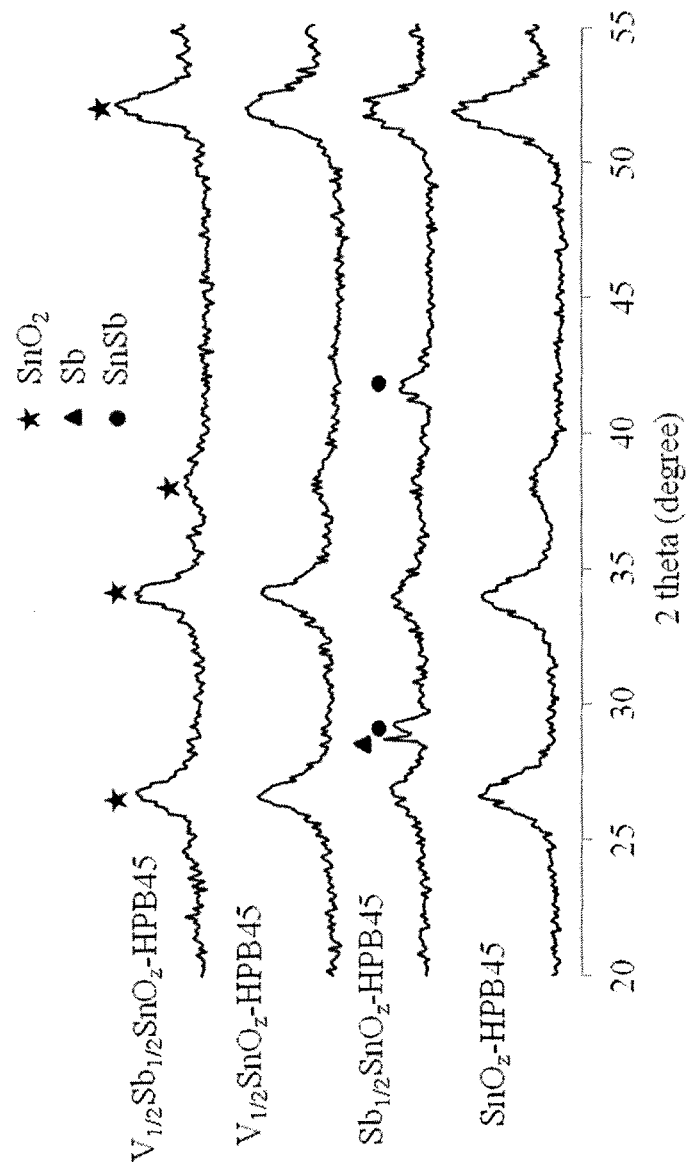
FIG. 11A is an XRD pattern for $SnO_z$—HPB-45 composites in accordance with exemplary embodiments of the present invention, where the z is a positive number.

XRD patterns of these samples are shown in FIG. 11A. The pattern for $SnO_z$—HPB-45 is the same as that for $SnO_2$, but the crystal size is much smaller. The average crystal size estimated from the peak at about 26.6° (2θ) is about 6.0 nm. Here, θ is a diffraction angle following Braggs's law nλ=2 d sin θ, where n is an integer, λ is a wavelength, and d is an interatomic spacing. This crystal size is for the tin oxide particles. HPB-45 is expected to have much larger sizes as graphite. With the incorporation of antimony, the pattern shows three extra peaks, which were identified as Sb and SnSb. The presence of Sb is also suggested by the appearance of the obtained powder after being heated at 600° C. Silvery, shiny particles were observed in the black powder, suggesting the presence of metallic particles. With the incorporation of vanadium, the pattern is similar to $SnO_z$—HPB-45. No crystal structure from vanadium or vanadium oxide was observed. It suggests that either the formed vanadium species were amorphous or the formed vanadium species were diffused into the tin oxide to form a solid solution. The average crystal size of tin oxide in $V_{1/2}SnO_z$—HPB-45 was about 6.4 nm. In the presence of both antimony and vanadium, the pattern may become tricky. The XRD pattern may be different from sample to sample. A peak from metallic antimony may or may not appear at about 28° (2θ), while peaks from $SnO_2$ were present in all samples.

Figures 11B, 11C:
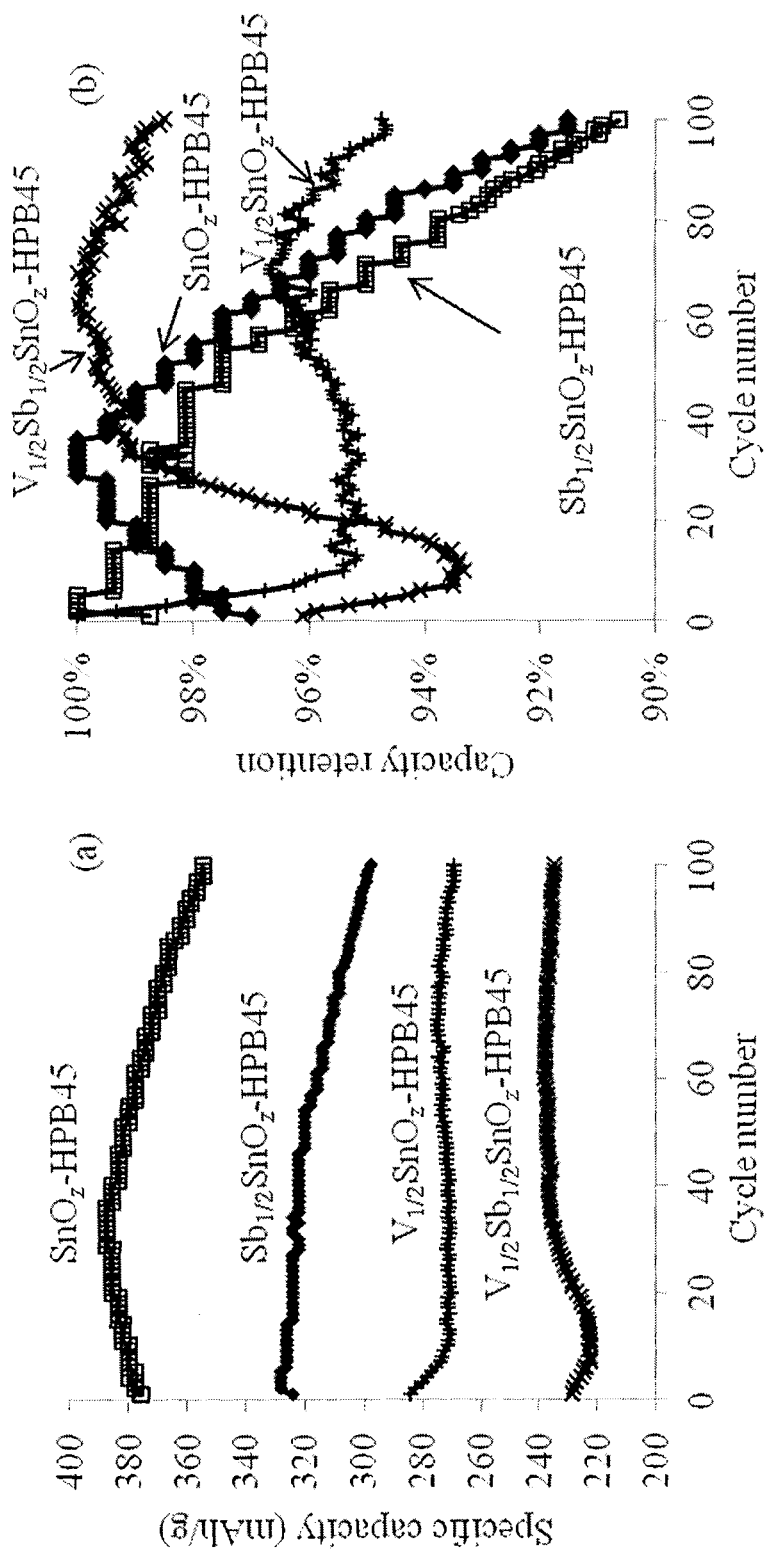
FIG. 11B is a comparison of specific capacity among $SnO_z$—HPB-45 composites in accordance with exemplary embodiments of the present invention, where z is a positive number.
FIG. 11C is a comparison of capacity retention among $SnO_z$—HPB-45 composites in accordance with exemplary embodiments of the present invention, where z is a positive number.

Electrochemical performance of these oxide-HPB-45 composites is shown in FIG. 11B. With carbon coating and HPB-45, the $SnO_z$—HPB-45 composite shows much better cycling stability than the pure $SnO_2$ nanoparticles. The capacity retention was about 97% after 50 cycles for the tin oxide-HPB-45 composite compared to 85% for the tin oxide nanoparticles, as shown in FIG. 8B. The capacity retention of about 91% was obtained even after 100 cycles. With the incorporation of antimony, the specific capacity was reduced, which is expected since the antimony is not active in the cycled voltage range. The cycling stability of Sb incorporated SnOz-HPB-45 was not improved clearly, which may be because Sb did not form a good solid solution with $SnO_2$. This may be revealed by the XRD patterns, as shown in FIG. 11A. Interestingly, the addition of the vanadium clearly improved the cycling stability of $SnO_z$—HPB-45. Capacity retention of about 94% or 98% may be achieved after 100 cycles for $V_{1/2}SnO_z$—HPB-45 or $V_{1/2}Sb_{1/2}SnO_z$—HPB-45, respectively.

FIGS. 11A-11C show nano-architectured tin oxide-carbon composite may be made directly from a sol-gel process. The incorporation of vanadium oxide may improve the cycling stability of tin oxide-carbon composite. As an example, the capacity retention after 100 cycles increased from about 91% to about 94% with the incorporation of the vanadium oxide.

Example 5

$Fe_{1/2}SnO_z$—HPB-45 Composite $Fe_{1/2}SnO_z$—HPB-45 composite was prepared from a propylene oxide-assisted sol-gel process. In one typical process, 10.1 grams of iron nitrate nonahydrate and 17.5 grams of tin chloride pentahydrate were dissolved in ethanol. 2.9 g HPB-45 was then dispersed in the solution with stirring, which was added with a solution of propylene oxide (40.0 g) and water (4.0 g). The mixture was then dried onto a hotplate with stirring. The dried power was finally heated in Argon at 650° C. for 10 hours.

Figure 12A:
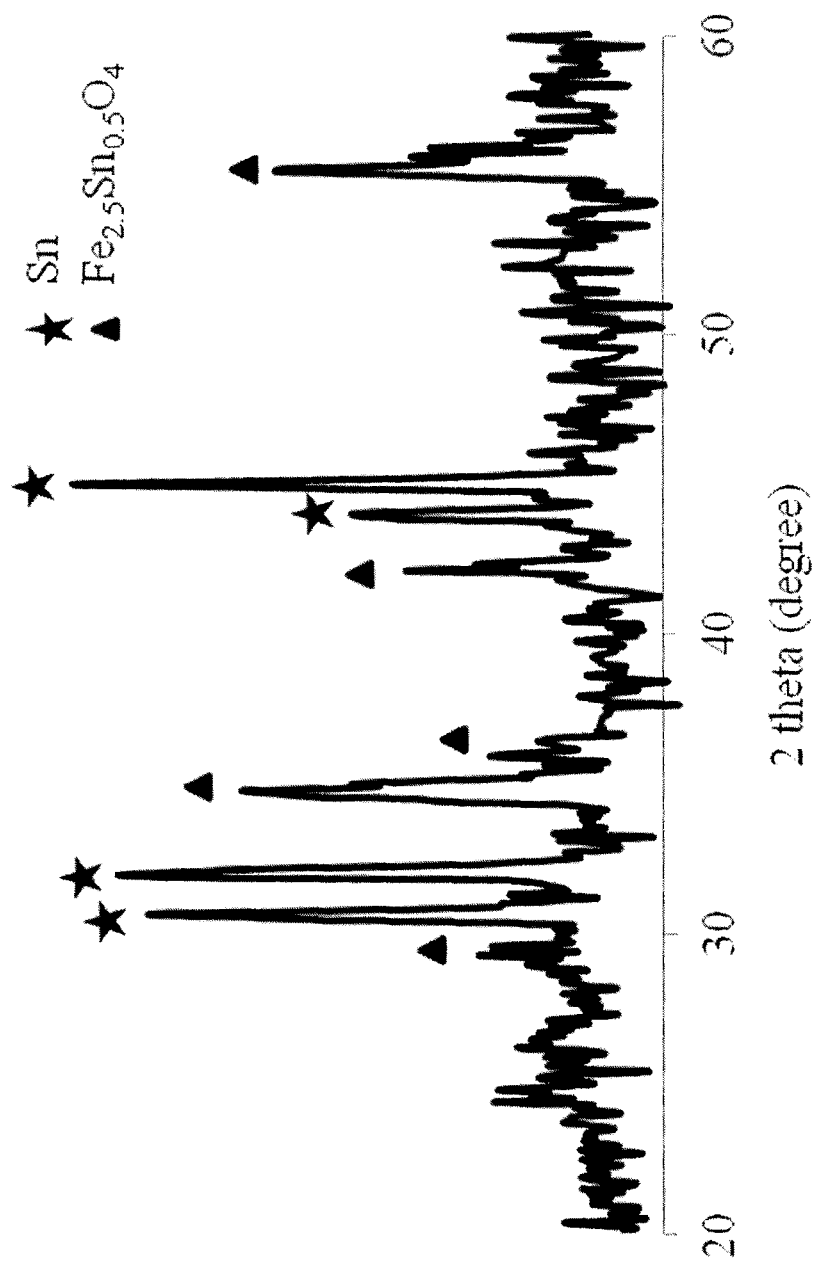
FIG. 12A is an XRD pattern for $Fe_{1/2}SnO_z$—HPB-45 composites in accordance with exemplary embodiments, where the z is a positive number.

XRD pattern for $Fe_{1/2}SnO_z$—HPB-45 is shown in FIG. 12A. Different from $V_{1/2}Sb_{1/2}SnO_z$—HPB-45, the XRD pattern for $Fe_{1/2}SnO_z$—HPB-45 shows sharp peaks from metallic tin. Besides tin, the composite also included an iron tin oxide (e.g., $Fe_{5/2}Sn_{1/2}O_4$).

Figures 12B, 12C:
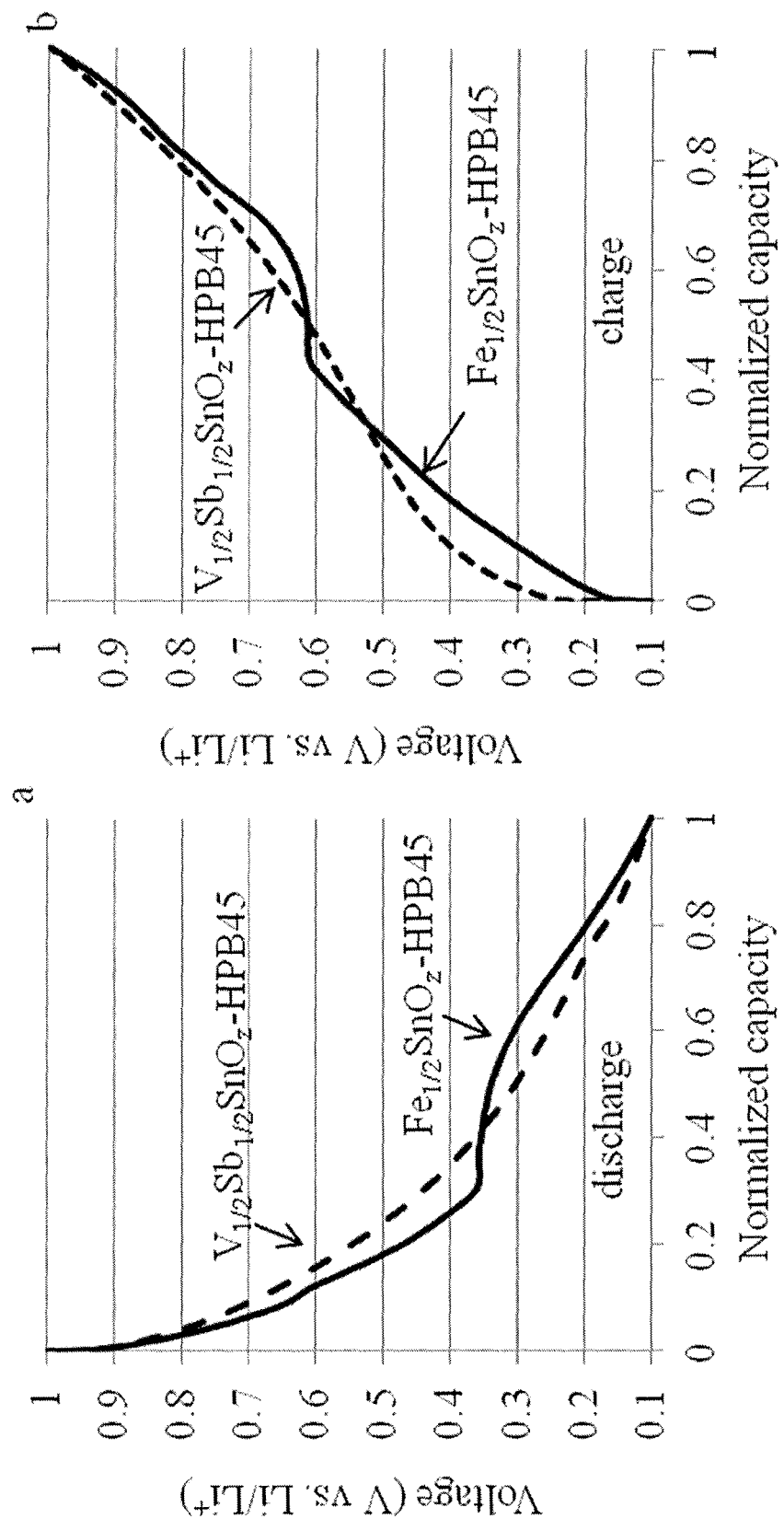
FIG. 12B is a comparison of constant current discharge curves between $Fe_{1/2}SnO_z$—HPB-45 and $V_{1/2}Sb_{1/2}SnO_z$—HPB-45 in accordance with exemplary embodiments of the present invention, where z is a positive number.
FIG. 12C is a comparison of constant current charge curves between $Fe_{1/2}SnO_z$—HPB-45 and $V_{1/2}Sb_{1/2}SnO_z$—HPB-45 in accordance with exemplary embodiments of the present invention, where z is a positive number.

Representative constant current charge/discharge curves from $Fe_{1/2}SnO_z$—HPB-45 and $V_{1/2}Sb_{1/2}SnO_z$—HPB-45 are compared in FIGS. 12B and 12C. All data were collected in a half cell with 1 mole $LiPF_6$ as the electrolyte at a charge/discharge rate of 1 A/g. FIG. 12B shows the difference in the discharge curves between the two samples. The main difference is that there is a flat plateau at about 0.35V for $Fe_{1/2}SnO_z$—HPB-45, which may correspond to the alloy formation of $Li_{7/3}Sn$ (e.g., $LiSn \rightarrow Li_{7/3}Sn$). The flat plateau was also observed for a tin electrode, suggesting that the flat plateau in $Fe_{1/2}SnO_z$—HPB-45 come from metallic tin in the composite. There is no flat plateau in $V_{1/2}Sb_{1/2}SnO_z$—HPB-45 suggesting that the lithium alloying process may be retarded by the presence of lithium oxide. This may result in a relatively smooth transition among different phases, which is consistent with the composition in $V_{1/2}Sb_{1/2}SnO_z$—HPB-45. The sample $V_{1/2}Sb_{1/2}SnO_z$—HPB-45 includes $SnO_2$ instead of metallic tin. Similar to the discharge curve, there is a plateau at about 0.61V for $Fe_{1/2}SnO_z$—HPB-45 in the charge curve, which corresponds to the de-alloying process of $Li_{7/3}Sn$ (e.g., $Li_{7/3}Sn \rightarrow LiSn$). This may confirm the existence of the metallic tin in the sample.

This example shows that different oxidation states of the tin may be produced from the same propylene oxide-assisted sol-gel process by changing the precursors. The produced $Fe_{1/2}SnO_z$—HPB-45 showed a good capacity (e.g., about 210 mAh/g at 1 A/g) in a half cell. A lithium ion capacitor based on this material showed high rate capability and excellent cycling stability (e.g., over 300,000 cycles with a capacity loss≤20%), which is described in Example 9 below.

FIGS. 12A-12C show that the metallic tin may be obtained from the sol-gel process. The metallic tin-contained electrode material showed a different voltage profile to a tin oxide-based electrode material. A flat voltage plateau appears at about 0.35V vs. $Li/Li^+$ during the lithium insertion process for the metallic-tin contained material, as shown in FIG. 12B and the flat plateau is about 0.61V vs. $Li/Li^+$ during the lithium extraction process, as shown in FIG. 12C.

Example 6

An Activated Carbon/$V_{1/2}Sb_{1/2}SnO_4$ High Rate Lithium Ion Capacitor

A lithium ion capacitor was prepared as a pouch cell by using an activated carbon (e.g., CEP21k) as the positive electrode active material and $V_{1/2}Sb_{1/2}SnO_4$ nanoparticles as the negative electrode active material. Suitable vendors of the CEP21k include GSCaltex of South Korea. $V_{1/2}Sb_{1/2}SnO_4$ nanoparticles were prepared by heating $V_{1/2}Sb_{1/2}SnO_4$—HPB-45 composite at 600° C. for 4 hours in air. The positive electrode was made by coating a slurry of CEP21k (70 wt %), carbon black (e.g., VXC-72, 24 wt %), and sodium carboxymethyl cellulose (cmc, 6 wt %) onto an expanded aluminum foil. The film thickness was about 56 µm for the activated carbon layer. The negative electrode was made by coating a slurry of $V_{1/2}Sb_{1/2}SnO_4$ nanoparticles (84 wt %), carbon black (e.g., Super P, 10 wt %), cmc (2 wt %), and styrene butadiene rubber (SBR, 4 wt %) onto an expanded copper mesh. The film thickness of the electrochemically-active layer was about 25 µm. For the full cell, the mass ratio between the negative electrode active material (e.g., $V_{1/2}Sb_{1/2}SnO_4$) and the positive electrode active material (e.g., CEP21k) was 0.62 and the total loading of the electrode materials (e.g., active material, carbon black, and binder) from both electrodes was 73.8 mg.

Figure 13A:
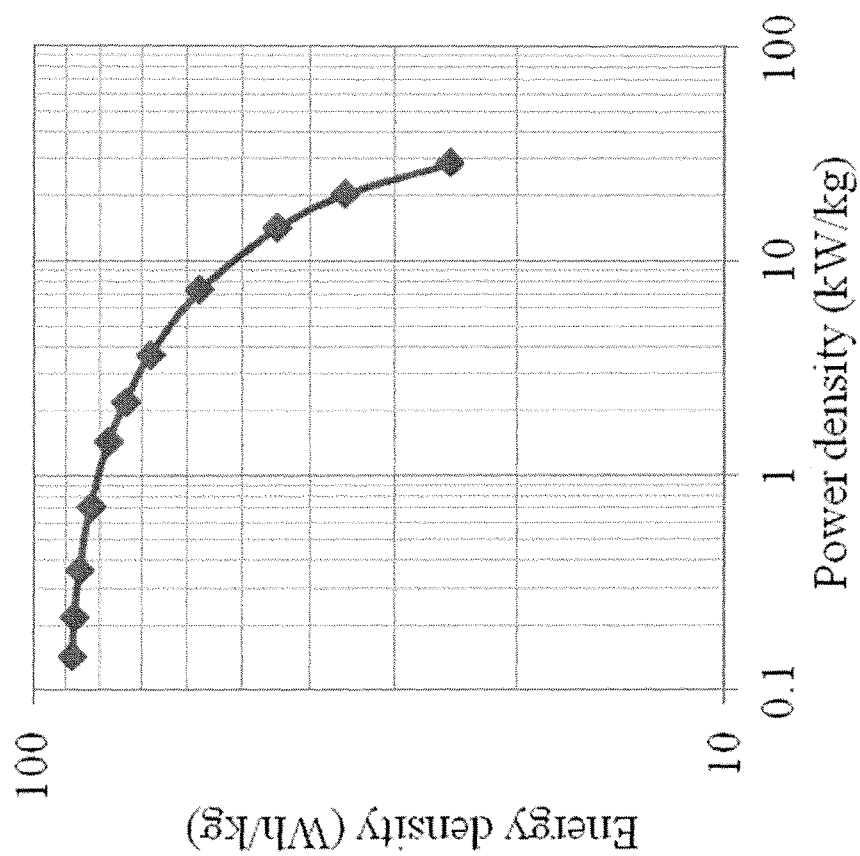
FIG. 13A is a Ragone plot for a CPE21k/$V_{1/2}Sb_{1/2}SnO_4$ lithium ion capacitor in accordance with exemplary embodiments of the present invention.
Figure 13B:
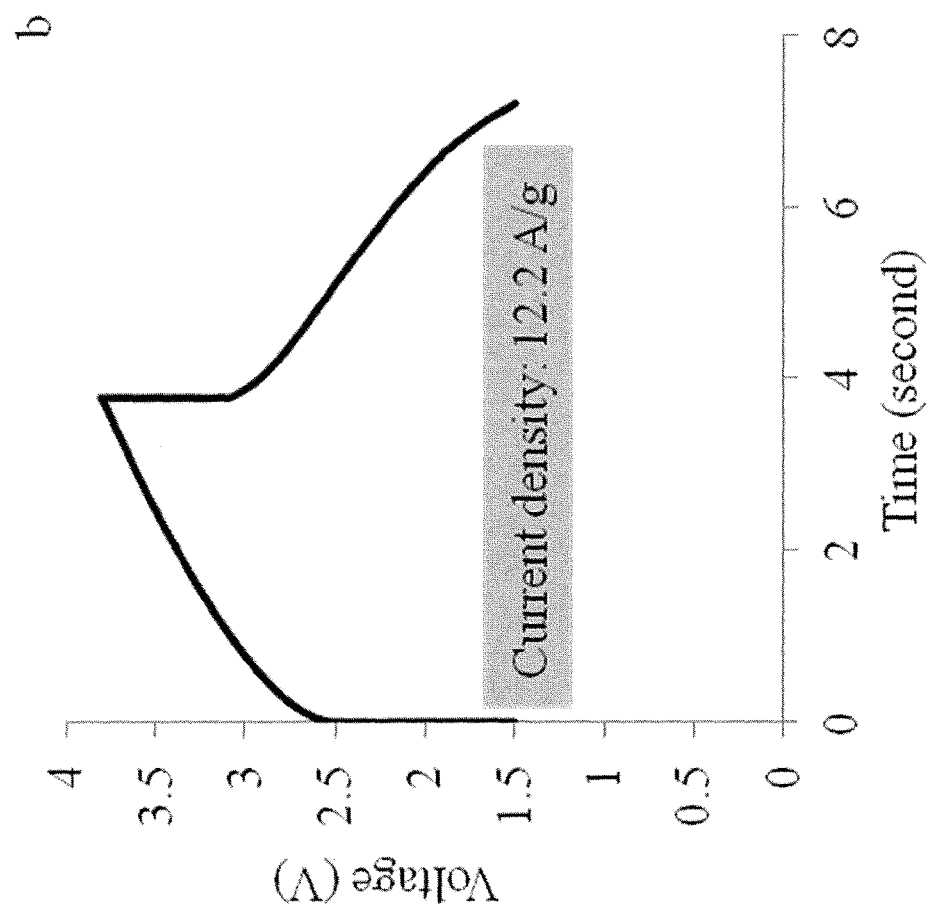
FIG. 13B is a constant current charge/discharge curve at 12.2 A/g for a CPE21k/$V_{1/2}Sb_{1/2}SnO_4$ lithium ion capacitor in accordance with exemplary embodiments of the present invention.

The negative electrode was lithiated with a piece of lithium foil at first. The pouch cell was then tested at various charge/discharge rates at the voltage range of 1.5V to 3.8 V. The Ragone plot, as shown in FIG. 13A, shows that the capacitor has an energy density about 88 Wh/kg at a slow charge/discharge rate and still has an energy density about 36 Wh/kg at a power density of 20 kW/kg. A Ragone plot is a plot used for performance comparison of various energy storage devices, on which, the value of energy density (in Wh/kg) is plotted versus power density (in W/kg). FIG. 13B shows representative constant current charge/discharge curves from one cycle. The capacitor is charged/discharged within 4 seconds with a decent output of energy density about 25 Wh/kg, which is much faster than a conventional lithium ion battery that generally takes tens of minutes for charge/discharge. This confirms that the tin oxide-based material may be used for high rate applications.

Figure 13C:
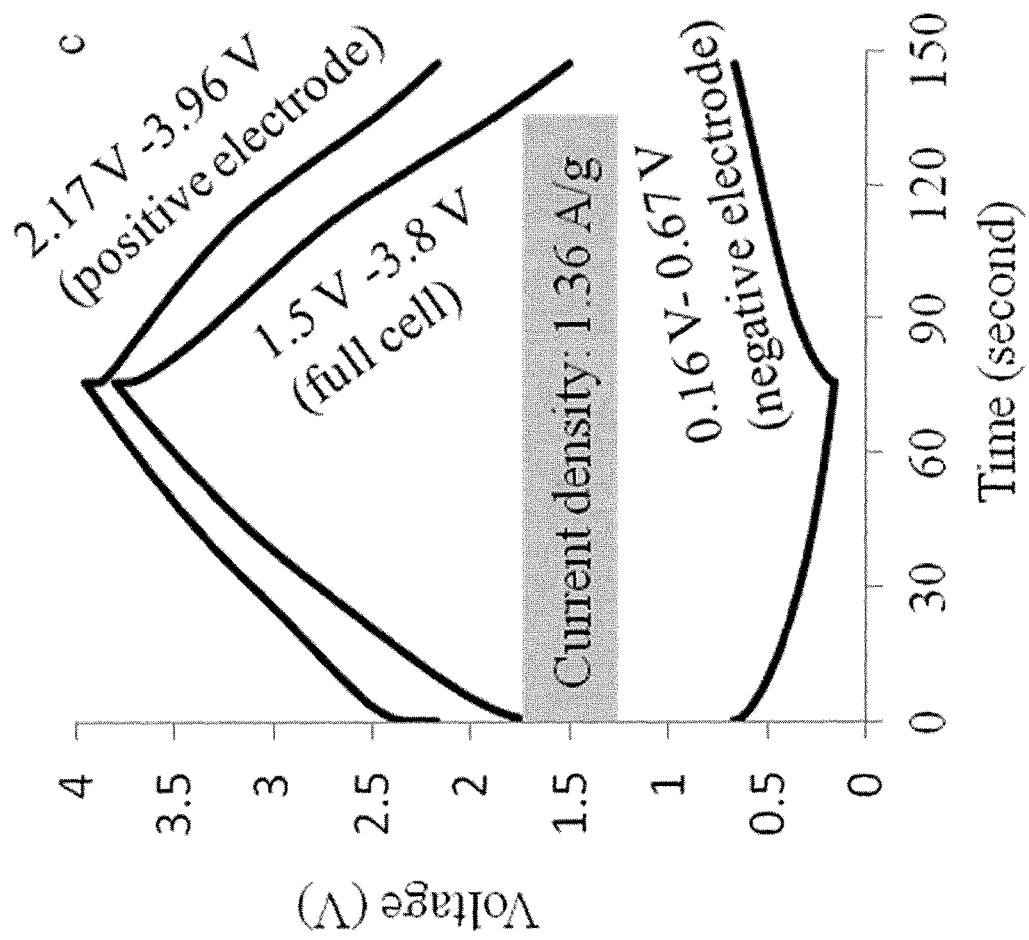
FIG. 13C is constant current charge/discharge curves at a 1.36 A/g for a CPE21k/$V_{1/2}Sb_{1/2}SnO_4$ lithium ion capacitor in accordance with exemplary embodiments of the present invention.
Figure 13D:
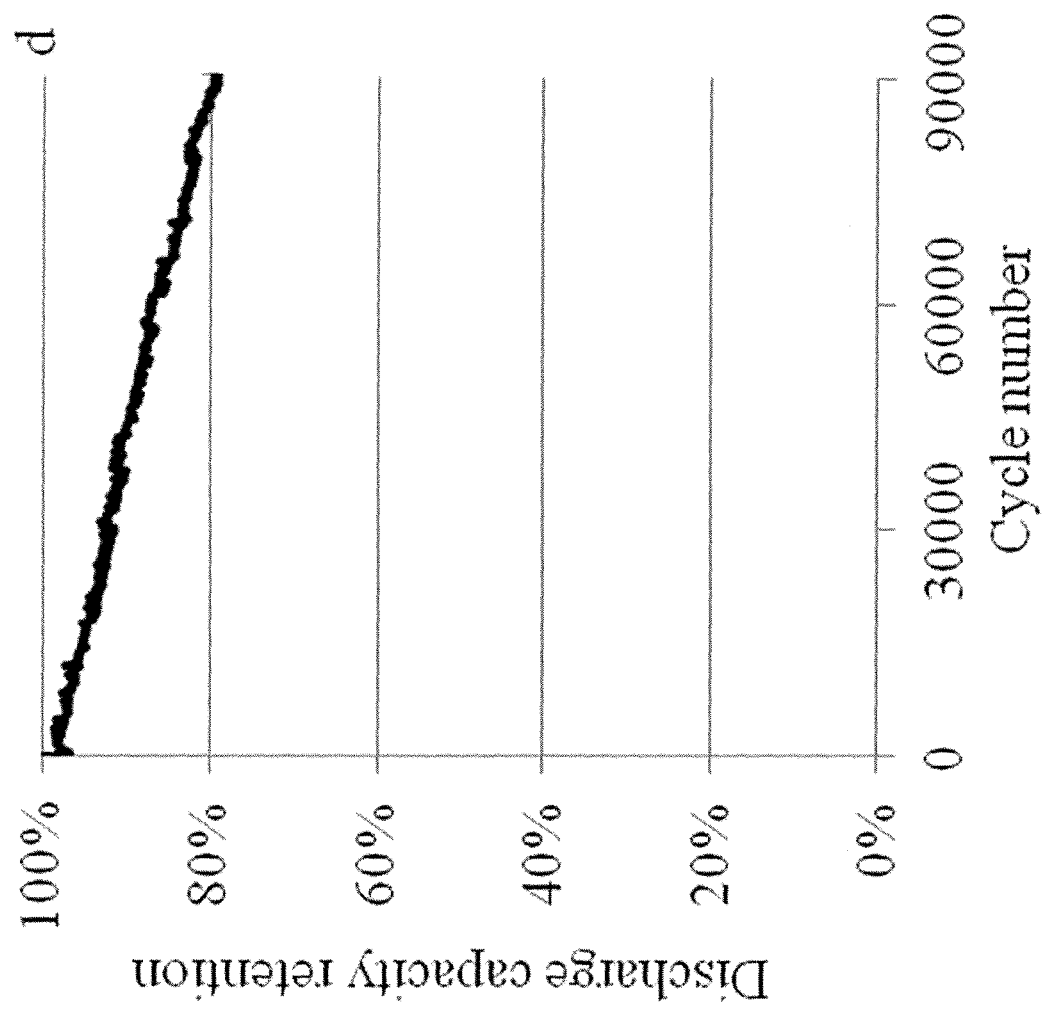
FIG. 13D is a cycling stability curve at 1.36 A/g for a CPE21k/$V_{1/2}Sb_{1/2}SnO_4$ lithium ion capacitor in accordance with exemplary embodiments of the present invention.

The cycling stability of the fabricated lithium ion capacitor was evaluated by using a relatively fast charge/discharge rate so that a significant amount of energy density may be used. The cell was charged/discharged in about 76 seconds, as shown in FIG. 13C. At this rate, a current-dependent voltage drop at the negative electrode is negligible suggesting that the tin oxide-based electrode film has low resistance from both ion transport and electron transport. The negative electrode was cycled between 0.16V to 0.67V at the early stage of the cycling. With this voltage range, the tin particles in the negative electrode material may experience a volume change as high as 180% during cycling. With this large volume change from tin, the fabricated pouch cell was stable for about 90,000 cycles with a capacity loss of 20%, which is surprisingly stable for a tin oxide-based negative electrode.

FIGS. 13A-13D show that a fabricated CEP21k/$V_{1/2}Sb_{1/2}SnO_4$ pouch cell may be charged/discharged within 4 seconds and may be stable over 90,000 cycles with a capacity loss about 80%, which is very impressive for a tin oxide-based electrode material. This shows that carbon-free $V_{1/2}Sb_{1/2}SnO_4$ nanoparticles may be stable for high rate applications.

Example 7

Activated Carbon/$V_{1/2}Sb_{1/2}SnO_z$—HPB-45 ($0<z\leq4$) High Rate Lithium Ion Capacitor One cell was made from CEP21k and $V_{1/2}Sb_{1/2}SnO_z$—HPB-45 (about 20 wt % HPB-45). The films were prepared by coating slurries onto expanded metal foils. The porous film on the positive electrode had a composition of CEP21k (70 wt %), VXC-72 (24 wt %), and cmc (6 wt %) with a film thickness about 60 µm. The porous film on the negative electrode had a composition of $V_{1/2}Sb_{1/2}SnO_z$—HPB-45 (84 wt %), 10 wt % carbon black (e.g., Super P), 2 wt % cmc, and 4 wt % SBR with a film thickness about 36 µm. The mass ratio between the negative electrode active material (e.g., $V_{1/2}Sb_{1/2}SnO_z$—HPB-45) and the positive electrode active material (e.g., CEP21k) was 0.94.

Figure 14A:
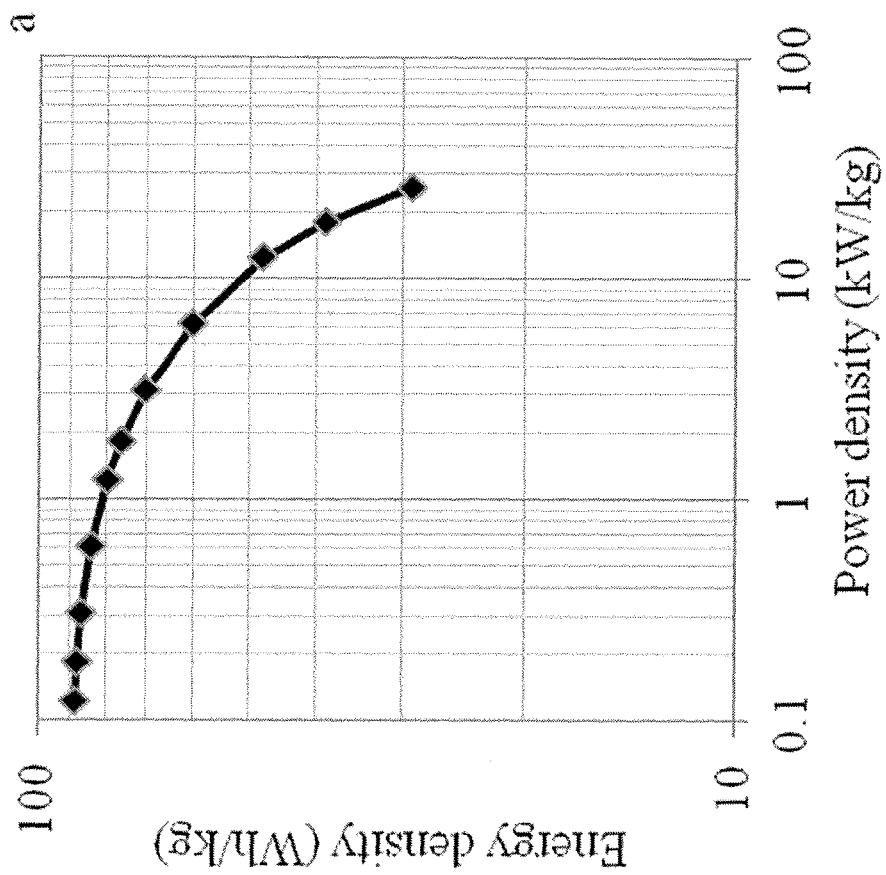
FIG. 14A is a Ragone plot for a lithium ion capacitor (e.g., CPE21k/$V_{1/2}Sb_{1/2}SnO_z$—HPB-45) in accordance with exemplary embodiments, where z is a positive number of the present invention.
Figure 14B:
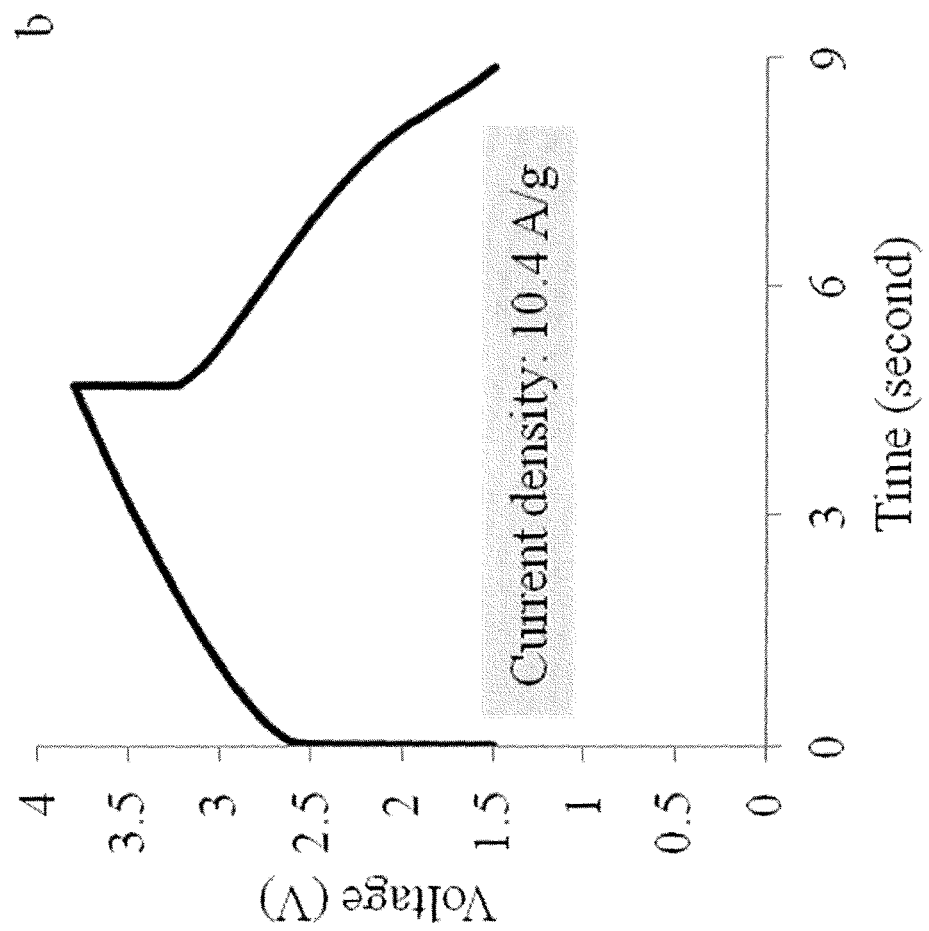
FIG. 14B is constant current charge/discharge curves at 10.4 A/g for a lithium ion capacitor (e.g., CPE21k/$V_{1/2}Sb_{1/2}SnO_z$—HPB-45) in accordance with exemplary embodiments of the present invention, where z is a positive number.

The Ragone plot of the pouch cell is shown in FIG. 14A. The cell had an energy density about 88 Wh/kg at a slow rate, which is the same as the CEP21k/$V_{1/2}Sb_{1/2}SnO_4$ cell discussed in Example 6. At a high rate (e.g., power density: 18 kW/kg), the energy density was 39 Wh/kg, which again was similar to the values from the CEP21k/$V_{1/2}Sb_{1/2}SnO_4$ cell. It is interesting to see that the two cells had similar performance considering the difference in the negative electrode material and the mass ratio. The fabricated lithium ion capacitor was charged/discharged in about 4.5 seconds, as shown in FIG. 14B, which was much faster than a lithium ion battery and comparable to a double layer capacitor.

Figure 14C:
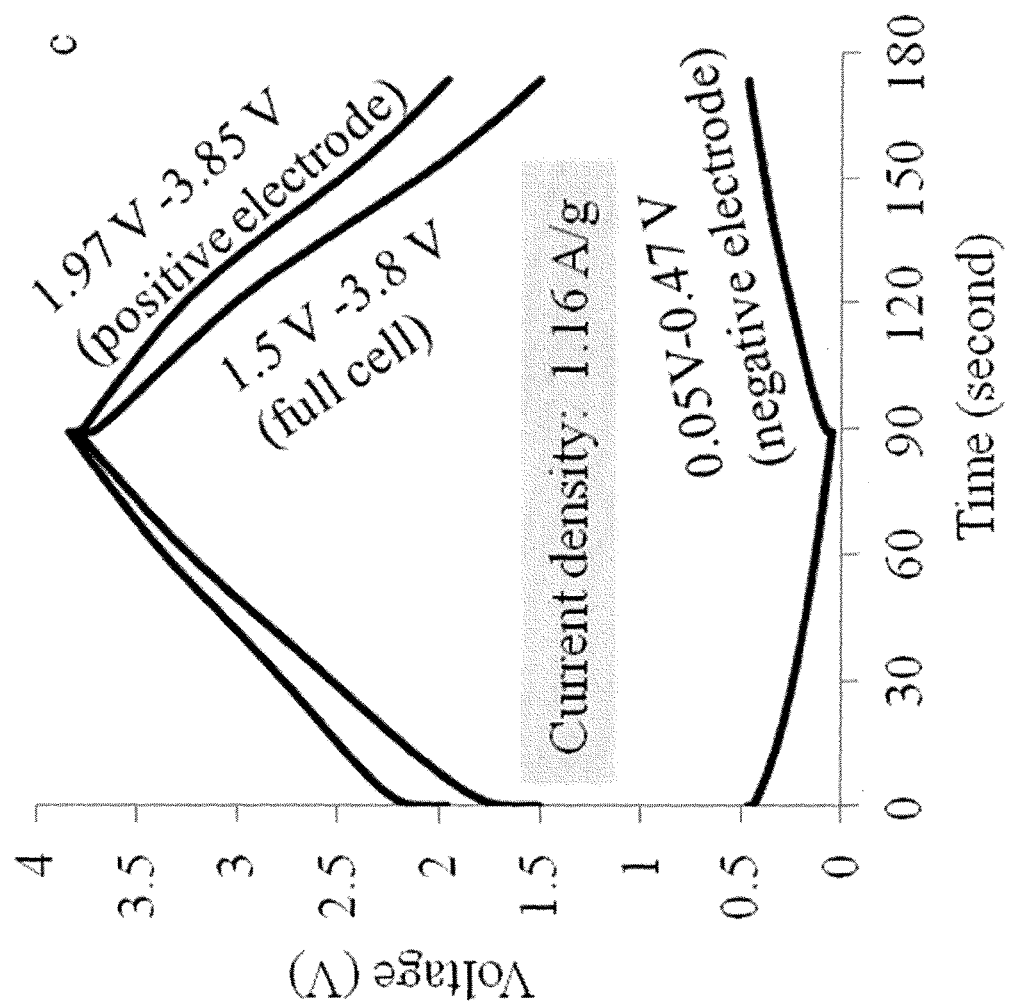
FIG. 14C is constant current charge/discharge curves at 1.16 A/g for a lithium ion capacitor (e.g., CPE21k/$V_{1/2}Sb_{1/2}SnO_z$—HPB-45) in accordance with exemplary embodiments of the present invention, where z is a positive number.
Figure 14D:
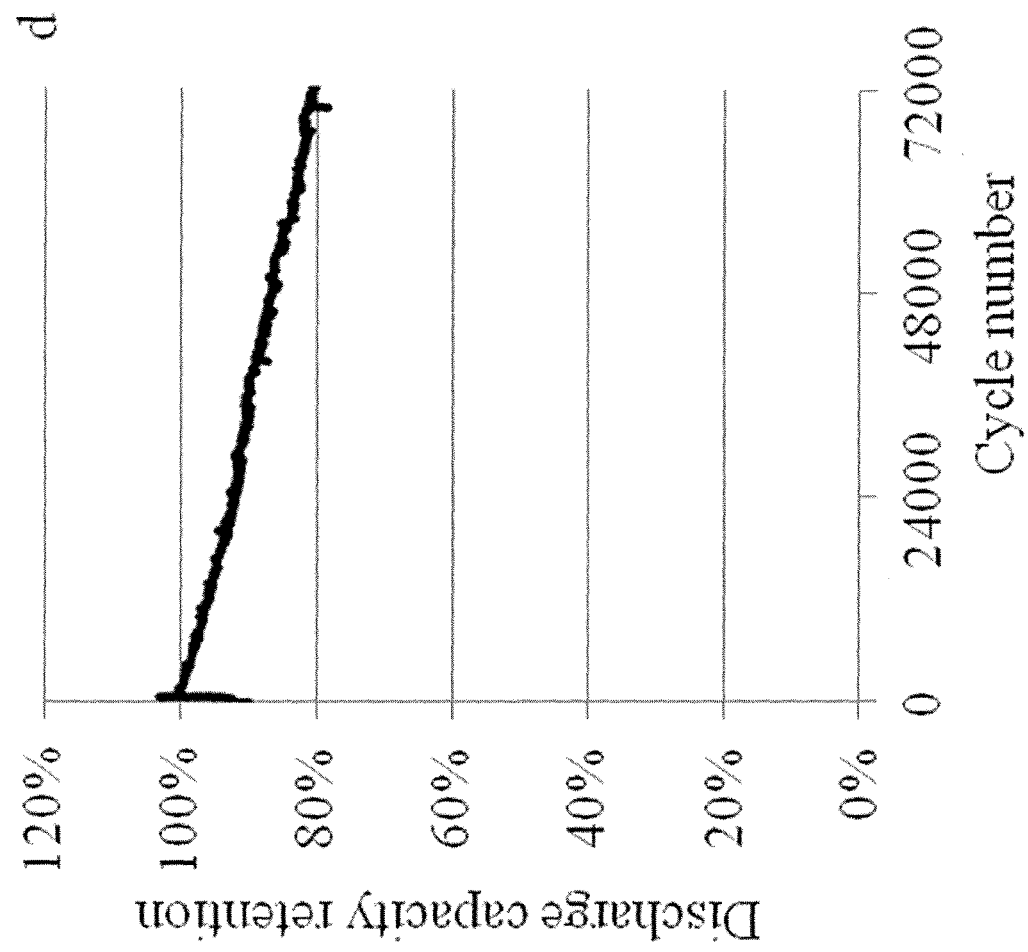
FIG. 14D is a cycling stability curve at 1.16 A/g for a lithium ion capacitor (e.g., CPE21k/$V_{1/2}Sb_{1/2}SnO_z$—HPB-45) in accordance with exemplary embodiments of the present invention, where z is a positive number.

When cycled at a relatively fast rate (about 90 seconds or 40 C), as shown in FIG. 14C, the fabricated lithium ion capacitor showed an excellent cycling stability stable for 72,000 cycles with a capacity loss about 20%. The cycling stability of the fabricated lithium ion capacitor, however, was slightly worse than that from the previous CEP21k/$V_{1/2}Sb_{1/2}SnO_4$ cell with a negative electrode active material/positive electrode active material mass ratio of 0.62, even with more negative electrode material used in the fabricated cell, for example, negative electrode active material/positive electrode active material mass ratio of 0.94. The negative electrode in the CEP21k/$V_{1/2}Sb_{1/2}SnO_4$ cell was cycled between 0.16 to 0.67 V vs. Li/Li$^+$, while the negative electrode of the fabricated lithium ion capacitor was cycled between 0.05 to 0.47 V vs. Li/Li$^+$. The difference in cycling stability may result from the different volume change at the negative electrode.

Another full cell was made from an activated carbon P2-15. Suitable vendors of the P2-15 include EnerG2 of Seattle, Wash. The P2-15 has a lower capacity than the CEP21k, but has better rate capability than the CEP21k. A positive electrode was made by coating a slurry of the P2-15 (76 wt %), carbon black (e.g., VXC-72, 16 wt %), and cmc (8 wt %) on an expanded Al mesh. The film thickness was about 43 µm for the activated carbon layer. A negative electrode was made by coating $V_{1/2}Sb_{1/2}SnO_z$—HPB-45 (84 wt %), 10 wt % carbon black (e.g., Super P), 2 wt % cmc, and 4 wt % SBR on an expanded copper mesh. The film thickness was about 36 µm for the tin oxide layer. In the full cell, the mass ratio between the negative electrode active material (e.g., $V_{1/2}Sb_{1/2}SnO_z$—HPB-45) and the positive electrode active material (e.g., P2-15) was 1.45.

Figure 15A:
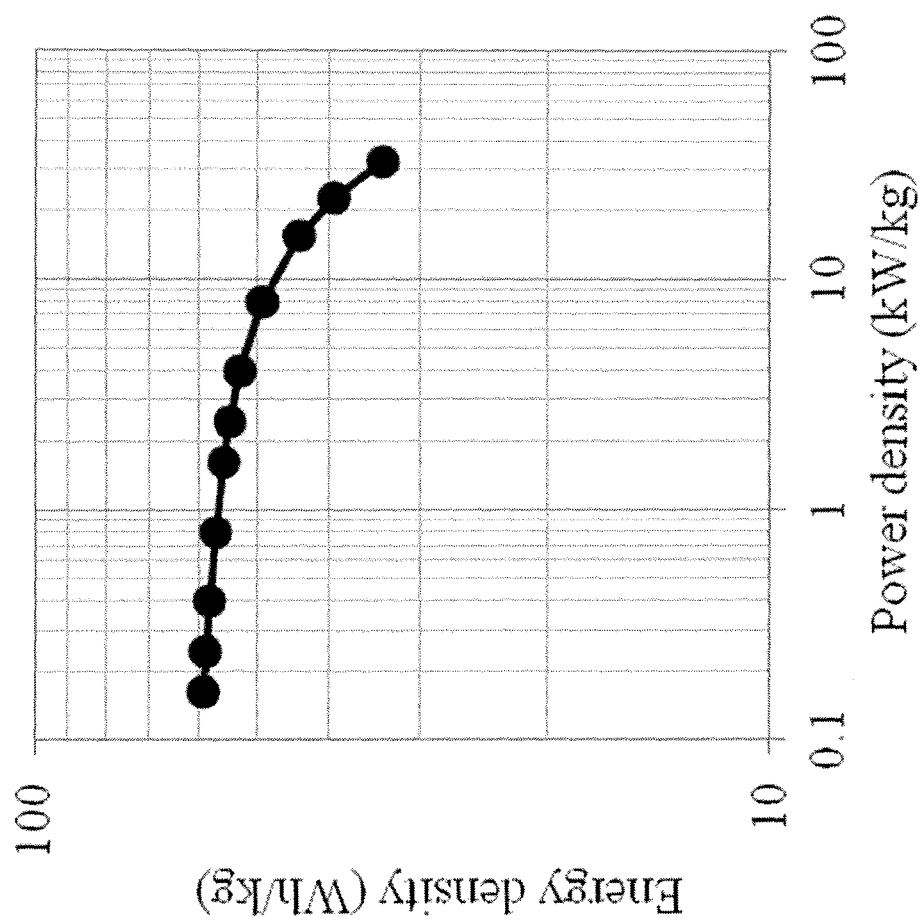
FIG. 15A is a Ragone plot for a lithium ion capacitor (e.g., P2-15/$V_{1/2}Sb_{1/2}SnO_z$—HPB-45) in accordance with exemplary embodiments of the present invention, where z is a positive number.
Figure 15B:
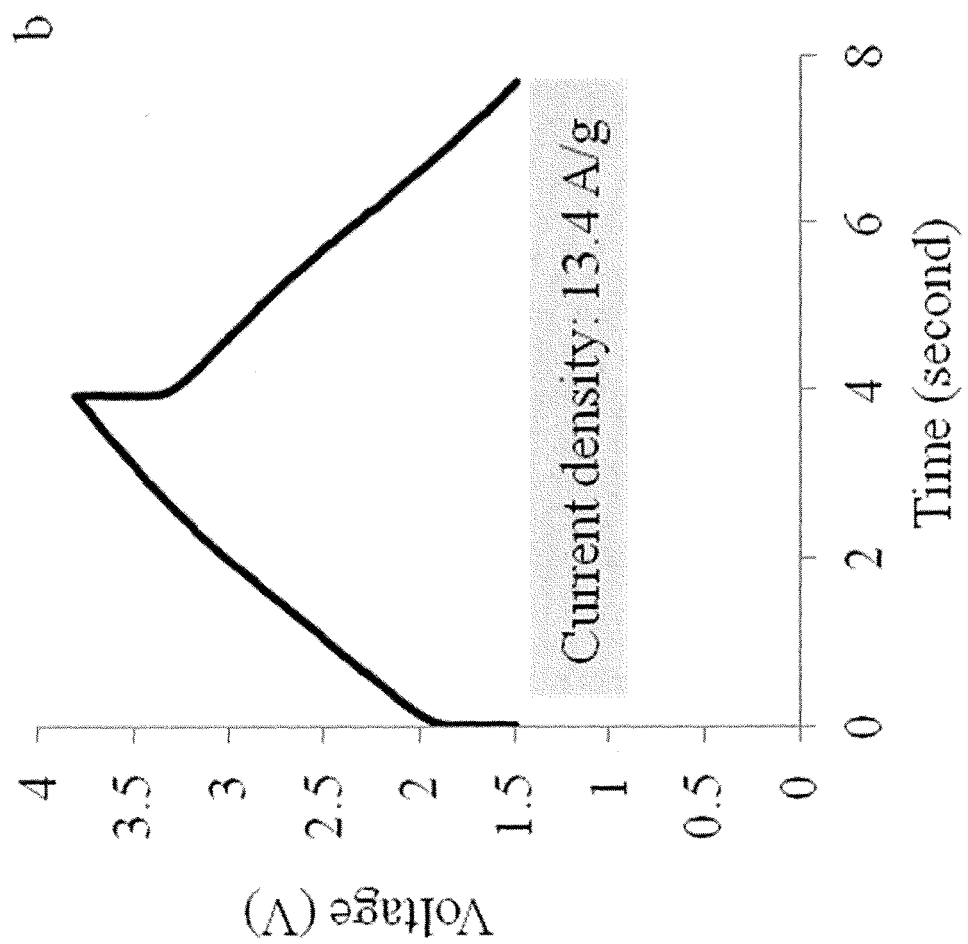
FIG. 15B shows the constant current charge/discharge curves at 13.4 A/g for a lithium ion capacitor (e.g., P2-15/$V_{1/2}Sb_{1/2}SnO_z$—HPB-45) in accordance with exemplary embodiments of the present invention, where z is a positive number.

The Ragone plot of the fabricated capacitor shows a better rate capability than that from the CEP21k/($V_{1/2}Sb_{1/2}SnO_z$—HPB-45) cell, as shown in FIG. 15A. At a slow charge/discharge rate, the energy density was about 59 Wh/kg, which is much smaller than 88 Wh/kg from CEP21k/($V_{1/2}Sb_{1/2}SnO_z$—HPB-45). The lower energy density is expected since the P2-15 had much smaller capacity than the CEP21k. However, the energy density of the current capacitor (i.e., P2-15/($V_{1/2}Sb_{1/2}SnO_z$—HPB-45)) was about 39 Wh/kg (66% energy density retention) at a power density of 22 kW/kg, which is better than the two fabricated capacitors made from CEP21k (e.g., CEP21k/($V_{1/2}Sb_{1/2}SnO_4$) and CEP21k/($V_{1/2}Sb_{1/2}SnO_z$—HPB-45)) mainly because of the high rate performance of the P2-15. Similar to other fabricated lithium ion capacitors, the current capacitor can be charged/discharged within several seconds (4 seconds) confirming the good high rate capability of the lithiated tin oxide-based electrode material, as shown in FIG. 15B.

Figure 15C:
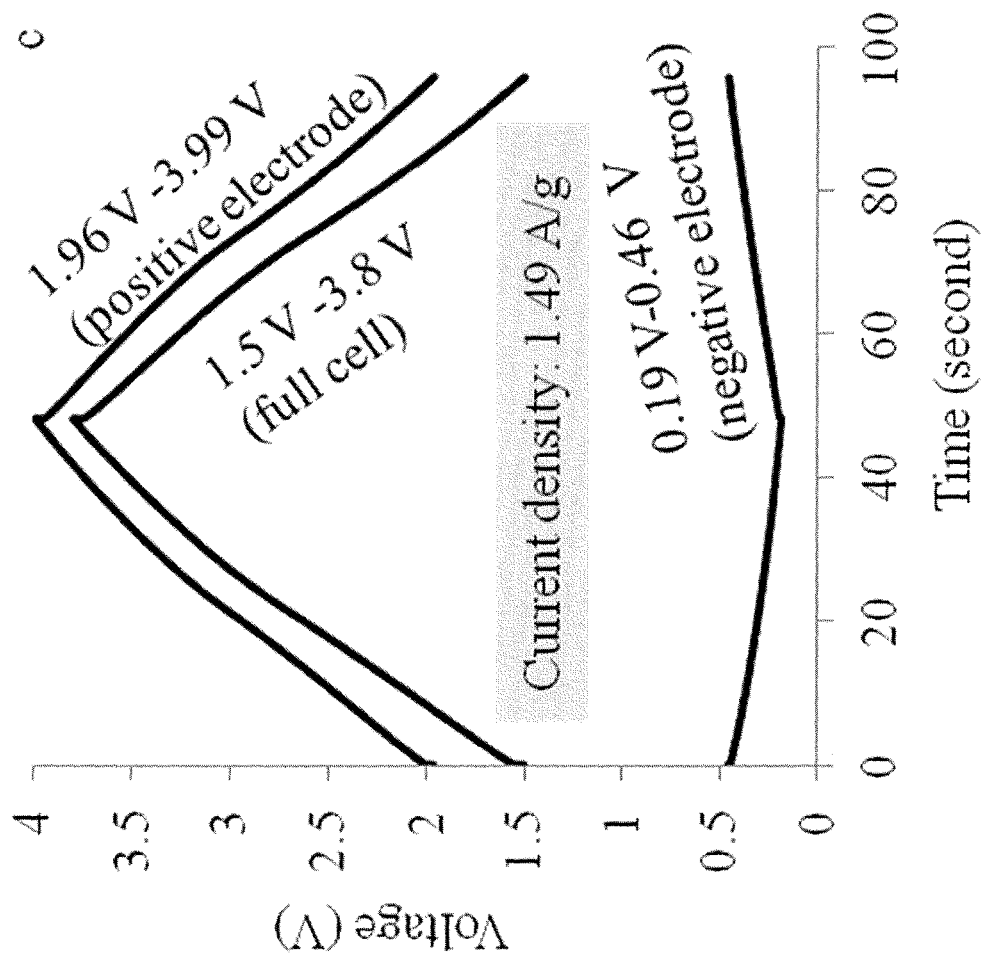
FIG. 15C is a Ragone plot for a lithium ion capacitor (e.g., P2-15/$V_{1/2}Sb_{1/2}SnO_z$—HPB-45) in accordance with exemplary embodiments of the present invention, where z is a positive number.
Figure 15D:
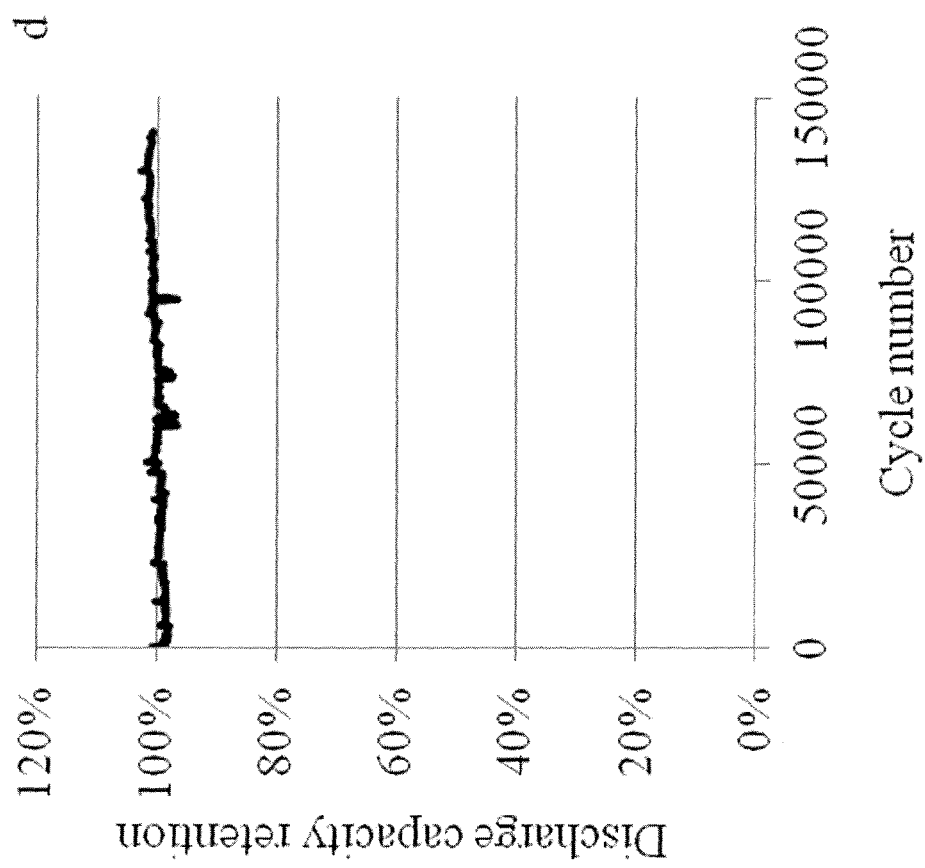
FIG. 15D is a cycling stability curve at 1.49 A/g for a lithium ion capacitor (e.g., P2-15/$V_{1/2}Sb_{1/2}SnO_z$—HPB-45) in accordance with exemplary embodiments of the present invention, where z is a positive number.

The fabricated capacitor (e.g., P2-15/($V_{1/2}Sb_{1/2}SnO_z$—HPB-45)) shows an excellent cycling stability at a fast charge/discharge rate, as shown in FIG. 15C. No capacity loss was observed at least after 140,000 cycles with a fast charge/discharge rate of 75 C (48 seconds). This demonstrates that the lithiated tin oxide-based negative electrode material may be used for a high rate lithium ion capacitor with excellent cycling stability, which is surprising for tin-based electrode materials because of the inevitable volume change of tin particles during cycling.

FIGS. 14A-14D show that the fabricated CEP21k/$V_{1/2}Sb_{1/2}SnO_z$—HPB-45 pouch cell may be charged/discharged within 4.5 seconds and may be stable over 72,000 cycles. This shows the $V_{1/2}Sb_{1/2}SnO_4$-carbon composite may be used for high rate applications with excellent cycling stability. FIGS. 15A-15D show that the fabricated P2-15/($V_{1/2}Sb_{1/2}SnO_4$—HPB-45) pouch cell may be charged/discharged within 4 seconds and may be stable over 140,000 cycles without any capacity loss. This shows that the negative electrode material (e.g., $V_{1/2}Sb_{1/2}SnO_4$—HPB-45) could be extraordinarily stable if the utilization of tin was limited during cycling.

Example 8

An Activated Carbon/$Fe_{1/2}SnO_x$—HPB-45 Lithium Ion Capacitor

A lithium ion capacitor is made by using the CEP21k as the positive electrode material and $Fe_{1/2}SnO_x$—HPB-45 (e.g., about 20 wt % of HPB-45) composite as the negative electrode material. $Fe_{1/2}SnO_x$—HPB-45 is a mixture including tin, iron tin oxide, and HPB-45. The synthesis and characterization of this material is discussed in the Example 5 above.

The positive electrode is made by coating a slurry of the CEP21k (70 wt %), VXC-72 (24 wt %), cmc (6 wt %) onto an expanded aluminum mesh. The film thickness for the dried activated carbon layer is about 56 μm. The negative electrode is made by coating a slurry of $Fe_{1/2}SnO_x$—HPB-45 (84 wt %), Super P (10 wt %), cmc (2 wt %), and SBR (4 wt %) onto an expanded copper (Cu) mesh. The film thickness for a dried $Fe_{1/2}SnO_x$—HPB-45 layer is about 32 μm. The mass ratio between the negative electrode active material (e.g., $Fe_{1/2}SnO_x$—HPB-45) and the positive electrode material (e.g., CEP21k) is 1.58.

Figure 16A:
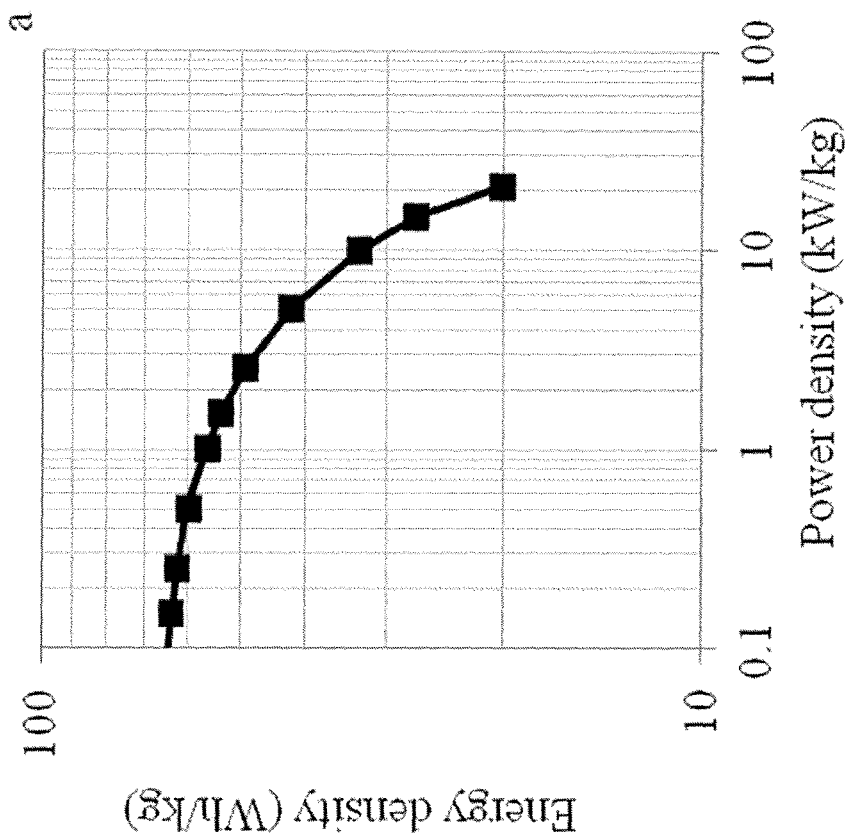
FIG. 16A is a Ragone plot for a lithium ion capacitor (e.g., CEP21k/$Fe_{1/2}SnO_z$—HPB-45) in accordance with exemplary embodiments of the present invention, where z is a positive number.
Figure 16B:
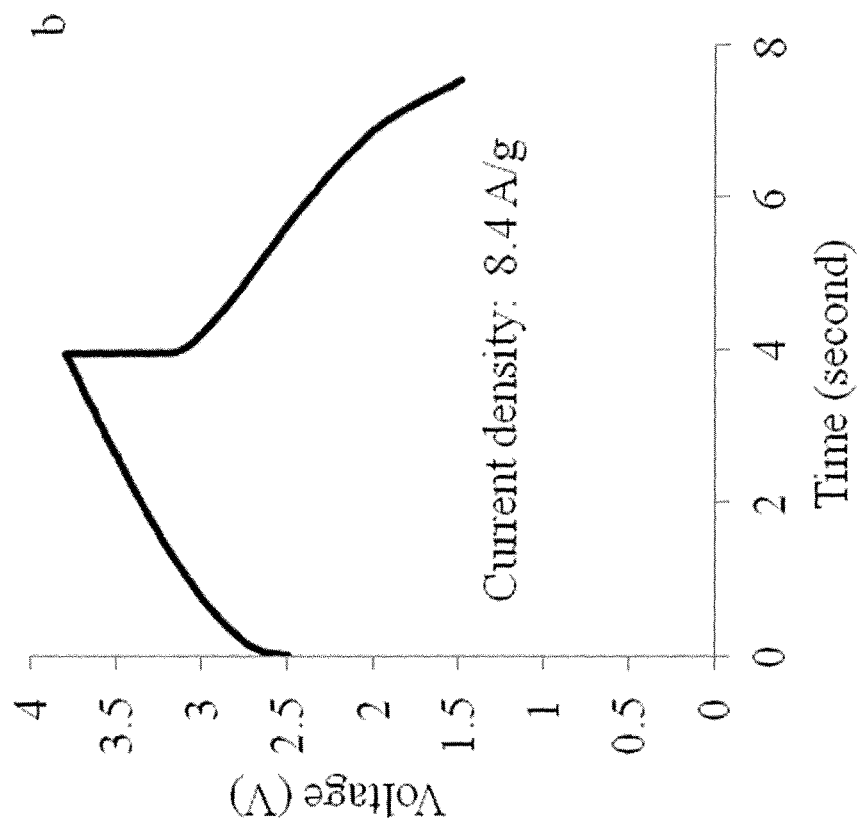
FIG. 16B shows constant current charge/discharge curves at 8.4 A/g for a lithium ion capacitor (e.g., CEP21k/$Fe_{1/2}SnO_z$—HPB-45) in accordance with exemplary embodiments of the present invention, where z is a positive number.
Figure 17A:
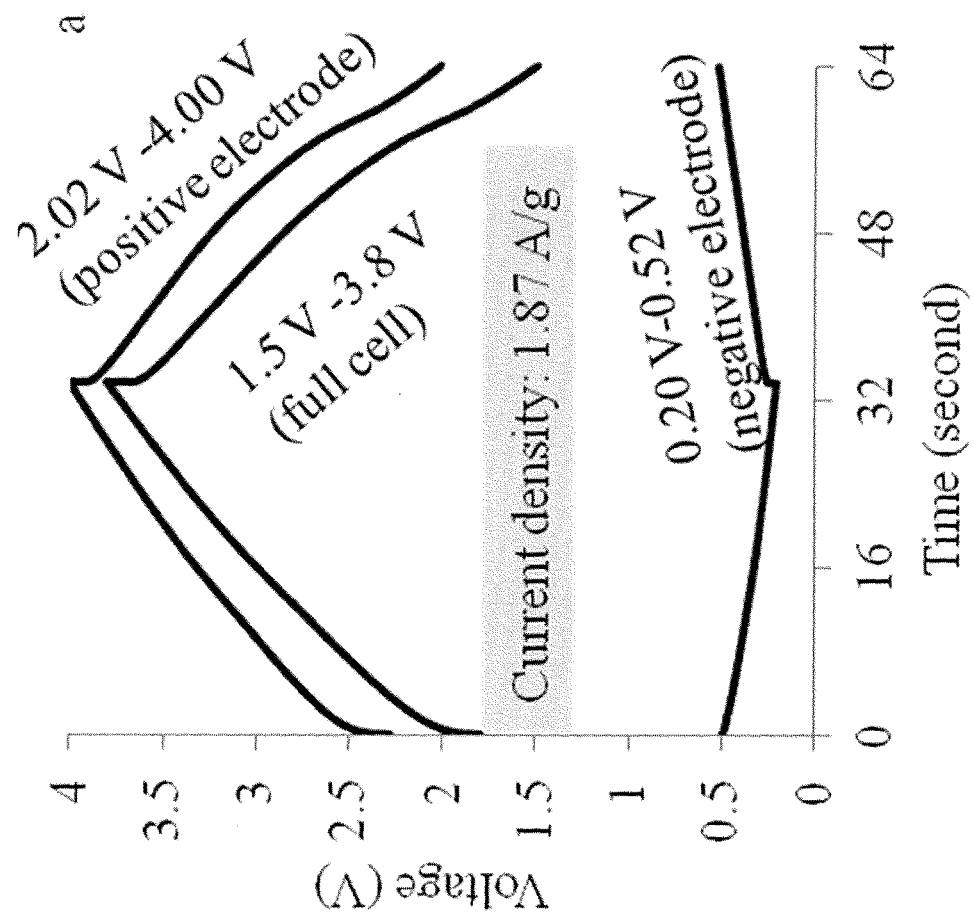
FIG. 17A shows constant current charge/discharge curves at 1.87 A/g for a lithium ion capacitor (e.g., CEP21k/$Fe_{1/2}SnO_z$—HPB-45) in accordance with exemplary embodiments of the present invention, where z is a positive number.
Figure 17B:
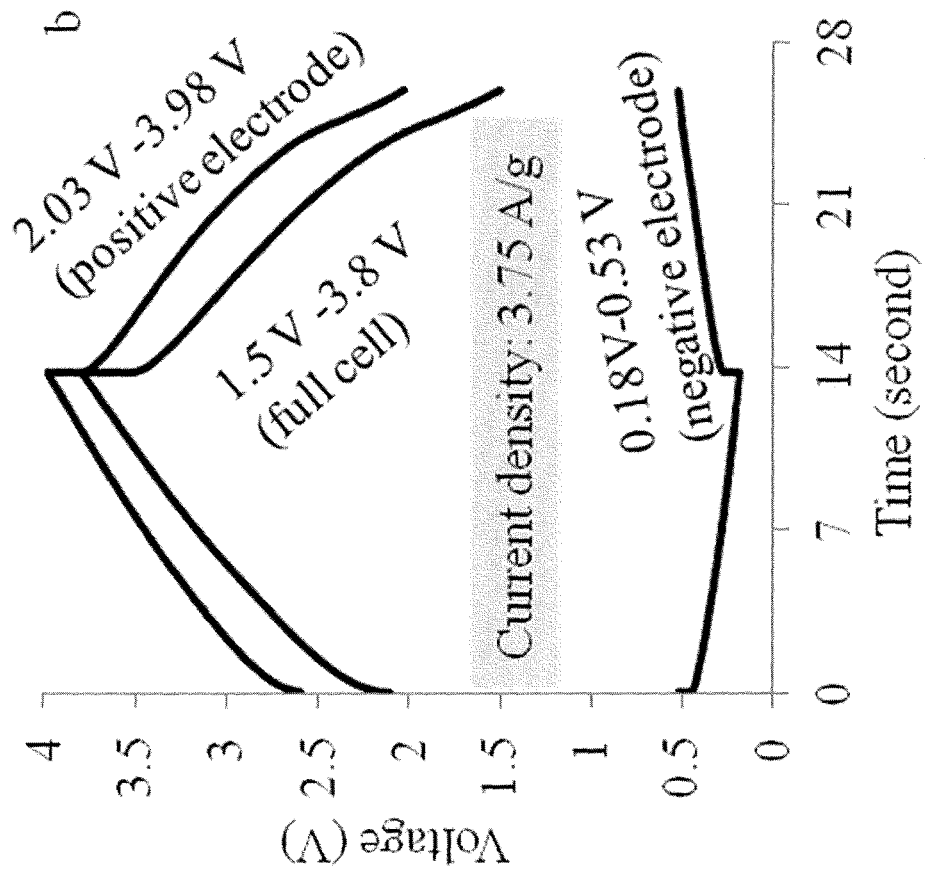
FIG. 17B shows constant current charge/discharge curves at 3.75 A/g for a lithium ion capacitor (e.g., CEP21k/$Fe_{1/2}SnO_z$—HPB-45) in accordance with exemplary embodiments of the present invention, where z is a positive number.
Figure 17C:
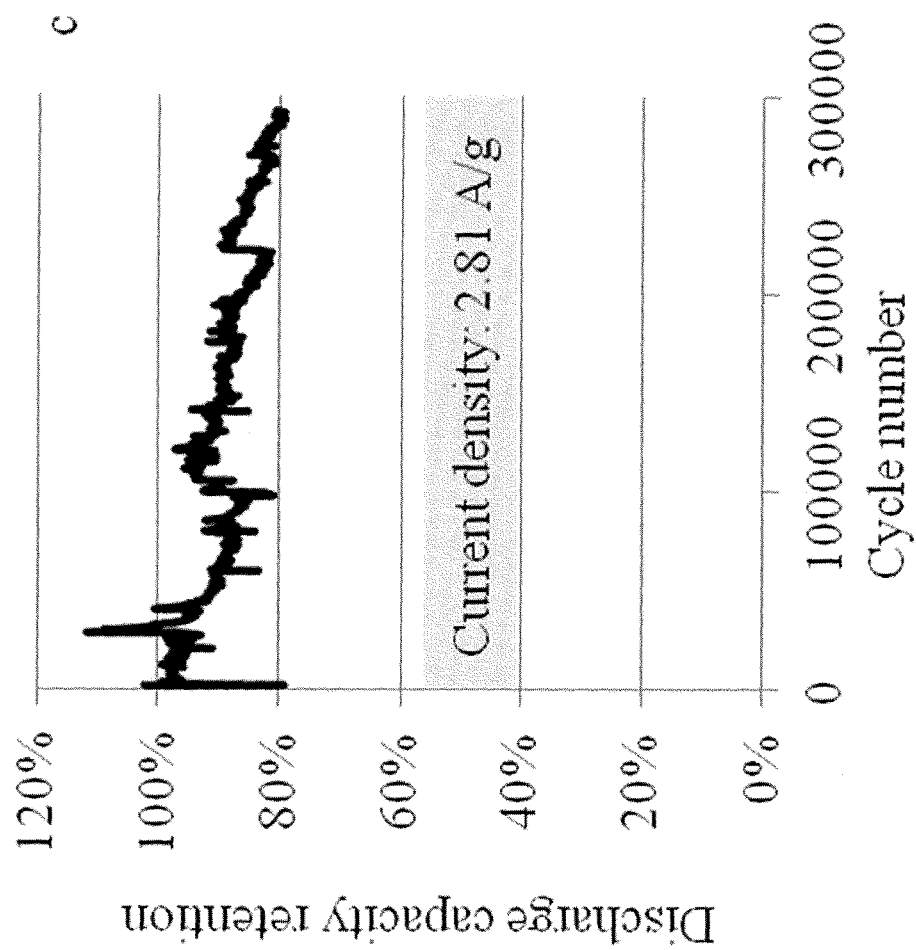
FIG. 17C is a cycling stability curve at 2.81 A/g for a lithium ion capacitor (e.g., CEP21k/$Fe_{1/2}SnO_z$—HPB-45) in accordance with exemplary embodiments of the present invention, where z is a positive number.

Similar to other fabricated capacitors, the current capacitor may be charged/discharged within about 4 seconds with a reasonable output of energy density, as shown in FIG. 16B. The energy density of this capacitor is about 64 Wh/kg at a slow rate, which is smaller than the value from a CEP21k/($V_{1/2}Sb_{1/2}SnO_z$—HPB-45) capacitor (88 Wh/kg), as shown in FIG. 16A. At a high rate (e.g., power density 20 kW/kg), the energy density is 20 Wh/kg, as shown in FIG. 16A. The energy densities at both slow and high rates are smaller than those from the CEP21k/($V_{1/2}Sb_{1/2}SnO_z$—HPB-45) cell. The difference may come from the negative electrode material. The specific capacity of $Fe_{1/2}SnO_x$—HPB-45 (210 mAh/g) is similar to that of $V_{1/2}Sb_{1/2}SnO_z$—HPB-45 (238 mAh/g) when both $Fe_{1/2}SnO_x$—HPB-45 and $V_{1/2}Sb_{1/2}SnO_z$—HPB-45 are cycled between 0.1V to 1.0V vs. Li/$Li^+$ under similar conditions. The capacity of $Fe_{1/2}SnO_x$—HPB-45 is much smaller if it is cycled below 0.60V since the process of LiSn→$Li_{7/3}$Sn may not be reversible. The maximum potential at the negative electrode was about 0.53V when the capacitor was cycled at 3.75 A/g, as shown in FIG. 17B. Because of the less utilization efficiency of tin at the negative electrode, the fabricated capacitor shows an even better cycling stability than the CEP21k/($V_{1/2}Sb_{1/2}SnO_z$—HPB-45) cell. Its capacity dropped about 20% after 300,000 cycles, which is surprisingly good for a tin-based negative electrode. The experiment shows that tin or tin-oxide based materials other than V—Sb—Sn mixed oxide may also be used for a high rate lithium ion capacitor with outstanding cycling stability.

FIGS. 16A-16B and 17A-17C show that a fabricated CEP21k/($Fe_{1/2}SnO_z$—HPB-45) pouch cell may be charged/discharged within 4 seconds and may be stable over 300,000 cycles. This shows that the negative electrode material may be extraordinarily stable even though it contains metallic tin particles. This also shows that a tin-based material could also be used for high rate applications with long cycling stability.

Example 9

A $LiMn_2O_4$/$V_{1/2}Sb_{1/2}SnO_4$ High Rate Lithium Ion Battery

The lithiated nano-architectured tin oxide-based materials show high rate capability and good cycling stability as negative electrode materials for lithium ion capacitors. These materials were also used for high rate (or high power) lithium ion batteries. Because of the limitation in the rate capability of commercial $LiMn_2O_4$, the rate capability of the fabricated lithium ion battery was not as good as that of the fabricated lithium ion capacitors, but is still comparable to the high power lithium ion batteries known in the art. The fabricated lithium ion battery is stable for 20,000 cycles without any capacity loss, which is much more stable than a conventional lithium ion battery.

$LiMn_2O_4$ was used as the active positive electrode material since it has a good cycling stability and rate capability at room temperature. A pouch cell was assembled with an Al-doped $LiMn_2O_4$ as the positive electrode material and $V_{1/2}Sb_{1/2}SnO_4$ as the negative electrode material. $V_{1/2}Sb_{1/2}SnO_4$ was made by heating $V_{1/2}Sb_{1/2}SnO_z$—HPB-45 in air at 600° C. for 4 hours. The tin oxide-based electrode material is lithiated by discharging it with a lithium foil before it is cycled with $LiMn_2O_4$.

A paste of $LiMn_2O_4$ (80 wt %), VXC-72 (10 wt %), and PVDF (10 wt %) is coated onto a copper mesh as the positive electrode. The film thickness of the dried $LiMn_2O_4$ layer is about 33 μm. The negative electrode is made by coating a paste including $V_{1/2}Sb_{1/2}SnO_4$ (84 wt %), Super P (10 wt %), cmc (2 wt %), and SBR (4 wt %) onto an aluminum foil. The film thickness of the dried $V_{1/2}Sb_{1/2}SnO_4$ layer is about 15 μm. A pouch cell is made from the two electrodes with a mass ratio of 0.41 between the negative electrode active material (i.e., $V_{1/2}Sb_{1/2}SnO_4$) and the positive electrode active material (i.e., $LiMn_2O_4$).

Figure 18A:
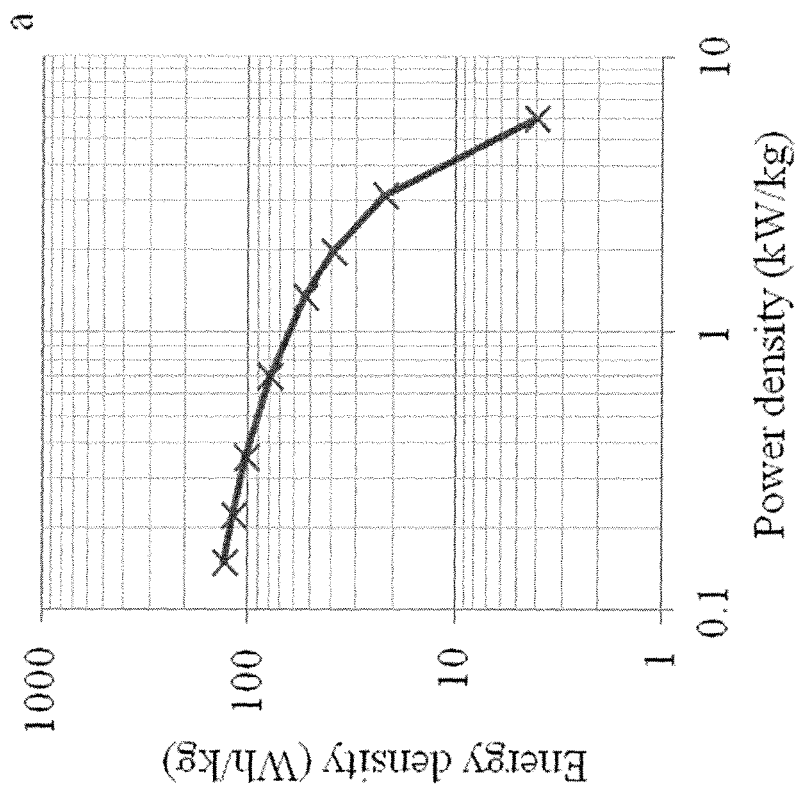
FIG. 18A is a Ragone plot for a lithium ion battery (e.g., $LiMn_2O_4$/$V_{1/2}Sb_{1/2}SnO_4$) in accordance with exemplary embodiments of the present invention.
Figure 18B:
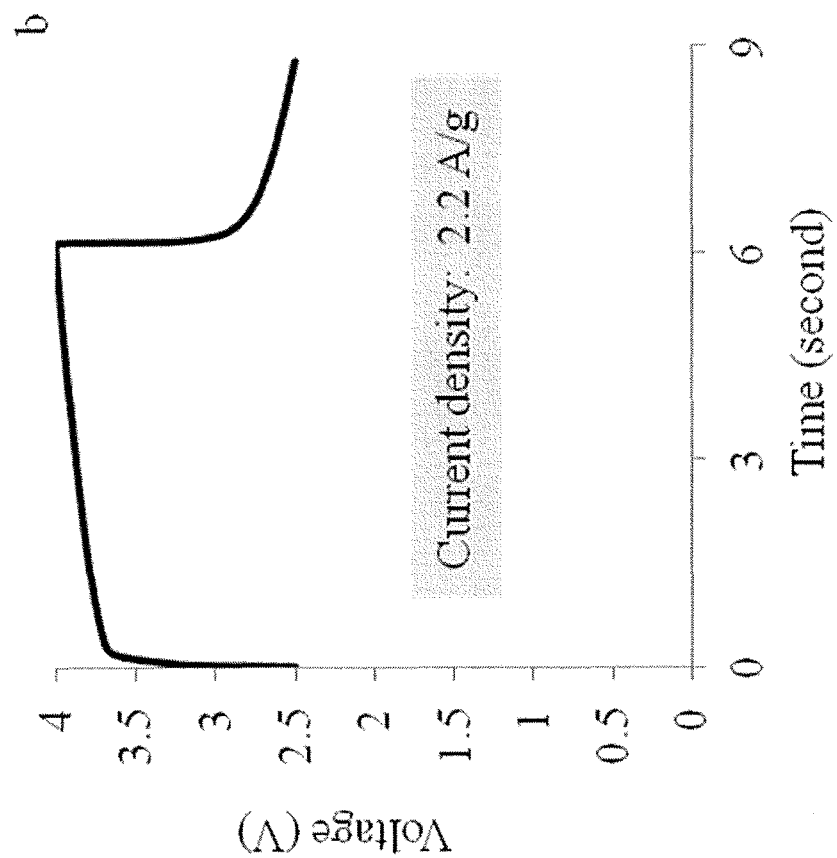
FIG. 18B shows constant current charge/discharge curves at 2.2 A/g for a lithium ion battery (e.g., $LiMn_2O_4$/$V_{1/2}Sb_{1/2}SnO_4$) in accordance with exemplary embodiments of the present invention.

The negative electrode is lithiated in the pouch cell before the full cell is cycled between 2.5V to 4.0V at various rates. The fabricated lithium ion battery has poor rate capability compared to lithium ion capacitors even though they both use the same negative electrode material. The energy density is 4 Wh/kg even at a relatively fast rate (e.g., power density: 5.9 kW/kg, as shown in FIG. 18A), which is much worse than the rate performance from a CEP21k/$V_{1/2}Sb_{1/2}SnO_4$ capacitor (e.g., 36 Wh/kg at 20 kW/kg). The lack of high rate capacity is likely because of the rate limitation for $LiMn_2O_4$. The resistance is already about 0.9V when the high rate lithium ion battery is charged/discharged at 2.2 A/g, as shown in FIG. 18B. In comparison, the current-dependent voltage drop is about 0.7V at a much higher current density (12.2 A/g) when $LiMn_2O_4$ is replaced with CEP21k, as shown in FIG. 13B.

Figure 18C:
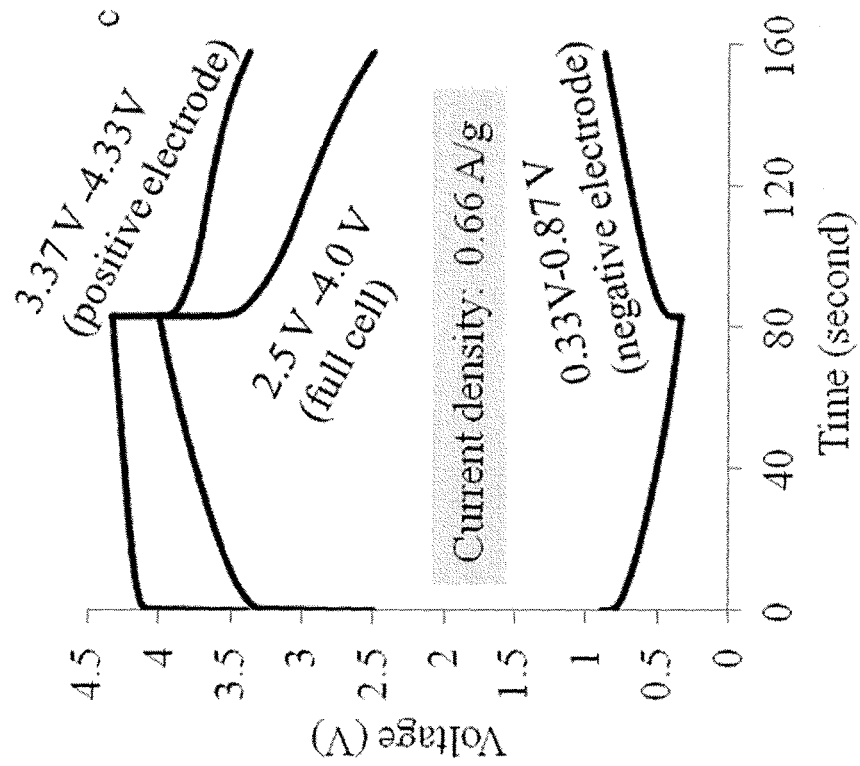
FIG. 18C shows constant current charge/discharge curves at 0.66 A/g for a lithium ion battery (e.g., $LiMn_2O_4$/$V_{1/2}Sb_{1/2}SnO_4$) in accordance with exemplary embodiments of the present invention.
Figure 18D:
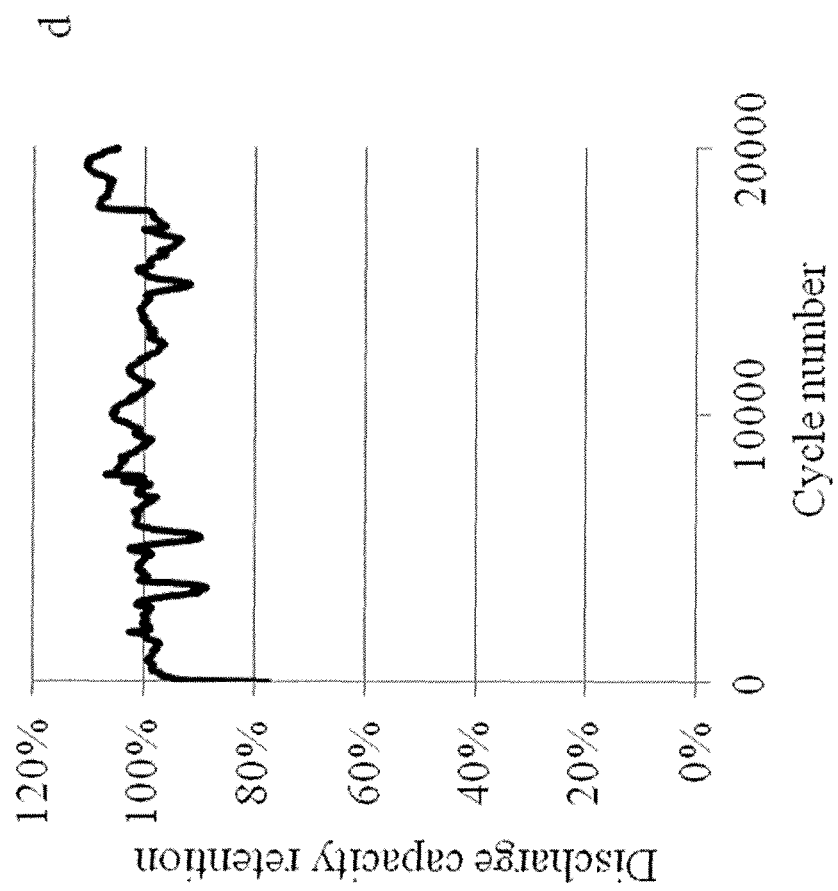
FIG. 18D is a cycling stability curve at 0.66 A/g for a lithium ion battery (e.g., $LiMn_2O_4$/$V_{1/2}Sb_{1/2}SnO_4$) in accordance with exemplary embodiments of the present invention.

The high rate lithium ion battery, however, has an excellent cycling stability at a high rate of about 45 C (e.g., 80 seconds), as shown in FIG. 18C. It is stable for at least 20,000 cycles without any substantial capacity loss, which is much better than the cycling stability reported for a tin-based commercial lithium ion battery (Donald Foster, Jeff Wolfenstine, Jeffrey Read, and Jan L. Allen; *Performance of Sony's Alloy Based Li-ion Battery*; ARL-TN-0319; U.S. Army Research Laboratory: Adelphi, Md., 2008). The commercial lithium ion battery lost 10% of its capacity within 200 cycles. The extraordinary cycling stability of the fabricated lithium ion battery is partially because of the limited voltage range for the negative electrode. The negative electrode is cycled between 0.33V to 0.87V, as shown in FIG. 18D. In this voltage range, pure tin particles may have a volume change of 170%. With this relatively large volume change, it is impressive that the negative electrode with the lithiated nano-architectured $V_{1/2}Sb_{1/2}SnO_4$ may still be stable over 20,000 cycles.

The $LiMn_2O_4/V_{1/2}Sb_{1/2}SnO_4$ high rate lithium ion battery shows that the lithiated tin oxide-based materials may be used for high rate lithium ion battery with excellent cycling stability.

FIGS. 18A-18D show that a fabricated $LiMn_2O_4/V_{1/2}Sb_{1/2}SnO_4$ lithium ion pouch cell may be stable for at least 20,000 cycles at a high charge/discharge rate. This shows that the mixed tin oxide negative electrode material may be used for high rate lithium ion battery with excellent cycling stability.

In summary, high rate energy storage devices including high rate lithium ion capacitors and high rate lithium ion batteries may achieve desirable cycling stability by using the lithiated nano-architectured tin oxide-based materials disclosed in the described embodiments. The fabricated lithium ion capacitors are charged/discharged within 5 seconds (e.g., 720 C) with a decent output of energy density and are stable for tens of thousands of cycles, which is significant for tin-based electrode materials considering the inevitable volume change of tin during cycling. Both the pure V/Sb/Sn mixed oxide and carbon coated tin oxide-HPB-45 based composite are suitable as negative electrode materials for the high rate applications.

The described embodiments of the present invention are directed to applications of pre-lithiated tin-based negative electrode materials for high rate lithium ion capacitors and lithium ion batteries with long cycling stability. Although not demonstrated in the present invention, these materials can be used for slow rate applications with good cycling stability since the tin-based negative electrode active materials are expected to be more stable at slow charge/discharge rates.

In principle, the same concept may be applied to other alkaline metal or metal ion capacitors and batteries (e.g., sodium ion capacitors, sodium ion batteries, magnesium ion capacitors, and magnesium ion batteries). The tin-based material may be inserted (e.g., doped) with sodium ions instead of lithium ions to limit its first irreversible capacity loss before it is used as an electrode active material in an energy storage device. The sodium ion pre-doped tin-based material may then be used as a negative electrode material in a sodium ion energy storage device including a sodium salt. Because of a larger ion size of $Na^+$ as compared to $Li^+$, the sodium ion capacitor or sodium ion battery may be expected to have a lower rate performance than the corresponding lithium ion capacitor or lithium ion battery.

Pre-lithiation is incorporated in certain embodiments of this invention to reduce the large irreversible capacity loss during the $1^{st}$ charge/discharge cycle. Even not demonstrated, in principle, other techniques that can help reduce the irreversible capacity loss could also be used for the tin-based negative electrode materials. For example, it might be possible to use a positive electrode active material with large irreversible capacity loss during the $1^{st}$ charge/discharge cycle. These materials will release much more lithium ions during the oxidation (i.e., charge) process than the reduction (i.e., discharge) process during the $1^{st}$ cycle. Materials such as $Li_2NiO_2$ may be used as the positive electrode active material. It might also be possible to use an electrolyte additive that can release lithium ions when oxidized to help reduce the irreversible capacity loss during the $1^{st}$ cycle of a tin-based material.

The invention has been described by way of several embodiments and examples. For example:

At least one embodiment includes an energy storage device having a positive electrode including a material that stores and releases ions, a negative electrode including a pre-lithiated nano-architectured tin-based material, and a non-aqueous electrolyte containing lithium.

The energy storage device may include a lithium ion capacitor and a lithium ion battery.

At least one embodiment includes a lithium ion capacitor having a positive electrode active material including a carbonaceous material, a negative electrode including a pre-lithiated nano-architectured tin-based material, and a non-aqueous electrolyte containing lithium.

The lithium ion capacitor may include a positive electrode having an electrically conductive substrate. The electrically conductive substrate may include plate, sheet, foil, mesh, expanded mesh, felt, and foam made from a series of electrically conductive substances such as copper, nickel, aluminum, iron, stainless steel, titanium, graphite, carbon black, carbon nanotubes, graphene, or conductive polymer.

The lithium ion capacitor may include positive electrode active material, which is a carbonaceous material with a specific surface area greater than 100 $m^2/g$, or more preferably between 1000 $m^2/g$ and 3500 $m^2/g$. The carbon film may include activated carbon, carbon nanotubes, graphene, carbon black, carbon nanoparticles, or carbon nanocrystals.

The lithium ion capacitor may include a positive electrode having a layer of electrode active material with thickness in the range of about 10 µm to 100 µm for high rate application.

The mass ratio between the negative electrode active material and the positive electrode active material in the lithium ion capacitor may be in the range of about 1/3 to 3/1, or more preferably about 1/2 to 2/1 for high rate application.

At least one embodiment includes a lithium ion capacitor having a positive electrode active material including a carbonaceous material, a negative electrode including lithiated nano-architectured tin oxide-based material having a formula $V_xSb_ySnO_z$, where x is from 0.01 to 2.0, y is from 0.01 to 2.0, and z is $0<z\le(5x+3y+4)/2$, and a non-aqueous electrolyte containing lithium.

At least one embodiment includes a lithium ion capacitor having a positive electrode active material including a carbonaceous material, a negative electrode including lithiated nano-architectured tin oxide-based material having a $SnO_z$/carbon composite, where z is $0<z\le2$, and a non-aqueous electrolyte containing lithium.

At least one embodiment includes a lithium ion capacitor having a positive electrode active material including a carbonaceous material, a negative electrode including lithiated nano-architectured Sn/carbon composite, and a non-aqueous electrolyte containing lithium.

At least one embodiment includes a lithium ion battery having a positive electrode active material that stores energy through a faradaic process, a negative electrode including a pre-lithiated nano-architectured tin-based material, and a non-aqueous electrolyte containing lithium.

The lithium ion battery may include a positive electrode having a lithium intercalation material that can store/release lithium ions through an intercalation/de-intercalation process. The positive electrode may include an electrochemically-active layer and an electrically conductive substrate. The electrochemically-active layer may include a lithium intercalation material that can be selected from existing cathode materials for lithium ion battery, for example: $LiFePO_4$, $LiMn_2O_4$, $LiMnO_2$, $LiNiO_2$, $LiCoO_2$, $LiMn_{0.5}Ni_{0.5}O_2$, $LiCo_{1/3}Ni_{1/3}Mn_{1/3}O_2$, $xLi_2MnO_3.(1-x)LiMO_2$ ($0 \le x \le 1$; M:Mn, Co, Ni), $LiV_3O_8$, and $LiVPO_4F$. The electrochemically-active layer may include a non-lithiated material having $FePO_4$, $V_2O_5$, or $MnO_2$.

The lithium ion battery may include a positive electrode having sulfur. A carbon-sulfur composite may generally be used to ensure good electrical conductivity of electrode film.

The lithium ion battery may include a positive electrode having at least one air catalyst that can catalyze either the reduction process of oxygen, or the oxidation process of oxide, or both.

The lithium ion battery may include a positive electrode comprising a metal fluoride that interacts with lithium ions through a conversion reaction.

The negative electrode may include a pre-lithiated nano-architectured tin-based material and an electrically conductive substrate. The tin-based material may optionally be lithiated when it is deposited or coated onto an electrically conductive substrate. The electrically conductive substrate may include plate, sheet, foil, mesh, expanded mesh, felt, and foam made from a series of electrically conductive substances such as copper, nickel, aluminum, iron, stainless steel, titanium, graphite, carbon black, carbon nanotubes, graphene, or conductive polymer.

The tin-based material may be lithiated either through a chemical or an electrochemical process before it is cycled as a negative electrode active material in a full cell.

The electrochemical lithiation process may include a process to short-circuit metallic lithium with a tin-based material in the presence of a solution including a lithium salt.

The chemical lithiation process may include soaking a tin-based material in a solution that includes a lithiation agent having lithium paphthalene and normal (N-), secondary (sec-), or tertiary (ter-)butyl lithium.

The tin-based material is nano-architectured before lithiation.

The lithiated nano-architectured tin-based material may include a lithiated tin oxide-based material.

The lithiated nano-architectured tin oxide-based material may include a lithiated nano-architectured tin oxide-based material having a formula $V_xSb_ySnO_z$, where x is from 0.01 to 2.0, y is from 0.01 to 2.0, and z is $0<z\le(5x+3y+4)/2$.

The lithiated nano-architectured tin oxide-based material may include a lithium oxide.

The lithiated nano-architectured tin oxide-based material may include $Li_xSn$, where x is $0 \le x \le 4.4$.

The lithiated nano-architectured tin oxide-based material may include lithium-tin alloy or tin particles with a particle size in a range of 1 nm to 1000 nm.

The lithiated nano-architectured tin oxide-based material may include lithium-tin alloy or tin particles with a particle size in a range of 2 nm to 500 nm.

The lithiated nano-architectured tin oxide-based material may include lithium-tin alloy or tin particles with a particle size in a range of 5 nm to 100 nm.

The lithiated nano-architectured tin oxide-based material may include at least one more stress-buffer component to help release volume change stress of tin particles during cycling.

The stress-buffer component may be selected from the group consisting of manganese, iron, copper, titanium, zirconium, cobalt, aluminum, nickel, bismuth, bismuth, their oxides, their phosphates, their nitrides, or mixture thereof.

The stress-buffer component may be selected from a carbonaceous material including graphite, hard carbon, soft carbon, amorphous carbon coated graphite, amorphous carbon coated hard carbon, carbon black, carbon nanofibers, carbon nanotubes, graphene, carbon nanoparticles, carbon with onion-like structure, crystalline carbon, semi-crystalline carbon, or amorphous carbon.

The nano-architectured tin oxide-based material may include zinc oxide, silicon, silicon monoxide, germanium, and germanium oxide to enhance the performance of the energy storage device or lower the cost of the energy storage device down.

The nano-architectured tin oxide-based material may include a carbon-coated tin oxide-carbon composite, wherein the carbon in a tin oxide-carbon is a carbonaceous material formed in a separate process, and the carbon of a carbon-coating is decomposed from an organic compound in an organic base-assisted sol-gel process to make the carbon-coated tin oxide-carbon composite.

The mass ratio between a negative electrode active material in the negative electrode and a positive electrode active material in the positive electrode may be in a range of about 1/3 to 3/1 for a high rate lithium ion capacitor or battery.

The mass ratio between a negative electrode active material in the negative electrode and a positive electrode active material in the positive electrode may be in a range of about 1/2 to 2/1 for a high rate lithium ion capacitor or battery.

At least one embodiment includes an energy storage device having a positive electrode including a material that stores and releases ions, a negative electrode including a lithiated nano-architectured material that includes tin and at least one stress-buffer component, and a non-aqueous electrolyte containing lithium.

At least one stress-buffer component may be a carbonaceous material selected from the group consisting of graphite, hard carbon, soft carbon, amorphous carbon coated graphite, amorphous carbon coated hard carbon, carbon black, carbon nanofibers, carbon nanotubes, graphene, carbon nanoparticles, carbon with onion-like structure, crystalline carbon, semi-crystalline carbon, amorphous carbon, and combinations thereof.

The stress-buffer component may be selected from the group consisting of vanadium, antimony, manganese, iron, copper, titanium, zirconium, cobalt, aluminum, nickel, bismuth, bismuth, their oxides, their phosphates, their nitrides, or mixture thereof.

The negative electrode may include zinc, silicon, silicon monoxide, germanium, germanium oxide, and their lithiated compounds to enhance the performance of the energy storage device or lower the cost of the energy storage device down.

The pre-lithiated nano-architectured material may include $Li_xSn$, where the x is $0 \leq x \leq 4.4$.

The pre-lithiated nano-architectured material may include a carbon coating.

The nano-architectured material includes tin oxide and tin particles with particle size in the range of 1 nm to 1000 nm, preferably 2 nm to 500 nm, more preferably 5 to 100 nm.

The pre-lithiated nano-architectured material includes tin, tin alloy, and lithiated tin particles with a particle size in a range of 1 nm to 1000 nm, preferably 2 nm to 500 nm, more preferably 5 to 100 nm.

The mass ratio between a negative electrode active material in the negative electrode and a positive electrode active material in the positive electrode may be in a range of about 1/3 to 3/1 for high rate application.

The mass ratio between a negative electrode active material in the negative electrode and a positive electrode active material in the positive electrode may be in a range of about 1/2 to 2/1 for high rate application.

At least one embodiment includes a solid-state process to prepare nano-architectured tin-vanadium-antimony mixed oxide without high energy ball milling for energy storage device with particle size in the range of 1 nm to 1000 nm, preferably from 5 nm to 200 nm, or more preferably 5 nm to 100 nm.

The solid-state process may include tin oxide nanoparticles as the starting material with particle size in the range of 1 nm to 1000 nm, preferably 5 to 200 nm, or even more preferably 5 nm to 100 nm.

The solid-state process may include a step of mixing tin oxide nanoparticles, antimony oxide, and ammonium vanadate physically. The mixture is then heated at a temperature in the range of about 800° C. to 1000° C.

The solid-state process may include dispersing tin oxide nanoparticles in solution with dissolved vanadium or/and antimony species. The dispersion is then dried and heated at a high temperature in the range of about 800° C. to 1000° C.

At least one embodiment includes an energy storage device having a positive electrode, including a material that stores and releases ions, a negative electrode including a lithiated nano-architectured material that includes tin and at least one stress-buffer component, a non-aqueous electrolyte containing lithium, and a mass ratio between the negative electrode active material and the positive electrode active material in a range of about 1/3 to 3/1.

At least one embodiment includes an energy storage device having a positive electrode, including a material that stores and releases ions, a negative electrode including a lithiated nano-architectured material that includes tin and at least one stress-buffer component, a non-aqueous electrolyte containing lithium, and the layer of the positive electrode active material has a thickness of 100 μm or less.

At least one embodiment includes a method of making nano-architectured tin-based materials for energy storage devices, and includes an organic base-assisted sol-gel process.

The organic base may include propylene oxide.

The nano-architectured tin-based materials may include tin or tin oxide particles with an average particle size in the range of 1 nm to 1000 nm, preferably from 5 nm to 200 nm, or more preferably 5 nm to 100 nm.

The tin-based material may include tin, tin oxide, tin-based oxide, or their composites with carbon.

The tin base material may include a composite of tin-carbon, tin oxide-carbon, vanadium oxide-tin oxide-carbon, antimony-vanadium oxide-tin oxide-carbon, and tin-iron tin oxide-carbon.

The carbon in tin-based material may be a carbonaceous material that is selected from the group consisting of graphite, hard carbon, soft carbon, amorphous carbon coated graphite, amorphous carbon coated hard carbon, carbon black, carbon nanofibers, carbon nanotubes, graphene, carbon nanoparticles, carbon, crystalline carbon, semi-crystalline carbon, amorphous carbon, and combinations thereof.

The carbon in tin-based material may include a carbon coating formed by decomposing organic species thermally that cover the particles surface. It may include amorphous, semi-crystalline, and crystalline carbon.

The content of the carbonaceous material in the composite may be about 1 wt % to 90 wt %, or more preferably in the range of about 1 wt % to 50 wt %.

The carbon coated tin oxide-preformed carbon composite may include vanadium oxide with vanadium/tin molar ratio in the range of about 0.01 to 2.0, or more preferably about 0.1 to 1.0.

The carbon coated tin oxide/preformed carbon composite may include antimony or/and antimony oxide with antimony/tin molar ratio in the range of about 0.01 to 2.0, or more preferably about 0.1 to 1.0.

It is understood that the described embodiments are not mutually exclusive, and elements, components, materials, or steps described in connection with one exemplary embodiment may be combined with, or eliminated from, other embodiments in suitable ways to accomplish desired design objectives.

The term "or" is used in this application its inclusive sense (and not in its exclusive sense), unless otherwise specified. In addition, the articles "a" and "an" as used in this application and the appended claims are to be construed to mean "one or more" or "at least one" unless specified otherwise.

It will be further understood that various changes in the details, materials, and arrangements of the parts which have been described and illustrated in order to explain the nature of described embodiments may be made by those skilled in the art without departing from the scope as expressed in the following claims.

We claim:

1. An energy storage device, comprising:
    a positive electrode including an active material that stores and releases ions;
    a negative electrode including a pre-lithiated, nano-architectured, tin oxide-based material comprising: a carbonaceous material, a metal oxide having a formula $V_xSb_ySnO_z$, where $0.01 \leq x \leq 0.25$, $0.01 \leq y \leq 2.0$, and $0 < z \leq (5x+3y+4)/2$; and
    a non-aqueous electrolyte containing lithium.

2. The energy storage device of claim 1 wherein the pre-lithiated nano-architectured tin oxide-based material includes a lithium oxide.

3. The energy storage device of claim 1 wherein the pre-lithiated nano-architectured tin oxide-based material includes $Li_xSn$, where x is $0 \leq x \leq 4.4$.

4. The energy storage device of claim 1 wherein the pre-lithiated nano-architectured tin oxide-based material includes lithium-tin alloy particles or tin particles with a particle size in a range of 1 nm to 100 nm.

5. The energy storage device of claim 1 wherein the pre-lithiated nano-architectured tin oxide-based material includes lithium-tin alloy particles or tin particles with a particle size in a range of 1 nm to 50 nm.

6. The energy storage device of claim 1 wherein the pre-lithiated nano-architectured tin oxide-based material includes lithium-tin alloy particles or tin particles with a particle size in a range of 1 nm to 9 nm.

7. The energy storage device of claim 1 wherein the nano-architectured tin oxide-based material includes at least one stress-buffer component.

8. The energy storage device of claim 7 wherein the at least one stress-buffer component is selected from the group consisting of manganese, iron, copper, titanium, zirconium, cobalt, aluminum, nickel, bismuth, bismuth, their oxides, their phosphates, their nitrides, and mixtures thereof.

9. The energy storage device of claim 1 wherein the nano-architectured tin oxide-based material includes zinc oxide, silicon, silicon monoxide, germanium, or germanium oxide.

10. The energy storage device of claim 1 wherein the carbonaceous material is selected from the group consisting of graphite, hard carbon, soft carbon, amorphous carbon coated graphite, amorphous carbon coated hard carbon, carbon black, carbon nanofibers, carbon nanotubes, graphene, carbon nanoparticles, carbon onion, crystalline carbon, semi-crystalline carbon, amorphous carbon, and combinations thereof.

11. The energy storage device of claim 1 wherein a mass ratio between a negative electrode active material in the negative electrode and a positive electrode active material in the positive electrode is in a range of about 1/3 to 3/1.

12. The energy storage device of claim 1 wherein a mass ratio between a negative electrode active material in the negative electrode and a positive electrode active material in the positive electrode is in a range of about 1/2 to 2/1.

13. The energy storage device of claim 1, wherein the energy storage device is a lithium ion capacitor.

14. The energy storage device of claim 1 wherein the energy storage device is a lithium ion battery.

15. The energy storage device of claim 1, wherein the carbon coating is formed by thermally decomposing an organic material.

16. The energy storage device of claim 1, wherein said device is configured to obtain cycling stability of at least 1,000-5,000 cycles with a capacity retention greater than 80%.

17. The energy storage device of claim 1, wherein the range of $0.01 \leq x \leq 0.25$ is selected such that no phase separation is observed with XRD characterization of the $V_xSb_ySnO_z$.

18. The energy storage device of claim 1, wherein the x is selected in the range of $0.125 \leq x < 0.25$.

* * * * *